US011400416B2

(12) United States Patent
Choong et al.

(10) Patent No.: US 11,400,416 B2
(45) Date of Patent: *Aug. 2, 2022

(54) OSMOTIC DESALINATION METHODS AND ASSOCIATED SYSTEMS

(71) Applicant: Gradiant Corporation, Woburn, MA (US)

(72) Inventors: Looh Tchuin Choong, Singapore (SG); Prakash Narayan Govindan, Singapore (SG); Maximus G. St. John, Singapore (SG); Steven Lam, Singapore (SG); Jonn-Ross Andrews, Somerville, MA (US); Karim M. Chehayeb, Beirut (LB)

(73) Assignee: Gradiant Corporation, Woburn, MA (US)

( * ) Notice: Subject to any disclaimer, the term of this patent is extended or adjusted under 35 U.S.C. 154(b) by 151 days.

This patent is subject to a terminal disclaimer.

(21) Appl. No.: 16/681,533

(22) Filed: Nov. 12, 2019

(65) Prior Publication Data

US 2020/0147554 A1 May 14, 2020

Related U.S. Application Data

(63) Continuation of application No. 15/747,907, filed as application No. PCT/US2016/044663 on Jul. 29, 2016, now Pat. No. 10,518,221.
(Continued)

(51) Int. Cl.
*B01D 61/02* (2006.01)
*C02F 1/44* (2006.01)
(Continued)

(52) U.S. Cl.
CPC ......... *B01D 61/002* (2013.01); *B01D 61/022* (2013.01); *B01D 61/025* (2013.01);
(Continued)

(58) Field of Classification Search
CPC .. C02F 1/44; C02F 1/441; C02F 1/445; C02F 2301/08; C02F 2103/08; B01D 61/002;
(Continued)

(56) References Cited

U.S. PATENT DOCUMENTS

| 2,151,990 | A | 3/1939 | Ruys |
| 2,606,820 | A | 8/1952 | Harms |

(Continued)

FOREIGN PATENT DOCUMENTS

| CA | 2779732 A1 | 12/2012 |
| CA | 2818055 C | 11/2013 |

(Continued)

OTHER PUBLICATIONS

Office Communication for IN Application No. 201817005629 dated Aug. 18, 2021.
(Continued)

*Primary Examiner* — John Kim
(74) *Attorney, Agent, or Firm* — Wolf, Greenfield & Sacks, P.C.

(57) ABSTRACT

Provided herein are osmotic desalination methods and associated systems. According to certain embodiments, multiple osmotic membranes may be used to perform a series of osmosis steps, such that an output stream having a relatively high water purity—compared to a water purity of an aqueous feed stream—is produced. In some embodiments, multiple draw streams can be used to produce aqueous product streams having sequentially higher purities of water. Certain embodiments are related to osmotic desalination systems and methods in which forward osmosis is used to produce a first product stream having a relatively high water purity relative to an aqueous feed stream, and reverse osmosis is used to perform a second step (and/or additional steps) on the first product stream. In some embodiments, multiple
(Continued)

reverse osmosis steps can be used in series to perform a net desalination process.

28 Claims, 7 Drawing Sheets

Related U.S. Application Data

(60) Provisional application No. 62/198,413, filed on Jul. 29, 2015.

(51) Int. Cl.
  *B01D 61/58* (2006.01)
  *B01D 61/00* (2006.01)
  *C02F 103/08* (2006.01)

(52) U.S. Cl.
  CPC ............... *B01D 61/58* (2013.01); *C02F 1/44* (2013.01); *C02F 1/441* (2013.01); *C02F 1/445* (2013.01); *B01D 2311/14* (2013.01); *B01D 2317/025* (2013.01); *C02F 2103/08* (2013.01); *C02F 2301/08* (2013.01); *Y02A 20/131* (2018.01)

(58) Field of Classification Search
  CPC .... B01D 61/025; B01D 61/022; B01D 61/58; B01D 2317/025; B01D 2311/14; Y02A 20/131
  See application file for complete search history.

(56) References Cited

U.S. PATENT DOCUMENTS

| | | |
|---|---|---|
| 2,606,839 A | 8/1952 | Evans |
| 2,640,018 A | 5/1953 | Heath |
| 2,997,856 A | 8/1961 | Pike |
| 3,032,482 A | 5/1962 | Shoemaker |
| 3,042,606 A | 7/1962 | Salutsky et al. |
| 3,080,302 A | 3/1963 | Rogers et al. |
| 3,236,747 A | 2/1966 | Margiloff |
| 3,331,773 A | 7/1967 | Gunderson et al. |
| 3,454,490 A | 7/1969 | Wallace |
| 3,472,766 A | 10/1969 | Rosenbaum |
| 3,475,331 A | 10/1969 | McLain |
| 3,489,652 A | 1/1970 | Williamson |
| 3,625,761 A | 12/1971 | Tate |
| 3,630,378 A | 12/1971 | Bauman |
| 3,725,209 A | 4/1973 | Rosa |
| 3,906,250 A | 9/1975 | Loeb |
| 3,922,154 A | 11/1975 | Kawasaki et al. |
| 3,926,739 A | 12/1975 | Izumi |
| 4,062,197 A | 12/1977 | Hester |
| 4,105,547 A | 8/1978 | Sandblom |
| 4,156,645 A | 5/1979 | Bray |
| 4,224,148 A | 9/1980 | Lindman et al. |
| 4,251,367 A | 2/1981 | Santora |
| 4,312,755 A | 1/1982 | Hwang |
| 4,334,886 A | 6/1982 | Tani et al. |
| 4,358,377 A | 11/1982 | Clark |
| 4,452,696 A | 6/1984 | Lopez |
| 4,478,719 A | 10/1984 | Michele et al. |
| 4,511,436 A | 4/1985 | el Din Nasser |
| 4,563,337 A | 1/1986 | Kim |
| 4,574,049 A | 3/1986 | Pittner |
| 4,576,724 A | 3/1986 | Colman et al. |
| 4,652,373 A | 3/1987 | Trimmer |
| 4,704,324 A | 11/1987 | Davis et al. |
| 4,708,805 A | 11/1987 | D'Muhala |
| 4,735,722 A | 4/1988 | Krepak |
| 4,755,298 A | 7/1988 | Grinstead |
| 4,765,897 A | 8/1988 | Cadotte et al. |
| 4,769,148 A | 9/1988 | Fibiger et al. |
| 4,770,775 A | 9/1988 | Lopez |
| 4,797,187 A | 1/1989 | Davis et al. |
| 4,806,244 A | 2/1989 | Guilhem |
| 4,812,238 A | 3/1989 | Cadotte et al. |
| 4,824,574 A | 4/1989 | Cadotte et al. |
| 4,828,700 A | 5/1989 | Fibiger et al. |
| 4,832,115 A | 5/1989 | Albers et al. |
| 4,839,203 A | 6/1989 | Davis et al. |
| 4,843,828 A | 7/1989 | Gladman |
| 4,859,338 A | 8/1989 | Behr |
| 4,859,384 A | 8/1989 | Fibiger et al. |
| 4,894,165 A | 1/1990 | Fibiger et al. |
| 4,909,943 A | 3/1990 | Fibiger et al. |
| 4,927,540 A | 5/1990 | Wessling et al. |
| 4,941,972 A | 7/1990 | Kau et al. |
| 4,944,882 A | 7/1990 | Ray et al. |
| 4,956,157 A | 9/1990 | Nasu |
| 4,957,817 A | 9/1990 | Chau et al. |
| 4,959,237 A | 9/1990 | Walker |
| 4,973,201 A | 11/1990 | Paul et al. |
| 4,980,063 A | 12/1990 | Mahoney et al. |
| 4,980,077 A | 12/1990 | Morris et al. |
| 4,981,593 A | 1/1991 | Priestley et al. |
| 4,992,485 A | 2/1991 | Koo et al. |
| 5,015,391 A | 5/1991 | Mohn |
| 5,053,132 A | 10/1991 | Sirkar |
| 5,096,590 A | 3/1992 | Watanabe et al. |
| 5,123,481 A | 6/1992 | Albers et al. |
| 5,167,828 A | 12/1992 | Emmons et al. |
| 5,190,656 A | 3/1993 | Paul et al. |
| 5,207,916 A | 5/1993 | Goheen et al. |
| 5,225,087 A | 7/1993 | Kardos |
| 5,238,574 A | 8/1993 | Kawashima et al. |
| 5,250,185 A | 10/1993 | Tao et al. |
| 5,282,995 A | 2/1994 | Paul et al. |
| 5,328,616 A | 7/1994 | Martyak et al. |
| 5,425,902 A | 6/1995 | Miller et al. |
| 5,453,205 A | 9/1995 | Browne |
| 5,464,540 A | 11/1995 | Friesen et al. |
| 5,490,937 A | 2/1996 | Van Reis |
| 5,503,750 A | 4/1996 | Russo, Jr. et al. |
| 5,656,161 A | 8/1997 | Solomon et al. |
| 5,670,053 A | 9/1997 | Collentro et al. |
| 5,840,195 A | 11/1998 | Delsalle et al. |
| 5,873,260 A | 2/1999 | Linhardt et al. |
| 6,010,631 A | 1/2000 | Delsalle et al. |
| 6,056,878 A | 5/2000 | Tessier et al. |
| 6,062,070 A | 5/2000 | Maltby et al. |
| 6,113,797 A | 9/2000 | Al-Samadi |
| 6,146,525 A | 11/2000 | Li et al. |
| 6,187,200 B1 | 2/2001 | Yamamura et al. |
| 6,190,556 B1 | 2/2001 | Uhlinger |
| 6,190,558 B1 | 2/2001 | Robbins |
| 6,270,671 B1 | 8/2001 | Shorr et al. |
| 6,299,766 B1 | 10/2001 | Permar |
| 6,319,409 B1 | 11/2001 | Saitou et al. |
| 6,416,668 B1 | 7/2002 | Al-Samadi |
| 6,423,235 B1 | 7/2002 | Shimoi et al. |
| 6,440,310 B1 | 8/2002 | Shorr et al. |
| 6,461,514 B1 | 10/2002 | Al-Samadi |
| 6,508,936 B1 | 1/2003 | Hassan |
| 6,547,965 B1 | 4/2003 | Chancellor |
| 6,582,605 B2 | 6/2003 | Krulik et al. |
| 6,699,369 B1 | 3/2004 | Hartman et al. |
| 6,730,234 B2 | 5/2004 | Symens et al. |
| 6,783,682 B1 | 8/2004 | Awerbuch |
| 6,817,476 B2 | 11/2004 | Donnick et al. |
| 6,919,000 B2 | 7/2005 | Klausner et al. |
| 7,022,240 B2 | 4/2006 | Hart et al. |
| 7,048,852 B2 | 5/2006 | Ballard |
| 7,115,670 B2 | 10/2006 | Hensman et al. |
| 7,141,171 B2 | 11/2006 | Lightfoot, Jr. |
| 7,225,620 B2 | 6/2007 | Klausner et al. |
| 7,306,437 B2 | 12/2007 | Hauge |
| 7,316,080 B1 | 1/2008 | Woolsey |
| 7,459,084 B2 | 12/2008 | Baig et al. |
| 7,459,088 B2 | 12/2008 | Davis |
| 7,465,376 B2 | 12/2008 | Neubert et al. |
| 7,510,656 B2 | 3/2009 | Shafer et al. |
| 7,520,993 B1 | 4/2009 | Laraway et al. |

(56) References Cited

U.S. PATENT DOCUMENTS

| | | |
|---|---|---|
| 7,527,726 B2 | 5/2009 | Slough et al. |
| 7,597,784 B2 | 10/2009 | Bednarek et al. |
| 7,628,921 B2 | 12/2009 | Efraty |
| 7,678,235 B2 | 3/2010 | Deep et al. |
| 7,718,069 B2 | 5/2010 | Laraway et al. |
| 7,726,398 B2 | 6/2010 | Collins et al. |
| 7,727,400 B2 | 6/2010 | Flynn |
| 7,731,847 B2 | 6/2010 | Ton That |
| 7,815,804 B2 | 10/2010 | Nagghappan |
| 7,824,552 B2 | 11/2010 | Slabaugh et al. |
| 7,950,921 B1 | 5/2011 | Woolsey |
| 7,964,101 B2 | 6/2011 | Slough et al. |
| 8,012,358 B2 | 9/2011 | Slabaugh et al. |
| 8,043,509 B2 | 10/2011 | Thiers |
| 8,119,007 B2 | 2/2012 | Bajpayee et al. |
| 8,147,696 B1 | 4/2012 | Pandya |
| 8,152,999 B2 | 4/2012 | Lightfoot, Jr. et al. |
| 8,197,693 B2 | 6/2012 | Al-Jlil |
| 8,216,473 B2 | 7/2012 | Wohlert |
| 8,252,092 B2 | 8/2012 | Govindan et al. |
| 8,292,272 B2 | 10/2012 | Elsharqawy et al. |
| 8,366,924 B2 | 2/2013 | Vuong |
| 8,469,092 B2 | 6/2013 | Curole et al. |
| 8,496,234 B1 | 7/2013 | Govindan et al. |
| 8,501,007 B2 | 8/2013 | Bajpayee et al. |
| 8,523,985 B2 | 9/2013 | Govindan et al. |
| 8,562,824 B2 | 10/2013 | Thiers et al. |
| 8,647,477 B2 | 2/2014 | Govindan et al. |
| 8,678,080 B2 | 3/2014 | Curole et al. |
| 8,679,347 B2 | 3/2014 | Al-Samadi |
| 8,695,343 B2 | 4/2014 | Moe |
| 8,727,325 B2 | 5/2014 | Sparrow et al. |
| 8,771,477 B2 | 7/2014 | Thiers |
| 8,778,065 B2 | 7/2014 | Govindan et al. |
| 8,794,320 B2 | 8/2014 | Ayirala et al. |
| 8,820,723 B1 | 9/2014 | Sparrow et al. |
| 8,840,792 B2 | 9/2014 | Wohlert |
| 8,857,798 B1 | 10/2014 | Sparrow et al. |
| 8,889,000 B2 | 11/2014 | Hannemann et al. |
| 8,980,100 B2 | 3/2015 | Chidambaran |
| 8,999,172 B1 | 4/2015 | Zuback |
| 9,072,984 B2 | 7/2015 | Govindan et al. |
| 9,079,117 B2 | 7/2015 | Govindan et al. |
| 9,085,971 B2 | 7/2015 | Janssen et al. |
| 9,120,033 B2 | 9/2015 | Govindan et al. |
| 9,206,060 B1 | 12/2015 | Abusharkh |
| 9,221,694 B1 | 12/2015 | Govindan et al. |
| 9,266,748 B1 | 2/2016 | Govindan et al. |
| 9,266,762 B2 | 2/2016 | Wang et al. |
| 9,427,705 B1 | 8/2016 | Abusharkh |
| 9,428,404 B2 | 8/2016 | Bajpayee et al. |
| 9,550,685 B2 | 1/2017 | Klausner et al. |
| 9,556,041 B2 | 1/2017 | Govindan et al. |
| 9,617,179 B2 | 4/2017 | Govindan et al. |
| 9,700,811 B2 | 7/2017 | Govindan et al. |
| 9,751,045 B2 | 9/2017 | Wohlert |
| 9,950,297 B2 | 4/2018 | Chang et al. |
| 9,957,180 B2 | 5/2018 | Govindan et al. |
| 9,969,638 B2 | 5/2018 | Govindan et al. |
| 10,245,555 B2 | 4/2019 | St. John et al. |
| 10,258,926 B2 | 4/2019 | Thiel et al. |
| 10,308,524 B1 | 6/2019 | Ahmed et al. |
| 10,518,221 B2 | 12/2019 | Choong et al. |
| 10,940,439 B1 | 3/2021 | Ahmed et al. |
| 10,953,367 B2 | 3/2021 | Chang |
| 2002/0108907 A1 | 8/2002 | Van Reis |
| 2003/0106860 A1 | 6/2003 | Peloquin et al. |
| 2003/0132166 A1 | 7/2003 | Rey |
| 2003/0178367 A1 | 9/2003 | Van Reis |
| 2004/0187897 A1 | 9/2004 | Kenowski et al. |
| 2005/0023222 A1 | 2/2005 | Baillie |
| 2006/0127550 A1 | 6/2006 | Kawana et al. |
| 2006/0144787 A1 | 7/2006 | Schmidt et al. |
| 2006/0150892 A1 | 7/2006 | Mayer |
| 2006/0157409 A1 | 7/2006 | Hassan |
| 2006/0157410 A1 | 7/2006 | Hassan |
| 2007/0012556 A1 | 1/2007 | Lum et al. |
| 2007/0068791 A1 | 3/2007 | Thom et al. |
| 2007/0080113 A1 | 4/2007 | Vuong |
| 2007/0084713 A1 | 4/2007 | Deep et al. |
| 2007/0102359 A1 | 5/2007 | Lombardi et al. |
| 2007/0131428 A1 | 6/2007 | Willem Cornelis den Boestert et al. |
| 2007/0181480 A1 | 8/2007 | Lee |
| 2007/0235391 A1 | 10/2007 | Ylikangas et al. |
| 2007/0246406 A1 | 10/2007 | Dibel et al. |
| 2008/0023333 A1 | 1/2008 | Johnson |
| 2008/0073200 A1 | 3/2008 | Godshall et al. |
| 2008/0102119 A1 | 5/2008 | Grovender |
| 2008/0116134 A1 | 5/2008 | Cartwright |
| 2008/0121585 A1 | 5/2008 | Mavis |
| 2008/0164206 A1 | 7/2008 | Dueker |
| 2008/0237110 A1 | 10/2008 | Lightfoot et al. |
| 2008/0245737 A1 | 10/2008 | Coulter |
| 2008/0277344 A1 | 11/2008 | Sengupta et al. |
| 2009/0020289 A1 | 1/2009 | Sharif |
| 2009/0032446 A1 | 2/2009 | Wiemers et al. |
| 2009/0101490 A1 | 4/2009 | Thiers |
| 2009/0101587 A1 | 4/2009 | Blokker et al. |
| 2009/0127210 A1 | 5/2009 | Swisher |
| 2009/0173096 A1 | 7/2009 | Wohlert |
| 2009/0173690 A1 | 7/2009 | Oklejas, Jr. |
| 2009/0194272 A1 | 8/2009 | Baillie |
| 2009/0218210 A1 | 9/2009 | Demmons et al. |
| 2009/0277634 A1 | 11/2009 | Case et al. |
| 2009/0277640 A1 | 11/2009 | Thompson et al. |
| 2009/0277641 A1 | 11/2009 | Walters et al. |
| 2009/0308820 A1 | 12/2009 | Thiers et al. |
| 2010/0032377 A1 | 2/2010 | Wohlert |
| 2010/0132386 A1 | 6/2010 | Bahar |
| 2010/0163471 A1 | 7/2010 | Elyanow et al. |
| 2010/0163472 A1 | 7/2010 | Thiers et al. |
| 2010/0234795 A1 | 9/2010 | Wallenäs |
| 2010/0242995 A1 | 9/2010 | Xiong et al. |
| 2010/0282675 A1 | 11/2010 | Sengupta et al. |
| 2010/0294718 A1 | 11/2010 | Treyvaud |
| 2010/0314238 A1 | 12/2010 | Frolov et al. |
| 2011/0017677 A1 | 1/2011 | Evans |
| 2011/0024354 A1 | 2/2011 | Xia et al. |
| 2011/0056822 A1 | 3/2011 | Elsharqawy et al. |
| 2011/0056878 A1 | 3/2011 | Matsushiro et al. |
| 2011/0094965 A1 | 4/2011 | Al-Samadi |
| 2011/0108484 A1 | 5/2011 | Liberman et al. |
| 2011/0114558 A1 | 5/2011 | Al-Mayahi et al. |
| 2011/0120157 A1 | 5/2011 | Wohlert |
| 2011/0155666 A1 | 6/2011 | Prakash et al. |
| 2011/0180479 A1 | 7/2011 | Cordatos et al. |
| 2011/0198285 A1 | 8/2011 | Wallace |
| 2011/0203929 A1 | 8/2011 | Buckley et al. |
| 2011/0215039 A1 | 9/2011 | Acernese et al. |
| 2011/0233137 A1 | 9/2011 | Cath et al. |
| 2011/0257788 A1 | 10/2011 | Wiemers et al. |
| 2011/0303607 A1 | 12/2011 | Vora et al. |
| 2011/0306525 A1 | 12/2011 | Lighthelm |
| 2012/0012005 A1 | 1/2012 | Burke |
| 2012/0012511 A1 | 1/2012 | Kim et al. |
| 2012/0037568 A1 | 2/2012 | Karrs et al. |
| 2012/0067819 A1 | 3/2012 | McGinnis |
| 2012/0067820 A1 | 3/2012 | Henthorne et al. |
| 2012/0090833 A1 | 4/2012 | Ligthelm et al. |
| 2012/0091061 A1 | 4/2012 | Al-Jlil |
| 2012/0125603 A1 | 5/2012 | Willingham et al. |
| 2012/0125611 A1 | 5/2012 | Ayirala et al. |
| 2012/0125861 A1 | 5/2012 | Thiers |
| 2012/0145635 A1 | 6/2012 | Lucas, III et al. |
| 2012/0199524 A1 | 8/2012 | Bly, Jr. et al. |
| 2012/0199534 A1 | 8/2012 | Holtzapple et al. |
| 2012/0205307 A1 | 8/2012 | Boudinar |
| 2012/0227975 A1 | 9/2012 | Ayirala et al. |
| 2012/0234664 A1 | 9/2012 | Nicoll |
| 2012/0234765 A1 | 9/2012 | Sengupta et al. |
| 2012/0267307 A1 | 10/2012 | McGinnis |
| 2012/0273417 A1 | 11/2012 | McGinnis et al. |
| 2012/0273422 A1 | 11/2012 | Wohlert |

(56) References Cited

U.S. PATENT DOCUMENTS

| | | |
|---|---|---|
| 2012/0279396 A1 | 11/2012 | Brammer et al. |
| 2012/0285886 A1 | 11/2012 | Liberman |
| 2012/0292259 A1 | 11/2012 | Marcin |
| 2012/0312755 A1 | 12/2012 | Ryan et al. |
| 2012/0318729 A1 | 12/2012 | Yip et al. |
| 2013/0008079 A1 | 1/2013 | Chung et al. |
| 2013/0043190 A1 | 2/2013 | Al-Samadi |
| 2013/0056193 A1 | 3/2013 | Thiers |
| 2013/0074694 A1 | 3/2013 | Govindan et al. |
| 2013/0075098 A1 | 3/2013 | Janjua et al. |
| 2013/0075940 A1 | 3/2013 | Govindan et al. |
| 2013/0087501 A1 | 4/2013 | Moe et al. |
| 2013/0092622 A1 | 4/2013 | Kas et al. |
| 2013/0092626 A1 | 4/2013 | Zimmerman et al. |
| 2013/0105323 A1 | 5/2013 | Averbeck et al. |
| 2013/0118887 A1 | 5/2013 | Frolov et al. |
| 2013/0186822 A1 | 7/2013 | Herron et al. |
| 2013/0193074 A1 | 8/2013 | Voigt et al. |
| 2013/0199921 A1 | 8/2013 | McGovern |
| 2013/0213892 A1 | 8/2013 | Henthorne |
| 2013/0233786 A1 | 9/2013 | Posa |
| 2013/0240442 A1 | 9/2013 | Chidambaran et al. |
| 2013/0256228 A1 | 10/2013 | Bharwada et al. |
| 2013/0318743 A1 | 12/2013 | Chinta et al. |
| 2014/0008291 A1 | 1/2014 | Tang et al. |
| 2014/0021135 A1 | 1/2014 | Sawyer et al. |
| 2014/0041856 A1 | 2/2014 | Janssen et al. |
| 2014/0042058 A1 | 2/2014 | Janssen et al. |
| 2014/0042061 A1 | 2/2014 | Wallace |
| 2014/0061022 A1 | 3/2014 | Passarelli |
| 2014/0069821 A1 | 3/2014 | Marcin et al. |
| 2014/0116956 A1 | 5/2014 | Yuan et al. |
| 2014/0197022 A1 | 7/2014 | Antar et al. |
| 2014/0197029 A1 | 7/2014 | Sparrow et al. |
| 2014/0246368 A1 | 9/2014 | Neubrand et al. |
| 2014/0263055 A1 | 9/2014 | Govindan et al. |
| 2014/0263081 A1 | 9/2014 | Thiers |
| 2014/0284929 A1 | 9/2014 | Taniguchi et al. |
| 2014/0299462 A1 | 10/2014 | Thiers |
| 2014/0339162 A1 | 11/2014 | Cao et al. |
| 2014/0367871 A1 | 12/2014 | Govindan et al. |
| 2015/0013987 A1 | 1/2015 | Underwood et al. |
| 2015/0014248 A1 | 1/2015 | Herron et al. |
| 2015/0053619 A1 | 2/2015 | Cao et al. |
| 2015/0060286 A1 | 3/2015 | Govindan et al. |
| 2015/0060360 A1 | 3/2015 | Motherway et al. |
| 2015/0083577 A1 | 3/2015 | Govindan et al. |
| 2015/0083656 A1 | 3/2015 | Williams |
| 2015/0107840 A1 | 4/2015 | Ligthelm et al. |
| 2015/0107841 A1 | 4/2015 | Suijkerbuijk et al. |
| 2015/0129410 A1 | 5/2015 | Govindan et al. |
| 2015/0136699 A1 | 5/2015 | Wohlert |
| 2015/0353397 A1 | 12/2015 | Cath et al. |
| 2016/0001235 A1 | 1/2016 | Frisk |
| 2016/0040522 A1 | 2/2016 | Jacob et al. |
| 2016/0137526 A1 | 5/2016 | Govindan et al. |
| 2016/0228795 A1 | 8/2016 | St. John et al. |
| 2016/0229705 A1 | 8/2016 | St. John et al. |
| 2016/0244349 A1 | 8/2016 | St. John et al. |
| 2016/0339354 A1 | 11/2016 | Govindan et al. |
| 2016/0339356 A1 | 11/2016 | Govindan et al. |
| 2016/0339357 A1 | 11/2016 | Govindan et al. |
| 2016/0339390 A1 | 11/2016 | Abusharkh |
| 2017/0036171 A1 | 2/2017 | Lienhard et al. |
| 2017/0044033 A1 | 2/2017 | Lienhard et al. |
| 2017/0144906 A1 | 5/2017 | Andrews et al. |
| 2017/0174543 A1 | 6/2017 | Govindan et al. |
| 2018/0008919 A1 | 1/2018 | Tierney, III et al. |
| 2018/0036682 A1 | 2/2018 | Nicoll et al. |
| 2018/0104649 A1 | 4/2018 | Govindan et al. |
| 2018/0169583 A1 | 6/2018 | Wohlert |
| 2018/0236372 A1 | 8/2018 | Govindan et al. |
| 2018/0236406 A1 | 8/2018 | St. John et al. |
| 2018/0244545 A1 | 8/2018 | St. John et al. |
| 2019/0176088 A1 | 6/2019 | Wohlert |
| 2019/0224624 A1 | 7/2019 | Kitamura et al. |
| 2020/0086274 A1 | 3/2020 | Benton et al. |

FOREIGN PATENT DOCUMENTS

| | | |
|---|---|---|
| CA | 2821453 C | 1/2014 |
| CA | 2816746 C | 4/2014 |
| CA | 2821458 C | 7/2014 |
| CN | 1623936 A | 6/2005 |
| CN | 1835892 A | 9/2006 |
| CN | 1856447 A | 11/2006 |
| CN | 100999364 A | 7/2007 |
| CN | 101056693 A | 10/2007 |
| CN | 101397152 A | 4/2009 |
| CN | 101417208 A | 4/2009 |
| CN | 101636354 A | 1/2010 |
| CN | 101717161 A | 6/2010 |
| CN | 102036739 A | 4/2011 |
| CN | 102143786 A | 8/2011 |
| CN | 102258942 A | 11/2011 |
| CN | 102363101 A | 2/2012 |
| CN | 102438957 A | 5/2012 |
| CN | 102725236 A | 10/2012 |
| CN | 102933507 A | 2/2013 |
| CN | 103547798 A | 1/2014 |
| DE | 2145861 A1 | 11/1972 |
| DE | 102012017860 A1 | 5/2014 |
| EP | 0 070 059 A1 | 1/1983 |
| EP | 0 207 390 A1 | 1/1987 |
| EP | 0 253 287 A1 | 1/1988 |
| EP | 0 623 561 A1 | 11/1994 |
| EP | 1 775 267 A2 | 4/2007 |
| FR | 1582201 A | 9/1969 |
| FR | 2561637 A1 | 9/1985 |
| GB | 821939 A | 10/1959 |
| GB | 1013767 A | 12/1965 |
| GB | 1036920 A | 7/1966 |
| GB | 1320429 A | 6/1973 |
| GB | 1444241 A | 7/1976 |
| GB | 2395946 A | 6/2004 |
| JP | S55-147199 A | 11/1980 |
| JP | H05-208199 A | 8/1993 |
| JP | H06-233 B2 | 1/1994 |
| JP | 2002-001068 A | 1/2002 |
| JP | 2018-001111 A | 1/2018 |
| KR | 101229482 B1 | 2/2013 |
| KR | 20130074104 A | 7/2013 |
| WO | WO 95/27683 A1 | 10/1995 |
| WO | WO 00/00273 A1 | 1/2000 |
| WO | WO 01/14256 A1 | 3/2001 |
| WO | WO 02/32813 A1 | 4/2002 |
| WO | WO 2005/012185 A1 | 2/2005 |
| WO | WO 2007/128062 A1 | 11/2007 |
| WO | WO 2007/132477 A1 | 11/2007 |
| WO | WO 2007/138327 A1 | 12/2007 |
| WO | WO 2007/144591 A1 | 12/2007 |
| WO | WO 2008/137082 A1 | 11/2008 |
| WO | WO 2010/026589 A1 | 3/2010 |
| WO | WO 2010/118425 A1 | 10/2010 |
| WO | WO 2010/122336 A2 | 10/2010 |
| WO | WO 2010/131251 A2 | 11/2010 |
| WO | WO 2010/135561 A2 | 11/2010 |
| WO | WO 2011/159743 A1 | 12/2011 |
| WO | WO 2012/138502 A1 | 10/2012 |
| WO | WO 2012/142396 A1 | 10/2012 |
| WO | WO 2012/148911 A2 | 11/2012 |
| WO | WO 2012/159203 A1 | 11/2012 |
| WO | WO 2013/012548 A1 | 1/2013 |
| WO | WO 2013/037047 A1 | 3/2013 |
| WO | WO 2013/078124 A1 | 5/2013 |
| WO | WO 2013/158315 A1 | 10/2013 |
| WO | WO 2013/159220 A1 | 10/2013 |
| WO | WO 2013/172605 A1 | 11/2013 |
| WO | WO 2014/058696 A1 | 4/2014 |
| WO | WO 2014/088826 A1 | 6/2014 |
| WO | WO 2014/121153 A2 | 8/2014 |
| WO | WO 2014/144704 A1 | 9/2014 |
| WO | WO 2014/144778 A1 | 9/2014 |

(56) References Cited

FOREIGN PATENT DOCUMENTS

| | | |
|---|---|---|
| WO | WO 2014/150848 A1 | 9/2014 |
| WO | WO 2014/162094 A2 | 10/2014 |
| WO | WO 2014/188450 A1 | 11/2014 |
| WO | WO 2014/200829 A1 | 12/2014 |
| WO | WO 2015/021062 A1 | 2/2015 |
| WO | WO 2015/038983 A2 | 3/2015 |
| WO | WO 2015/042584 A1 | 3/2015 |
| WO | WO 2015/061194 A1 | 4/2015 |
| WO | WO 2016/057764 A1 | 4/2016 |
| WO | WO 2017/019944 A1 | 2/2017 |
| WO | WO 2017/030932 A1 | 2/2017 |
| WO | WO 2017/030937 A1 | 2/2017 |
| WO | WO 2017/030941 A1 | 2/2017 |
| WO | WO 2017/044645 A1 | 3/2017 |
| WO | WO 2017/044668 A1 | 3/2017 |
| WO | WO 2017/127607 A1 | 7/2017 |
| WO | WO 2017/147113 A1 | 8/2017 |
| WO | WO 2018/075637 A1 | 4/2018 |
| WO | WO 2018/084246 A1 | 5/2018 |
| WO | WO 2019/097261 A1 | 5/2019 |

OTHER PUBLICATIONS

Office Action for AU Application No. 2016298326 dated Aug. 6, 2021.

Office Communication for Indian Patent Application No. 201817005629 dated Feb. 25, 2020.

Extended European Search Report for EP App. No. 16831402.9 dated Mar. 25, 2019.

International Search Report and Written Opinion dated Oct. 14, 2016 for PCT/US16/44663.

International Preliminary Report on Patentability dated Feb. 8, 2018 for PCT/US16/44663.

[No Author Listed], 13.5 Colligative Properties. Prentice Hall. Accessed Jul. 9, 2019 as available Aug. 23, 2012 from <https://web.archive.org/web/20120823004120/http://wps.prenhall.com/wps/media/objects/3082/3156628/blb1305.html>. 10 pages.

[No Author Listed], Accepta 4360 Material Safety Data Sheet. Accepta Ltd. Manchester, UK. Jul. 19, 2011. 5 pages.

[No Author Listed], Caustic Soda 50% Material Safety Data Sheet. Univar. Redmond, Washington. Apr. 8, 2013. 10 pages.

[No Author Listed], Color Removal Using Ozone. Spartan Environmental Technologies Air and Water Treatment—Technical Bulletin. Available Jul. 21, 2006. Last accessed Mar. 2, 2017 from <http://www.spartanwatertreatment.com/ozone-color-removal.html>. 2 pages.

[No Author Listed], Everything you want to know about Coagulation & Flocculation. Chapter 1: The Electrokinetic Connection. Zeta-Meter, Inc. Staunton, VA. 4th Edition. 1993:1-8.

[No Author Listed], F0 Plant Completes 1-Year of Operation. Water Desalination Report Nov. 15, 2010:2 pages.

[No Author Listed], Forward Osmosis. Wikipedia. Accessed Jul. 9, 2019 as available May 5, 2007 from <https://web.archive.org/web/20080317095053/https://en.wikipedia.org/wiki/Forward_osmosis>. 3 pages.

[No Author Listed], Hi-Cal Hydrate Material Safety Data Sheet. Chemical Lime Co. Fort Worth, Texas. May 1, 2008. 6 pages.

[No Author Listed], Landfill Leachate Treatment. Osmotek, Inc. Corvallis, OR. Accessed Jul. 9, 2019 as available Oct. 9, 2007 from <https://web.archive.org/web/20071009130111/http://www.rimnetics.com/OSMOTEK%20BROCHURE.pdf>. 7 pages.

[No Author Listed], Polyaluminum Chloride Solution Material Safety Data Sheet. GEO Specialty Chemicals, Ltd. Little Rock, Arkansas. Mar. 12, 2015. 11 pages.

[No Author Listed], Servco 1010 Material Safety Data Sheet. Servco Chemicals. Lubbock, Texas. Aug. 7, 2013. 4 pages.

[No Author Listed], Soda Ash Material Safety Data Sheet. Univar. Redmond, Washington. Apr. 7, 2003. 10 pages.

Achilli et al., Selection of inorganic-based draw solutions for forward osmosis applications. Journal of Membrane Science. 2010;364:233-41. Epub Aug. 14, 2010.

Akram et al., Energy Utilization of Brine from an MSF Desalination Plant by Pressure Retarded Osmosis. The International Desalination Association World Congress on Desalination and Water Reuse. Tianjin, China. Oct. 2013. 12 pages.

Al-Hallaj et al., Solar desalination with a humidification-dehumidification cycle: performance of the unit. Desalination. 1998;120:273-80.

Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhsl/>. 2 pages.

Aramco, Saudi Aramco's 'Smart Water' May Aid Oil Production. Rigzone. Jul. 29, 2009. <http://www.rigzone.com/news/article_pf.asp?a_id=78707> Last accessed Jul. 30, 2015. 1 page.

Arthur et al., Technical Summary of Oil & Gas Produced Water Treatment Technologies. All Consulting, LLC (Mar. 2005). Last accessed on Dec. 21, 2016 from <http://dvikan.no/ntnu-studentserver/reports/ALLConsulting-WaterTreatmentOptionsReport.pdf>. 53 pages.

Banchik et al., Thermodynamic Analysis of a Reverse Osmosis Desalination System Using Forward Osmosis for Energy Recovery. Proceedings of the ASME 2012 International Mechanical Engineering Congress & Exposition. American Society of Mechanical Engineers. Houston, Texas. Nov. 9-15, 2012. 13 pages.

Beasley et al., Analysis of a pressure driven absorption refrigeration cycle. International Journal of Energy Research. Jan./Mar. 1988;12(1):175-84.

Bruno, A Low-Energy Water Purifier. MIT Technology Review. Jan. 8, 2009:4 pages.

Burk, New Technology Spotlight. CaribDA News. 2012 Fall;2(4):6-7.

Cath et al., A Novel Hybrid Forward Osmosis Process for Drinking Water Augmentation Using Impaired Water and Saline Water Sources. WERC and Water Research Foundation. 2009:84 pages.

Cath et al., Forward osmosis: Principles, applications, and recent developments. Journal of Membrane Science. Sep. 15, 2006;281(1-2):70-87.

Chung et al., Forward osmosis processes: Yesterday, today and tomorrow. Desalination. 2012;287:78-81. Epub Jan. 11, 2011.

El-Dessouky et al., Multiple-effect evaporation desalination systems: thermal analysis. Desalination. 1999;125:259-76.

Ge et al., Exploration of polyelectrolytes as draw solutes in forward osmosis processes. Water Research. 2012;46:1318-26. Epub Dec. 27, 2011.

Global Water Intelligence, Water Desalination Report. Tom Pankratz, ed. Dec. 17, 2012;48(48):1-4.

Govindan, Thermal Design of Humidification Dehumidification Systems for Affordable and Small-scale Desalination. Doctoral Thesis. Massachusetts Institute of Technology. Sep. 2012. 286 pages.

Gude, Energy consumption and recovery in reverse osmosis. Desalination and Water Treatment. 2011;36(1-3):239-60.

Huang et al., The bridging force between colloidal particles in a polyelectrolyte solution. Langmuir. Nov. 27, 2012;28(47):16300-5. doi:10.1021/la303918p.

Khayet et al., Determination of surface and bulk pore sizes of flat-sheet and hollow-fiber membranes by atomic force microscopy, gas permeation and solute transport methods. Desalination. 2003;158:57-64.

Kim et al., Effect of PEG additive on membrane formation by phase inversion. Journal of Membrane Science. 1998;138:153-63.

Klausner et al., Evaporative heat and mass transfer for the diffusion driven desalination process. Heat Mass Transfer. 2006;42:528-36.

Kwak et al., New Insights on the Role of Multivalent Ions In Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.

Li, Experimental Analysis of Produced Water Desalination by a Humidification-Dehumidification Process. 2009. 62 pages.

(56) References Cited

OTHER PUBLICATIONS

Li, Mineral precipitation and deposition in cooling systems using impaired waters: mechanisms, kinetics, and inhibition. Dissertation defended Jul. 27, 2010. 224 pages.

McCutcheon et al., Influence of concentrative and dilutive internal concentration polarization on flux behavior in forward osmosis. Journal of Membrane Science. Nov. 2006;284(1-2):237-47.

McGinnis et al., Pilot demonstration of the NH3/CO2 forward osmosis desalination process on high salinity brines. Desalination. Mar. 2013;312:67-74. Supporting information included.

Miller et al., Forward Osmosis: A New Approach to Water Purification and Desalination. Sandia National Laboratories. Albuquerque, NM. Jul. 2006:51 pages.

Moghadasi et al., Scale deposits in porous media and their removal by EDTA injection. ECI Symposium Series. 2007. vol. RP5. Article 10. p. 57-70.

Narayan et al., The potential of solar-driven humidification-dehumidification desalination for small-scale decentralized water production. Renewable and Sustainable Energy Reviews. 2010;14:1187-1201.

Narayan et al., Thermal design of the humidification desalination system: an experimental investigation. International Journal of Heat and Mass Transfer. 2013;58:1-9.

Narayan et al., Thermodynamic balancing of the humidification dehumidification desalination system by mass extraction and injection. International Journal of Heat and Mass Transfer. 2013;57:756-70.

Riffat et al., Analysis of using centrifugal reverse osmosis in absorption refrigeration systems. Chartered Institute of Building Services Engineers. 2001 Conference. 5 pages.

Sahin, A Mathematical Model for Explanation of Ion Exchange of the Boric Acid Adsorption. Jour. Chem. Soc. Pak. 1998;20(1):12-8.

SINEX, EDTA—A molecule with a complex story. University of Bristol, School of Chemistry. <www.chm.bris.ac.uk/motm/edta/edtah.htm> (accessed Jan. 8, 2013). Aug. 1, 2007.

Thiel et al., Hybridization of Humidification-Dehumidification and Pressure Retarded Osmosis for Brine Concentration Applications. The International Desalination Association World Congress on Desalination and Water Reuse. San Diego, California. Aug.-Sep. 2015. 8 pages.

Tiraferri et al., Relating performance of thin-film composite forward osmosis membranes to support layer formation and structure. Journal of Membrane Science. Nov. 12, 2010;367:340-52.

Zamen et al., Improvement of solar humidification-dehumidification desalination using multi-stage process. 6 pages. Accessed Jun. 6, 2014.

Office Communication for CN Application No. 201680057000.2 dated Mar. 29, 2021.

Ma, Yaopin GMP Chejian Shixun Jiaocheng. China Medical Science Press. Jun. 2016;1:3 pages.

Office Communication for CN Application No. 201680057000.2 dated May 29, 2020.

Office Action for CN Application No. 201680057000.2 dated Oct. 29, 2021.

Office Action for SA Application No. 518390827 dated Sep. 12, 2021.

Office Action for CA Application No. 2,993,007 dated Apr. 22, 2022.

Office Action for SA Application No. 518390827 dated Apr. 7, 2022.

OSMOTIC DESALINATION METHODS AND ASSOCIATED SYSTEMS

RELATED APPLICATIONS

This application is a continuation of U.S. patent application Ser. No. 15/747,907 (issued as U.S. Pat. No. 10,518, 221), filed Jan. 26, 2018, which is a U.S. National Stage patent application based on International Patent Application No. PCT/US2016/044663, filed Jul. 29, 2016, which claims priority under 35 U.S.C. § 119(e) to U.S. Provisional Patent Application Ser. No. 62/198,413, filed Jul. 29, 2015, each of which is incorporated herein by reference in its entirety for all purposes.

TECHNICAL FIELD

Osmotic desalination methods and associated systems are generally described.

BACKGROUND

Membranes which are selectively permeable to solvent (for example, water) and impermeable to dissolved ions (for example, $Na^+$, $Cl^-$) have been used to desalinate aqueous feed solutions. In one such desalination process—generally referred to as forward osmosis—water is transported from a feed solution through the semi-permeable membrane using a solution on the permeate side of the membrane that has an osmotic pressure that is higher than the osmotic pressure of the feed solution. The driving force for separation in a forward osmosis process is the osmotic pressure gradient through the semi-permeable membrane; because the draw solution on one side of the membrane has a higher osmotic pressure than the feed solution on the other side of the membrane, water is drawn through the semi-permeable membrane from the feed solution to the draw solution to equalize the osmotic pressures of the feed and draw solutions.

Another type of membrane-based desalination is reverse osmosis desalination. In contrast to forward osmosis, reverse osmosis processes use an applied hydraulic pressure as the driving force for separation. The applied hydraulic pressure serves to counteract the osmotic pressure gradient that would otherwise favor water flux from low osmotic pressure to high osmotic pressure.

Membrane-based desalination systems have, to date, been limited by, for example, low efficiencies and have generally been limited to treating waters of relatively low salinities. Improved systems and methods for performing membrane-based desalination are desirable.

SUMMARY

Systems and methods for osmotic desalination are disclosed. Certain embodiments are related to the use of a combination of forward osmosis and reverse osmosis to produce a stream comprising a relatively high water purity relative to the water purity of an aqueous feed stream. The subject matter of the present invention involves, in some cases, interrelated products, alternative solutions to a particular problem, and/or a plurality of different uses of one or more systems and/or articles.

Certain embodiments are related to methods, such as methods of performing osmosis. According to some embodiments, the method comprises transporting an aqueous feed stream containing a suspended and/or emulsified immiscible phase and solubilized ions at a concentration of at least about 60,000 ppm across a first side of a first osmotic membrane; and transporting a first draw inlet stream across a second side of the first osmotic membrane, the first draw inlet stream having a higher osmotic pressure than an osmotic pressure of the aqueous feed stream such that water is transported from the aqueous feed stream through the first osmotic membrane to the first draw inlet stream to produce a first draw product stream having a lower osmotic pressure than the first draw inlet stream and a concentrated aqueous stream having a higher concentration of solubilized ions than the aqueous feed stream. Some such embodiments comprise directing the transport of the aqueous feed stream across the first osmotic membrane and/or the first draw inlet stream across the first osmotic membrane such that the following two ratios are within about 20% of each other: a ratio of a mass flow rate of the first draw inlet stream entering the first osmotic membrane to a mass flow rate of the aqueous feed stream entering the first osmotic membrane, and a ratio of the difference between the osmotic pressure of the aqueous feed stream entering the first osmotic membrane and the inlet pressure difference across the first osmotic membrane to the sum of the osmotic pressure of the first draw inlet stream entering the first osmotic membrane and the inlet pressure difference across the first osmotic membrane. Some such embodiments comprise transporting at least a portion of the first draw product stream from the second side of the first osmotic membrane across a first side of a second osmotic membrane; transporting a second draw inlet stream across a second side of the second osmotic membrane; and applying a hydraulic pressure to the first side of the second osmotic membrane such that water is transported from the first draw product stream through the second osmotic membrane to the second draw inlet stream to produce a second draw product stream having a lower osmotic pressure than the second draw inlet stream and a second concentrated aqueous stream having a higher osmotic pressure than the first draw product stream. Some such embodiments comprise directing the transport of the first draw product stream across the second osmotic membrane and/or the second draw inlet stream across the second osmotic membrane such that the following two ratios are within about 20% of each other: a ratio of a mass flow rate of the second draw inlet stream entering the second osmotic membrane to a mass flow rate of the first draw product stream entering the second osmotic membrane, and a ratio of the difference between the osmotic pressure of the first draw product stream entering the second osmotic membrane and the inlet pressure difference across the second osmotic membrane to the sum of the osmotic pressure of the second draw inlet stream entering the second osmotic membrane and the inlet pressure difference across the second osmotic membrane.

Certain embodiments comprise transporting an aqueous feed stream containing a suspended and/or emulsified immiscible phase and solubilized ions at a concentration of at least about 60,000 ppm across a first side of a first osmotic membrane; and transporting a first draw inlet stream across a second side of the first osmotic membrane, the first draw inlet stream having a higher osmotic pressure than an osmotic pressure of the aqueous feed stream such that water is transported from the aqueous feed stream through the first osmotic membrane to the first draw inlet stream to produce a first draw product stream having a lower osmotic pressure than the first draw inlet stream and a concentrated aqueous stream having a higher concentration of solubilized ions than the aqueous feed stream. Some such embodiments comprise directing the transport of the aqueous feed stream across the first osmotic membrane and/or the first draw inlet stream across the first osmotic membrane such that the transmembrane net driving force at the entrance of the aqueous feed stream to the first osmotic membrane and the transmembrane net driving force at the entrance of the first draw inlet stream to the first osmotic membrane are within about 10% of each other. Some such embodiments comprise transporting at least a portion of the first draw product stream from the second side of the first osmotic membrane across a first side of a second osmotic membrane; transporting a second draw inlet stream across a second side of the second osmotic membrane. Some such embodiments comprise applying a hydraulic pressure to the first side of the second osmotic membrane such that water is transported from the first draw product stream through the second osmotic membrane to the second draw inlet stream to produce a second draw product stream having a lower osmotic pressure than the second draw inlet stream and a second concentrated aqueous stream having a higher osmotic pressure than the first draw product stream; and directing the transport of the first draw product stream across the second osmotic membrane and/or the second draw inlet stream across the second osmotic membrane such that the transmembrane net driving force at the entrance of the first draw product stream to the second osmotic membrane and the transmembrane net driving force at the entrance of the second draw inlet stream across the second osmotic membrane are within about 10% of the each other.

According to certain embodiments, the method comprises transporting an aqueous feed stream containing a suspended and/or emulsified immiscible phase and solubilized ions at a concentration of at least about 60,000 ppm across a first side of a first osmotic membrane; transporting a first draw inlet stream across a second side of the first osmotic membrane, the first draw inlet stream having a higher osmotic pressure than an osmotic pressure of the aqueous feed stream such that water is transported from the aqueous feed stream through the first osmotic membrane to the first draw inlet stream to produce a first draw product stream having a lower osmotic pressure than the first draw inlet stream and a concentrated aqueous stream having a higher concentration of solubilized ions than the aqueous feed stream; and directing the transport of the aqueous feed stream across the first osmotic membrane and/or the first draw inlet stream across the first osmotic membrane such that the transmembrane net driving force at the entrance of the aqueous feed stream to the first osmotic membrane and the transmembrane net driving force at the entrance of the first draw inlet stream to the first osmotic membrane are at least about 10% different from each other. Some such embodiments comprise measuring at least one of a temperature, a pressure, a solubilized species concentration, and a flow rate of the aqueous feed stream and/or the first draw inlet stream; and changing at least one of the flow rate of the aqueous feed stream and the flow rate of the first draw inlet stream such that the transmembrane net driving force at the entrance of the aqueous feed stream to the first osmotic membrane and the transmembrane net driving force at the entrance of the first draw inlet stream to the first osmotic membrane are within about 10% of each other. Some such embodiments comprise transporting at least a portion of the first draw product stream from the second side of the first osmotic membrane across a first side of a second osmotic membrane; transporting a second draw inlet stream across a second side of the second osmotic membrane; applying a hydraulic pressure to the first side of the second osmotic membrane such that water is transported from the first draw product stream through the second osmotic membrane to the second draw inlet stream to produce a second draw product stream having a lower osmotic pressure than the second draw inlet stream and a second concentrated aqueous stream having a higher osmotic pressure than the first draw product stream; and directing the transport of the first draw product stream across the second osmotic membrane and/or the second draw inlet stream across the second osmotic membrane such that the transmembrane net driving force at the entrance of the first draw product stream to the second osmotic membrane and the transmembrane net driving force at the entrance of the second draw inlet stream to the second osmotic membrane are at least about 10% different from each other. Some such embodiments comprise measuring at least one of a temperature, a pressure, a solubilized species concentration, and a flow rate of the first draw product stream and/or the second draw inlet stream; and changing at least one of the flow rate of the first draw product stream and the flow rate of the second draw inlet stream such that the transmembrane net driving force at the entrance of the first draw product stream to the second osmotic membrane and the transmembrane net driving force at the entrance of the second draw inlet stream to the second osmotic membrane are within about 10% of each other.

According to certain embodiments, the method comprises transporting an aqueous feed stream containing a suspended and/or emulsified immiscible phase and solubilized ions at a concentration of at least about 60,000 ppm across a first side of a first osmotic membrane; transporting a first draw inlet stream across a second side of the first osmotic membrane, the first draw inlet stream having a higher osmotic pressure than an osmotic pressure of the aqueous feed stream such that water is transported from the aqueous feed stream through the first osmotic membrane to the first draw inlet stream to produce a first draw product stream having a lower osmotic pressure than the first draw inlet stream and a concentrated aqueous stream having a higher concentration of solubilized ions than the aqueous feed stream; transporting at least a portion of the first draw product stream from the second side of the first osmotic membrane across a first side of a second osmotic membrane; transporting a second draw inlet stream across a second side of the second osmotic membrane; and applying a hydraulic pressure to the first side of the second osmotic membrane such that water is transported from the first draw product stream through the second osmotic membrane to the second draw inlet stream to produce a second draw product stream having a lower osmotic pressure than the second draw inlet stream and a second concentrated aqueous stream having a higher osmotic pressure than the first draw product stream. In some such embodiments, the first osmotic membrane is operated such that:

$$\frac{m_{D1,i}}{m_{F1,i}} = C_1 \frac{\pi_{F1,i} - (P_{F1} - P_{D1})}{\pi_{D1,i} + (P_{F1} - P_{D1})}$$

wherein $P_{F1}$ is a hydraulic pressure at an inlet of the aqueous feed stream to the first osmotic membrane; $m_{F1,i}$ is a mass flow rate of the aqueous feed stream at the inlet of the aqueous feed stream to the first osmotic membrane; $\pi_{F1,i}$ is an osmotic pressure of the aqueous feed stream at the inlet of the aqueous feed stream to the first osmotic membrane; $P_{D1}$ is a hydraulic pressure at an inlet of the first draw inlet stream to the first osmotic membrane; $m_{D1,i}$ is a mass flow rate of the first draw inlet stream at the inlet of the first draw inlet stream to the first osmotic membrane; $\pi_{D1,i}$ is an osmotic pressure of the first draw inlet stream at the inlet of the first draw inlet stream to the first osmotic membrane; and $C_1$ is from about 0.8 to about 1.2; and the second osmotic membrane is operated such that:

$$\frac{m_{D2,i}}{m_{F2,i}} = C_2 \frac{\pi_{F2,i} - (P_{F2} - P_{D2})}{\pi_{D2,i} + (P_{F2} - P_{D2})}$$

wherein $P_{F2}$ is a hydraulic pressure at an inlet of the first draw product stream to the second osmotic membrane; $m_{F2,i}$ is a mass flow rate of the first draw product stream at the inlet of the first draw product stream to the second osmotic membrane; $\pi_{F2,i}$ is an osmotic pressure of the first draw product stream at the inlet of the first draw product stream to the second osmotic membrane; $P_{D2}$ is a hydraulic pressure at an inlet of the second draw inlet stream to the second osmotic membrane; $m_{D2,i}$ is a mass flow rate of the second draw inlet stream at the inlet of the second draw inlet stream to the second osmotic membrane; $\pi_{D2,i}$ is an osmotic pressure of the second draw inlet stream at the inlet of the second draw inlet stream to the second osmotic membrane; and $C_2$ is from about 0.8 to about 1.2.

In some embodiments, the method comprises transporting an aqueous feed stream containing solubilized ions across a first side of a first osmotic membrane; transporting a first draw inlet stream across a second side of the first osmotic membrane, the first draw inlet stream having a higher osmotic pressure than an osmotic pressure of the aqueous feed stream such that water is transported from the aqueous feed stream through the first osmotic membrane to the first draw inlet stream to produce a first draw product stream having a lower osmotic pressure than the first draw inlet stream and a concentrated aqueous stream having a higher concentration of solubilized ions than the aqueous feed stream; transporting at least a portion of the first draw product stream from the second side of the first osmotic membrane across a first side of a second osmotic membrane; transporting a second draw inlet stream across a second side of the second osmotic membrane; and applying a hydraulic pressure to the first side of the second osmotic membrane such that water is transported from the first draw product stream through the second osmotic membrane to the second draw inlet stream to produce a second draw product stream having a lower osmotic pressure than the second draw inlet stream and a second concentrated aqueous stream having a higher osmotic pressure than the first draw product stream.

The method comprises, according to certain embodiments, transporting an aqueous feed stream across a first side of an osmotic membrane; and transporting a draw inlet stream across a second side of the osmotic membrane such that water is transported from the aqueous feed stream through the osmotic membrane to the draw inlet stream to produce a draw product stream having a lower osmotic pressure than the draw inlet stream and a concentrated aqueous stream having a higher osmotic pressure than the aqueous feed stream; wherein the osmotic membrane is operated such that:

$$\frac{m_{D,i}}{m_{F,i}} = C_1 \frac{\pi_{F,i} - (P_F - P_D)}{\pi_{D,i} + (P_F - P_D)}$$

wherein $P_F$ is a hydraulic pressure at an inlet of the aqueous feed stream to the osmotic membrane; $m_{F,i}$ is a mass flow rate of the aqueous feed stream at the inlet of the aqueous feed stream to the osmotic membrane; $\pi_{F1,i}$ is an osmotic pressure of the aqueous feed stream at the inlet of the aqueous feed stream to the osmotic membrane; $P_D$ is a hydraulic pressure at an inlet of the draw inlet stream to the osmotic membrane; $m_{D,i}$ is a mass flow rate of the draw inlet stream at the inlet of the draw inlet stream to the osmotic membrane; $\pi_{D,i}$ is an osmotic pressure of the draw inlet stream at the inlet of the draw inlet stream to the osmotic membrane; and C is from about 0.8 to about 1.2.

According to certain embodiments, the method comprises transporting an aqueous feed stream across a first side of an osmotic membrane; transporting a draw inlet stream across a second side of the osmotic membrane such that water is transported from the aqueous feed stream through the osmotic membrane to the draw inlet stream to produce a draw product stream having a lower osmotic pressure than the draw inlet stream and a concentrated aqueous stream having a higher osmotic pressure than the aqueous feed stream; and directing the transport of the aqueous feed stream across the osmotic membrane and/or the draw inlet stream across the osmotic membrane such that the following two ratios are within about 20% of each other: a ratio of a mass flow rate of the draw inlet stream entering the osmotic membrane to a mass flow rate of the aqueous feed stream entering the osmotic membrane, and a ratio of the difference between the osmotic pressure of the aqueous feed stream entering the osmotic membrane and the inlet pressure difference across the osmotic membrane to the sum of the osmotic pressure of the draw inlet stream entering the osmotic membrane and the inlet pressure difference across the osmotic membrane.

The method comprises, according to some embodiments, transporting an aqueous feed stream across a first side of an osmotic membrane; transporting a draw inlet stream across a second side of the osmotic membrane such that water is transported from the aqueous feed stream through the osmotic membrane to the draw inlet stream to produce a draw product stream having a lower osmotic pressure than the draw inlet stream and a concentrated aqueous stream having a higher osmotic pressure than the aqueous feed stream; and directing the transport of the aqueous feed stream across the osmotic membrane and/or the draw inlet stream across the osmotic membrane such that the transmembrane net driving force at the entrance of the aqueous feed stream to the osmotic membrane and the transmembrane net driving force at the entrance of the draw inlet stream to the osmotic membrane are within about 10% of each other.

The method comprises, according to certain embodiments, transporting an aqueous feed stream across a first side of an osmotic membrane; transporting a draw inlet stream across a second side of the osmotic membrane such that water is transported from the aqueous feed stream through the osmotic membrane to the draw inlet stream to produce a draw product stream having a lower osmotic pressure than the draw inlet stream and a concentrated aqueous stream having a higher osmotic pressure than the aqueous feed stream; directing the transport of the aqueous feed stream across the osmotic membrane and/or the draw inlet stream across the osmotic membrane such that the transmembrane net driving force at the entrance of the aqueous feed stream to the osmotic membrane and the transmembrane net driving force at the entrance of the draw inlet stream to the osmotic membrane are at least about 10% different from each other;

measuring at least one of a temperature, a pressure, a solubilized species concentration, and a flow rate of the aqueous feed stream and/or the draw inlet stream; and changing at least one of the flow rate of the aqueous feed stream and the flow rate of the draw inlet stream such that the transmembrane net driving force at the entrance of the aqueous feed stream to the osmotic membrane and the transmembrane net driving force at the entrance of the draw inlet stream to the osmotic membrane are within about 10% of each other.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
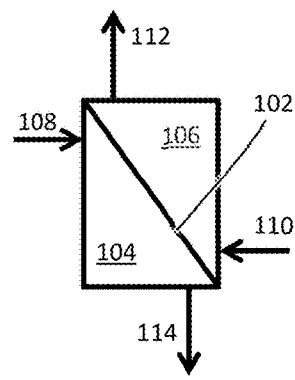
FIG. 1A is a schematic illustration of an osmotic membrane separator, according to certain embodiments.

Disclosed herein are osmotic desalination methods and associated systems. According to certain embodiments, multiple osmotic membrane separators may be used to perform a series of osmosis steps, such that an output stream having a relatively high water purity—compared to a water purity of an aqueous feed stream—is produced. In some embodiments, multiple draw streams can be used to produce aqueous product streams having sequentially higher purities of water.

Certain embodiments are related to osmotic desalination systems and methods in which forward osmosis is used to produce a first product stream having a relatively high water purity relative to an aqueous feed stream, and reverse osmosis is used to perform a second step (and/or additional steps) on the first product stream. The use of forward osmosis as an initial step—which is generally not prone to fouling—can allow one to shield downstream reverse osmosis processes from fouling-causing contaminants. According to certain embodiments, the use of reverse osmosis in subsequent, downstream steps can also allow one to take advantage of the low energy consumption of reverse osmosis relative to, for example, thermal desalination processes such as thermal evaporation/distillation. Employing combinations of forward and reverse osmosis steps in this way can, according to certain embodiments, produce a low-energy, low-fouling desalination system that produces a product stream with a high water purity (and low salinity) relative to an aqueous feed stream.

In some embodiments, multiple reverse osmosis steps can be used in series as part of a system to perform net desalination (i.e., to produce a product stream having a relatively high purity of water compared to the purity of water in an inlet aqueous stream). In some such embodiments, rather than achieving a relatively high water purity through the use of a single membrane, multiple steps can be performed, each achieving a relatively small increase in purity to produce a final product that contains a higher purity of water than the aqueous feed stream. Such arrangements may be useful, for example, when desalinating aqueous feed streams with very high osmotic pressures (e.g., osmotic pressures of 60 bar, or greater). As an exemplary, non-limiting illustration, if one desires to desalinate an aqueous feed stream with an osmotic pressure of 60 bar using a single osmotic membrane, one would need to use a mechanically robust osmotic membrane capable of withstanding very high hydraulic pressures (e.g., above 60 bar). Such membranes are typically difficult and expensive to manufacture. Certain embodiments employ the recognition that the use of multiple reverse osmosis membranes, each operated using relatively low hydraulic pressure gradients, can be used to perform a stepwise process in which each reverse osmosis step gradually increases the purity of water until the desired final level of water purity is achieved.

Certain embodiments relate to systems and methods in which strategies are employed to reduce energy consumption in osmotic desalination systems. According to certain embodiments, the osmotic desalination membrane(s) can be operated such that the transmembrane net driving force (i.e., the net driving force through the thickness of the membrane) is relatively uniform across the facial area of the membrane(s). Such uniformity may, according to certain embodiments, reduce or eliminate unnecessary over-pressurization along the osmotic membrane, which can in turn reduce or eliminate wasted energy during operation of the system.

As described in more detail below, certain of the systems and methods described herein can be used to treat a wide variety of aqueous feed streams, including but not limited to streams derived from seawater, ground water, brackish water, and/or the effluent of a chemical process. In certain embodiments, the aqueous feed stream contains a relatively large amount of solubilized ions, for example, at a concentration of at least about 60,000 ppm. In certain embodiments, the aqueous feed contains, in addition to ions solubilized in water, a suspended and/or emulsified phase that is immiscible in water (e.g., oil and/or grease).

Figure 1B:
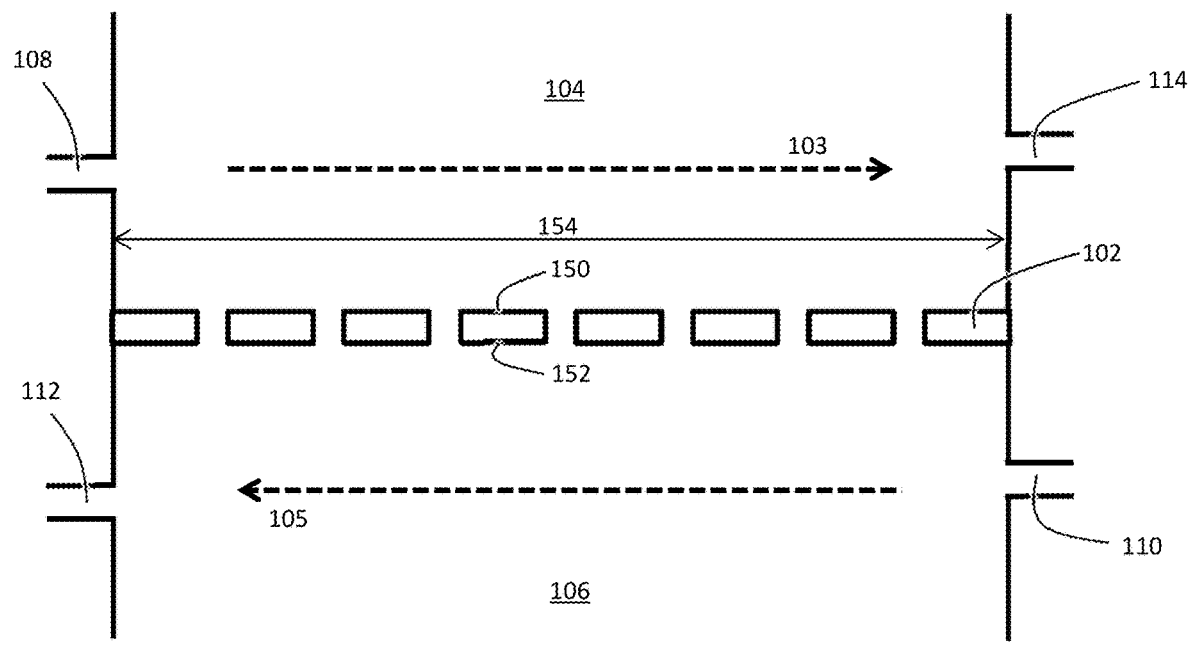
FIG. 1B is a cross-sectional illustration of the osmotic membrane separator shown in FIG. 1A.

Certain embodiments are related to the use of osmotic membrane-based systems to perform desalination. FIG. 1A is an exemplary schematic diagram illustrating the use of an osmotic membrane separator to desalinate an aqueous feed stream. FIG. 1B is a cross-sectional illustration of the schematic shown in FIG. 1A.

In FIGS. 1A-1B, osmotic membrane 102 can be used to transport water from first side 104 to second side 106. In some cases, this may result in at least partial separation of water within aqueous feed stream 108 from solubilized ions (or other solubilized species) within aqueous feed stream 108. Aqueous feed stream 108 can be transported across first side 104 of osmotic membrane 102, for example, in the direction of arrow 103 in FIG. 1B. Draw inlet stream 110 can, in some embodiments, be transported across second side 106 of osmotic membrane 102, for example, in the direction of arrow 105 in FIG. 1B.

Transport of water through the osmotic membrane can be achieved via a transmembrane net driving force (i.e., a net driving force through the thickness of the membrane), according to certain embodiments. Generally, the transmembrane net driving force ($\Delta_\chi$) is expressed as:

$$\Delta_\chi = \Delta P - \Delta \Pi = (P_1 - P_2) - (\Pi_1 - \Pi_2) \quad [1]$$

wherein $P_1$ is the hydraulic pressure on the first (retentate) side of the osmotic membrane, $P_2$ is the hydraulic pressure on the second (permeate) side of the osmotic membrane, $\Pi_1$ is the osmotic pressure of the stream on the first (retentate) side of the osmotic membrane, and $\Pi_2$ is the osmotic pressure of the stream on the second (permeate) side of the osmotic membrane. $(P_1-P_2)$ can be referred to as the transmembrane hydraulic pressure gradient, and $(\Pi_1-\Pi_2)$ can be referred to as the transmembrane osmotic pressure gradient.

Those of ordinary skill in the art are familiar with the concept of osmotic pressure. The osmotic pressure of a particular liquid is an intrinsic property of the liquid. The osmotic pressure can be determined in a number of ways, with the most efficient method depending upon the type of liquid being analyzed. For certain solutions with relatively low molar concentrations of ions, osmotic pressure can be accurately measured using an osmometer. In other cases, the osmotic pressure can simply be determined by comparison with solutions with known osmotic pressures. For example, to determine the osmotic pressure of an uncharacterized solution, one could apply a known amount of the uncharacterized solution on one side of a non-porous, semi-permeable, osmotic membrane and iteratively apply different solutions with known osmotic pressures on the other side of the osmotic membrane until the differential pressure through the thickness of the membrane is zero.

The osmotic pressure ($\Pi$) of a solution containing n solubilized species may be estimated as:

$$\Pi = \sum_{j=1}^{n} i_j M_j RT \quad [2]$$

wherein $i_j$ is the van't Hoff factor of the $j^{th}$ solubilized species, $M_j$ is the molar concentration of the $j^{th}$ solubilized species in the solution, R is the ideal gas constant, and T is the absolute temperature of the solution. Equation 2 generally provides an accurate estimate of osmotic pressure for liquid with low concentrations of solubilized species (e.g., concentrations at or below between about 4 wt % and about 6 wt %). For many liquid comprising solubilized species, at species concentrations above around 4-6 wt %, the increase in osmotic pressure per increase in salt concentration is greater than linear (e.g., slightly exponential).

Certain of the osmotic membrane separators described herein can be used to perform forward osmosis. Forward osmosis generally occurs when the osmotic pressure on the second (permeate) side of the osmotic membrane is greater than the osmotic pressure on the first (retentate) side of the osmotic membrane such that water is transported from the first side of the osmotic membrane to the second side of the osmotic membrane. In forward osmosis systems, water generally is transported from the first side of the osmotic membrane to the second side of the osmotic membrane as long as the hydraulic pressure difference between the second side of the osmotic membrane and the first side of the osmotic membrane is not sufficiently high to overcome the osmotic pressure difference between the first and second sides of the osmotic membrane. In this way, the permeate flow and the osmotic driving force are aligned in the same direction. In forward osmosis arrangements, the stream on the second side of the osmotic membrane can initiate the transport of water from the stream of the first side of the osmotic membrane through the osmotic membrane from the first side to the second side, resulting in the production of a stream having a higher osmotic pressure (e.g., more concentrated in solubilized species (e.g., dissolved ions and/or disassociated molecules)) relative to the aqueous feed stream. For example, referring to FIGS. 1A-1B, osmotic membrane 102 can be used to perform forward osmosis, for example, when the osmotic pressure on second side 106 is higher than the osmotic pressure on first side 104, and the hydraulic pressure gradient from second side 106 to first side 104 ($P_{106}-P_{104}$) is not large enough to overcome the difference in the osmotic pressures on first side 104 and second side 106. In such cases, water can be transported from first side 104 of osmotic membrane 102 to second side 106 of osmotic membrane 102. This can result, according to certain embodiments, in the production of stream 114, which can have a higher osmotic pressure than the osmotic pressure of stream 108. In certain embodiments in which stream 108 contains solubilized species (e.g., ions), the forward osmosis process can result in the production of concentrated aqueous stream 114, which can contain solubilized species (e.g., ions) at a molar concentration greater than the molar concentration of solubilized species (e.g., ions) in stream 108. In addition, the forward osmosis process can result, according to some embodiments, in the production of draw product stream 112, which can have a lower osmotic pressure than the osmotic pressure of stream 110. For example, when solubilized species are used in the draw stream, the draw product stream 112 can contain the solubilized species (e.g., ions) at a lower molar concentration than the molar concentration of solubilized species (e.g., ions) within stream 110.

In some cases, pressure may be applied to enhance the forward osmosis process. For example, in some instances in which the stream on the first side of the osmotic membrane has a lower osmotic pressure than the stream on the second side of the osmotic membrane, pressure may be applied to the first side of the osmotic membrane such that the hydraulic pressure of the stream on the first side of the osmotic membrane is higher than the hydraulic pressure of the stream on the second side of the osmotic membrane. The applied pressure can increase the rate at which water is transported from the first side of the osmotic membrane to the second side of the osmotic membrane. Such arrangements are sometimes referred to herein as pressure-assisted forward osmosis. Of course, the use of an applied pressure to enhance forward osmosis is not generally required, and in some embodiments, forward osmosis is performed in the substantial absence of an applied pressure (e.g., such that the hydraulic pressure gradient through the osmotic membrane is less than or equal to about 0.1 bar).

Osmotic membranes can be used, according to certain embodiments, to perform reverse osmosis. Reverse osmosis generally occurs when the osmotic pressure on the first (retentate) side of the osmotic membrane is greater than the osmotic pressure on the second (permeate) side of the osmotic membrane, and a pressure is applied to the first side of the osmotic membrane such that the hydraulic pressure on the first side of the osmotic membrane is sufficiently greater than the hydraulic pressure on the second side of the osmotic membrane to cause water to be transported from the first side of the osmotic membrane to the second side of the osmotic membrane. Generally, such situations result when the transmembrane hydraulic pressure gradient ($P_1-P_2$) is greater than the transmembrane osmotic pressure gradient ($\Pi_1-\Pi_2$) such that water is transported from the first side of the osmotic membrane to the second side of the osmotic membrane (rather than having water transported from the second side of the osmotic membrane to the first side of the osmotic membrane, which would be energetically favored in the absence of the pressure applied to the first side of the osmotic membrane). Referring to FIGS. 1A-1B, osmotic membrane 102 can be used to perform reverse osmosis, for example, when the osmotic pressure on first side 104 is higher than the osmotic pressure on second side 106, a pressure is applied to first side such that the hydraulic pressure on first side 104 is higher than the hydraulic pressure on second side 106, and the difference between the hydraulic pressure on first side 104 and the hydraulic pressure on second side 106 is greater than the difference between the osmotic pressure on side 104 and the osmotic pressure on side 106. In such cases, water can be transported from first side 104 of osmotic membrane 102 to second side 106 of osmotic membrane 102. This can result, according to certain embodiments, in the production of stream 114, which can have a higher osmotic pressure than stream 108. For example, when solubilized species (e.g., ions) are employed in stream 108, the reverse osmosis process can result, according to certain embodiments, in the production of concentrated aqueous stream 114, which can contain solubilized species (e.g., ions) at a molar concentration greater than the molar concentration of solubilized species (e.g., ions) in stream 108. In addition, this can result, according to some embodiments, in the production of draw product stream 112, which can have a lower osmotic pressure than the osmotic pressure of stream 110. For example, when solubilized species (e.g., ions) are employed in draw inlet stream 110, according to some embodiments, the reverse osmosis process can result in the production of draw product stream 112, which can contain solubilized species (e.g., ions) at a lower molar concentration than the molar concentration of solubilized species (e.g., ions) within stream 110.

Figure 2A:
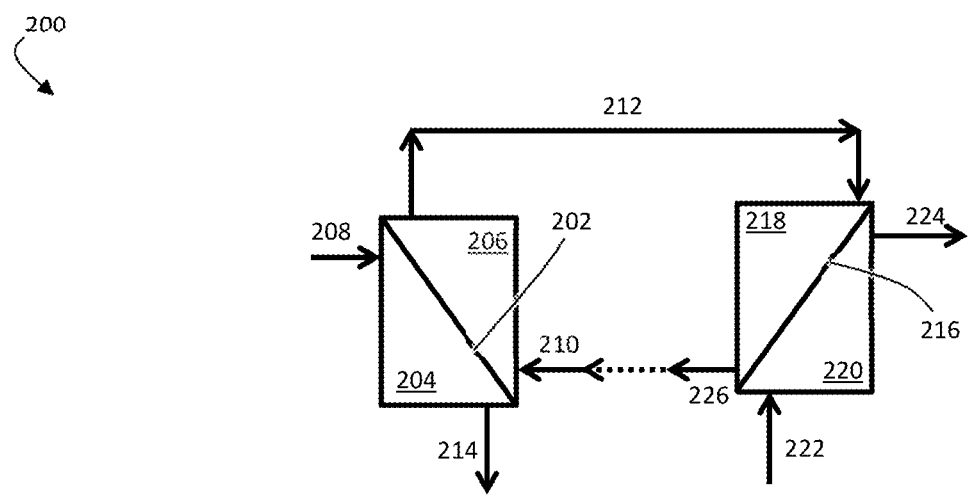
FIG. 2A is a schematic illustration of an exemplary osmotic desalination system, according to certain embodiments.

Certain embodiments are related to desalination systems and methods comprising an initial forward osmosis desalination step and one or more downstream reverse osmosis steps. FIG. 2A is a schematic illustration of an exemplary desalination system 200, according to certain embodiments. In FIG. 2A, desalination system 200 comprises first osmotic membrane 202, which has first side 204 and second side 206. Desalination system 200 also comprises second osmotic membrane 216, which has first side 218 and second side 220. According to certain embodiments, the first osmotic membrane can be used to perform a first osmosis step, and the second osmotic membrane can be used to perform a second osmosis step. For example, in some embodiments, first osmotic membrane 202 can be used to perform a first osmosis step (e.g., a forward osmosis step), and second osmotic membrane 216 can be used to perform a second osmosis step (e.g., a reverse osmosis step).

Certain embodiments comprise transporting an aqueous feed stream containing solubilized ions across a first side of a first osmotic membrane. For example, referring to FIG. 2A, in some embodiments, aqueous feed stream 208 containing solubilized ions can be transported across first side 204 of first osmotic membrane 202. Some embodiments comprise transporting a first draw inlet stream across a second side of the first osmotic membrane. For example, referring to FIG. 2A, in certain embodiments, first draw inlet stream 210 can be transported across second side 206 of first osmotic membrane 202.

In some embodiments, the first draw inlet stream has a higher osmotic pressure than the osmotic pressure of the aqueous feed stream (e.g., due to a higher molar concentration of total solubilized species within the first draw inlet stream than in the aqueous feed stream). In some such embodiments, the osmotic pressure of the first draw inlet stream is higher than the osmotic pressure of the aqueous feed stream such that water is transported from the aqueous feed stream through the first osmotic membrane to the first draw inlet stream. In some such embodiments, this process can produce a first draw product stream having a lower osmotic pressure than the first draw inlet stream (e.g., due to a lower molar concentration of solubilized species in the first draw product stream than in the first draw inlet stream). In some cases, the process can also produce a concentrated aqueous stream having a higher molar concentration of solubilized ions than the aqueous feed stream. For example, in FIG. 2A, first draw inlet stream 210 can, in some embodiments, have an osmotic pressure that is sufficiently high such that water is transported from aqueous feed stream 208 through first osmotic membrane 202 to first draw inlet stream 210. Transport of water through osmotic membrane 202 can result in the production of first draw product stream 212 having a lower osmotic pressure than first draw inlet stream 210 (e.g., due to a lower molar concentration of solubilized species (e.g., ions) within draw product stream 212 than in draw inlet stream 210). Transport of water through osmotic membrane 202 can also result in the production of concentrated aqueous stream 214 having a higher molar concentration of solubilized ions than aqueous feed stream 208.

Figure 2B:
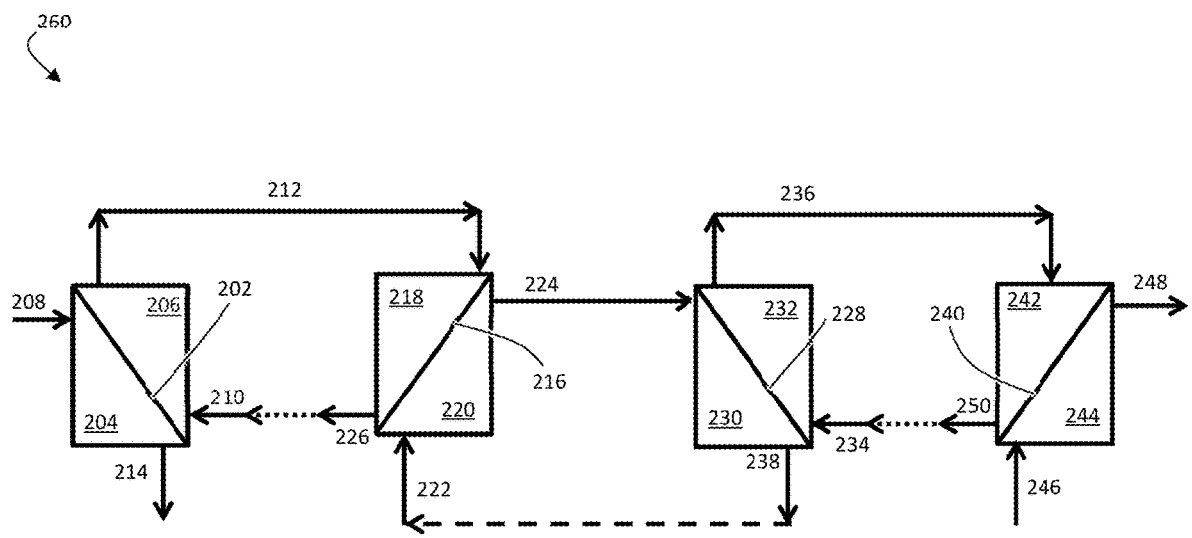
FIG. 2B is, according to some embodiments, a schematic illustration of an osmotic desalination system.

In certain embodiments, the concentrated aqueous stream (e.g., 214 in FIGS. 2A-2B) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the aqueous feed stream (e.g., stream 208 in FIGS. 2A-2B).

In some embodiments, the concentrated aqueous stream (e.g., 214 in FIGS. 2A-2B) can have a weight percentage of solubilized species (e.g., ions) that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the weight percentage of solubilized species (e.g., ions) in the aqueous feed stream (e.g., stream 208 in FIGS. 2A-2B). For example, referring to FIGS. 2A-2B, in some embodiments, first aqueous feed stream 208 can have a solubilized ion concentration of 10 wt % and first concentrated aqueous stream 214 can have a solubilized ion concentration of 20 wt %, which is 2 times the weight percentage of solubilized ions in the first aqueous feed stream.

In certain embodiments, the first draw inlet stream (e.g., stream 210 in FIGS. 2A-2B) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the first draw product stream (e.g., stream 212 in FIGS. 2A-2B).

In certain embodiments, the first draw inlet stream (e.g., stream 210 in FIGS. 2A-2B) can have a weight percentage of solubilized species (e.g., ions) that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the weight percentage of solubilized ions in the first draw product stream (e.g., stream 212 in FIGS. 2A-2B). For example, referring to FIGS. 2A-2B, in some embodiments, first draw product stream 212 can have a solubilized ion concentration of 12 wt % and first draw inlet stream 210 can have a solubilized ion concentration of 20 wt %, which is 1.67 times the weight percentage of solubilized ions in the first draw product stream.

In certain embodiments, the first osmotic membrane separator can be operated as a forward osmosis membrane separator. For example, in some embodiments, the osmotic pressure of the stream on the first side of the first osmotic membrane can be lower than the osmotic pressure of the stream on the second side of the first osmotic membrane such that water is transported from the first side of the first osmotic membrane to the second side of the first osmotic membrane, at least in part, due to the transmembrane osmotic pressure difference. In some embodiments, the forward osmosis process can be carried out in the substantial absence of an applied hydraulic pressure on the first side of the osmotic membrane. For example, referring to FIG. 2A, in some embodiments, forward osmosis can be performed using osmotic membrane 202 (e.g., as described above) in the substantial absence of a hydraulic pressure applied to the liquid on first side 204 of osmotic membrane 202. In other cases, the forward osmosis process can be a pressure-assisted forward osmosis process, in which a substantial hydraulic pressure is applied to the first side of the osmotic membrane. For example, referring to FIG. 2A, in some embodiments, forward osmosis can be performed using osmotic membrane 202 (e.g., as described above) while a hydraulic pressure is applied to the liquid on first side 204 of osmotic membrane 202.

Certain embodiments comprise transporting at least a portion of the first draw product stream from the second side of the first osmotic membrane across a first side of a second osmotic membrane. For example, referring to FIG. 2A, in some embodiments, at least a portion of first draw product stream 212 can be transported across first side 218 of the second osmotic membrane 216. Some embodiments comprise transporting a second draw inlet stream across a second side of the second osmotic membrane. For example, in the exemplary embodiment shown in FIG. 2A, second draw inlet stream 222 can be transported across second side 220 of second osmotic membrane 216.

Certain embodiments comprise applying a hydraulic pressure to the first side of the second osmotic membrane such that water is transported from the first draw product stream through the second osmotic membrane to the second draw inlet stream to produce a second draw product stream having a lower osmotic pressure (e.g., due to a lower molar concentration of solubilized species (e.g., ions)) than the second draw inlet stream and a second concentrated aqueous stream having a higher osmotic pressure (e.g., due to a higher molar concentration of solubilized species (e.g., ions)) than the first draw product stream. For example, referring to FIG. 2A, in some embodiments, a hydraulic pressure is applied to first side 218 of second osmotic membrane 216 such that water is transported from first draw product stream 212 through second osmotic membrane 216 to second draw inlet stream 222 to produce second draw product stream 224 having a lower osmotic pressure (e.g., due to a lower molar concentration of solubilized species (e.g., ions)) than second draw inlet stream 222 and second concentrated aqueous stream 226 having a higher osmotic pressure (e.g., due to a higher molar concentration of solubilized species (e.g., ions)) than first draw product stream 212.

In some embodiments, the second concentrated aqueous stream (e.g., 226 in FIGS. 2A-2B) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the first draw product stream (e.g., stream 212 in FIGS. 2A-2B).

In some embodiments, the second concentrated aqueous stream (e.g., 226 in FIGS. 2A-2B) can have a weight percentage of solubilized species (e.g., ions) that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the weight percentage of solubilized species (e.g., ions) in the first draw product stream (e.g., stream 212 in FIGS. 2A-2B). For example, referring to FIGS. 2A-2B, in some embodiments, first draw product stream 212 can have a solubilized ion concentration of 12 wt % and second concentrated aqueous stream 226 can have a solubilized ion concentration of 22 wt %, which is 1.83 times the weight percentage of solubilized ions in the first draw product stream.

In certain embodiments, the second draw inlet stream (e.g., stream 222 in FIGS. 2A-2B) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the second draw product stream (e.g., stream 224 in FIGS. 2A-2B).

In certain embodiments, the second draw inlet stream (e.g., stream 222 in FIGS. 2A-2B) can have a weight percentage of solubilized species (e.g., ions) that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the weight percentage of solubilized species (e.g., ions) in the second draw product stream (e.g., stream 224 in FIGS. 2A-2B). For example, referring to FIGS. 2A-2B, in some embodiments, second draw product stream 224 can have a solubilized ion concentration of 10 wt % and second draw inlet stream 222 can have a solubilized ion concentration of 20 wt %, which is 2 times the weight percentage of solubilized ions in the second draw product stream.

The second osmotic membrane separator can be operated as a reverse osmosis membrane separator, according to certain embodiments. That is to say, in some embodiments, water can be transported from the first side of the second osmotic membrane to the second side of the second osmotic membrane by applying a hydraulic pressure to the first side of the second osmotic membrane as a driving force, such that local osmotic pressure gradients through the thickness of the membrane that would otherwise favor the transport of water from the second side of the membrane to the first side of the membrane are overcome by the applied hydraulic pressure. In some embodiments, the osmotic pressure of the stream on the first side of the second osmotic membrane can be higher than the osmotic pressure of the stream on the second side of the second osmotic membrane, such that water is transported through the second osmotic membrane due to a hydraulic pressure applied to the first side of the second osmotic membrane.

As noted above, certain embodiments are related to desalination systems and methods in which multiple reverse osmosis steps are performed in series. FIG. 2B is a schematic illustration of an exemplary desalination system 260, according to certain embodiments. In FIG. 2B, desalination system 260 comprises first osmotic membrane 202 (which comprises first side 204 and second side 206) and second osmotic membrane 216 (which comprises first side 218 and second side 220). According to certain embodiments, first osmotic membrane 202 and second osmotic membrane 216 can be operated as described elsewhere herein with respect to membranes 202 and 216 (e.g., as shown in FIG. 2A). System 260 in FIG. 2B further comprises a third osmotic membrane 228, comprising first side 230 and second side 232. System 260 also comprises optional fourth osmotic membrane 240, comprising first side 242 and second side 244. According to certain embodiments, the first osmotic membrane can be used to perform a first osmosis step, the second osmotic membrane can be used to perform a second osmosis step, and the third osmotic membrane can be used to perform a third osmosis step. The fourth osmotic membrane, when present, can be used to perform a fourth osmosis step, according to certain embodiments. As one example, in some embodiments, first osmotic membrane 202 can be used to perform a first osmosis step (e.g., a forward osmosis desalination step), second osmotic membrane 216 can be used to perform a second osmosis step (e.g., a first reverse osmosis desalination step), and third osmotic membrane 228 can be used to perform a third osmosis step (e.g., a second reverse osmosis desalination step). When present, optional fourth osmotic membrane can be used to perform a fourth osmosis step (e.g., a third reverse osmosis step).

According to some embodiments, first osmotic membrane 202 and second osmotic membrane 216 can be operated as described elsewhere. Some embodiments comprise transporting at least a portion of the second draw product stream from the second side of the second osmotic membrane across a first side of a third osmotic membrane. For example, referring to FIG. 2B, in some embodiments, at least a portion of second draw product stream 224 is transported from the second side 220 of the second osmotic membrane 216 across first side 230 of third osmotic membrane 228. Certain embodiments comprise transporting a third draw inlet stream across a second side of the third osmotic membrane. For example, referring to FIG. 2B, in some embodiments, third draw inlet stream 234 is transported across second side 232 of third osmotic membrane 228.

Some embodiments comprise applying a hydraulic pressure to the second draw product stream on the first side of the third osmotic membrane such that water is transported from the second draw product stream through the third osmotic membrane to the third draw inlet stream to produce a third draw product stream having a lower osmotic pressure (e.g., due to a lower molar concentration of solubilized species (e.g., ions)) than the third draw inlet stream and a third concentrated stream having a higher osmotic pressure (e.g., due to a higher molar concentration of solubilized species (e.g., ions)) than the second draw product stream. For example, referring to FIG. 2B, in some embodiments, a hydraulic pressure is applied to second draw product stream 224 on first side 230 of third osmotic membrane 228 such that water is transported from second draw product stream 224 through third osmotic membrane 228 to third draw inlet stream 234 to produce third draw product stream 236 having a lower osmotic pressure (e.g., due to a lower molar concentration of solubilized species (e.g., ions)) than third draw inlet stream 234 and third concentrated aqueous stream 238 having a higher osmotic pressure (e.g., due to a higher molar concentration of solubilized species (e.g., ions)) than second draw product stream 224.

In certain embodiments, the third concentrated aqueous stream (e.g., 238 in FIG. 2B) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the second draw product stream (e.g., stream 224 in FIG. 2B).

In some embodiments, the third concentrated aqueous stream (e.g., 238 in FIG. 2B) can have a weight percentage of solubilized species (e.g., ions) that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the weight percentage of solubilized species (e.g., ions) in the second draw product stream (e.g., stream 224 in FIG. 2B). For example, referring to FIG. 2B, in some embodiments, second draw product stream 224 can have a solubilized ion concentration of 10 wt % and third concentrated aqueous stream 238 can have a solubilized ion concentration of 20 wt %, which is 2 times greater than the weight percentage of solubilized ions in the second draw product stream.

In certain embodiments, the third draw inlet stream (e.g., stream 234 in FIG. 2B) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the third draw product stream (e.g., stream 236 in FIG. 2B).

In certain embodiments, the third draw inlet stream (e.g., stream 234 in FIG. 2B) can have a weight percentage of solubilized species (e.g., ions) that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the weight percentage of solubilized species (e.g., ions) in the third draw product stream (e.g., stream 236 in FIG. 2B). For example, referring to FIG. 2B, in some embodiments, third draw product stream 236 can have a solubilized ion concentration of 8 wt % and third draw inlet stream 234 can have a solubilized ion concentration of 18 wt %, which is 2.25 times greater than the weight percentage of solubilized ions in the third draw product stream.

The third osmotic membrane separator can be operated as a reverse osmosis membrane separator, according to certain embodiments. That is to say, in some embodiments, water can be transported from the first side of the third osmotic membrane to the second side of the third osmotic membrane by applying a hydraulic pressure to the first side of the third osmotic membrane as a driving force, such that local osmotic pressure gradients through the thickness of the membrane that would otherwise favor the transport of water from the second side of the membrane to the first side of the membrane are overcome by the applied hydraulic pressure. In some embodiments, the osmotic pressure of the stream on the first side of the third osmotic membrane can be higher than the osmotic pressure of the stream on the second side of the third osmotic membrane, such that water is transported through the third osmotic membrane due to a hydraulic pressure applied to the first side of the third osmotic membrane.

In some embodiments, fourth, fifth, sixth, or more osmotic membranes can be used. System 260 in FIG. 2B, according to some embodiments, comprises optional fourth osmotic membrane 240, which comprises first side 242 and second side 244. Some embodiments comprise transporting at least a portion of the third draw product stream from the second side of the third osmotic membrane across a first side of a fourth osmotic membrane. For example, referring to FIG. 2B, in some embodiments, at least a portion of third draw product stream 236 is transported from second side 232 of third osmotic membrane 228 across first side 242 of fourth osmotic membrane 240. Certain embodiments comprise transporting a fourth draw inlet stream across a second side of the fourth osmotic membrane. For example, referring to FIG. 2B, in some embodiments, fourth draw inlet stream 246 is transported across second side 244 of fourth osmotic membrane 240.

Some embodiments comprise applying a hydraulic pressure to the third draw product stream on the first side of the fourth osmotic membrane such that water is transported from the third draw product stream through the fourth osmotic membrane to the fourth draw inlet stream to produce a fourth draw product stream having a lower osmotic pressure (e.g., due to a lower molar concentration of solubilized species (e.g., ions)) than the fourth draw inlet stream and a fourth concentrated aqueous stream having a higher osmotic pressure (e.g., due to a higher molar concentration of solubilized species (e.g., ions)) than the third draw product stream. For example, referring to FIG. 2B, in some embodiments, a hydraulic pressure is applied to third draw product stream 236 on first side 242 of fourth osmotic membrane 240 such that water is transported from third draw product stream 236 through fourth osmotic membrane 240 to fourth draw inlet stream 246 to produce fourth draw product stream 248 having a lower osmotic pressure (e.g., due to a lower molar concentration of solubilized species (e.g., ions)) than fourth draw inlet stream 246 and fourth concentrated aqueous stream 250 having a higher osmotic pressure (e.g., due to a higher molar concentration of solubilized species (e.g., ions) than third draw product stream 236.

In some embodiments, the fourth concentrated aqueous stream (e.g., 250 in FIG. 2B) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the third draw product stream (e.g., stream 236 in FIG. 2B).

In some embodiments, the fourth concentrated aqueous stream (e.g., 250 in FIG. 2B) can have a weight percentage of solubilized ions that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the weight percentage of solubilized ions in the third draw product stream (e.g., stream 236 in FIG. 2B).

In certain embodiments, the fourth draw inlet stream (e.g., stream 246 in FIG. 2B) can have an osmotic pressure that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the osmotic pressure of the fourth draw product stream (e.g., stream 248 in FIG. 2B).

In certain embodiments, the fourth draw inlet stream (e.g., stream 246 in FIG. 2B) can have a weight percentage of solubilized ions that is at least about 1.01 times, at least about 1.1 times, at least about 1.5 times, at least about 2 times, at least about 5 times, at least about 10 times, or at least about 50 times (and/or, in some embodiments, up to about 100 times, up to about 500 times, up to about 1000 times, up to about 5000 times, or more) the weight percentage of solubilized ions in the fourth draw product stream (e.g., stream 248 in FIG. 2B).

The fourth osmotic membrane separator can be operated as a reverse osmosis membrane, according to certain embodiments. That is to say, in some embodiments, water can be transported from the first side of the fourth osmotic membrane to the second side of the fourth osmotic membrane by applying a hydraulic pressure to the first side of the fourth osmotic membrane as a driving force, such that local osmotic pressure gradients through the thickness of the membrane that would otherwise favor the transport of water from the second side of the membrane to the first side of the membrane are overcome by the applied hydraulic pressure. In some embodiments, the osmotic pressure of the stream on the first side of the fourth osmotic membrane can be higher than the osmotic pressure of the stream on the second side of the fourth osmotic membrane, such that water is transported through the fourth osmotic membrane due to a hydraulic pressure applied to the first side of the fourth osmotic membrane.

Certain of the systems and methods described herein can be employed such that, during operation, the transmembrane net driving force (i.e., the net driving force through the thickness of the osmotic membrane) is spatially uniform across the facial area of the osmotic membrane. As described above, the transmembrane net driving force is defined as the difference between the transmembrane hydraulic pressure gradient and the transmembrane osmotic pressure gradient, as shown in Equation 1. In some embodiments, over at least about 90%, at least about 95%, at least about 98%, or at least about 99% of the facial area of the osmotic membrane (e.g., the first osmotic membrane, the second osmotic membrane, the third osmotic membrane (if present), and/or the fourth osmotic membrane (if present)), the transmembrane net driving force is uniform to within about 10%, within about 5%, within about 3%, within about 2%, or within about 1%.

The transmembrane net driving force at any given location across the facial area of the osmotic membrane is determined by measuring the properties of the streams on opposite sides of the osmotic membrane at that location. Specifically, one would measure the hydraulic pressure on opposite sides of the osmotic membrane at that location and the osmotic pressure on opposite sides of the osmotic membrane at that location. The transmembrane net driving force could then be calculated using Equation 1 above. As a specific example, referring to FIG. 1B, the transmembrane net driving force at point 150 of osmotic membrane 102 can be determined by measuring the hydraulic pressure of the stream on side 104 at point 150 ($P_{150}$); the osmotic pressure of the stream on side 104 at point 150 ($\Pi_{150}$); the hydraulic pressure of the stream on side 106 at point 152 ($P_{152}$), which is opposite point 150; and the osmotic pressure of the stream on side 106 at point 152 ($\Pi_{152}$). The transmembrane net driving force at point 150 ($\Delta_{\chi 150}$) would then be calculated as:

$$\Delta_{\chi 150} = \Delta P - \Delta \Pi = (P_{150} - P_{152}) - (\Pi_{150} - \Pi_{152}) \qquad [3]$$

To determine the percentage of facial area over which the transmembrane net driving force is uniform, one would measure the transmembrane net driving force at points across the two-dimensional facial area of the osmotic membrane (e.g., at points across facial area 163 shown in FIG. 1C, defined by dimensions 160 and 161), and determine the spatially averaged transmembrane net driving force. The transmembrane net driving force at a particular location would be said to be uniform to within X % if the transmembrane net driving force at that location is within X % of the transmembrane net driving force spatially averaged over the facial area of the osmotic membrane (also referred to herein as the spatially-averaged transmembrane net driving force).

Figure 1C:
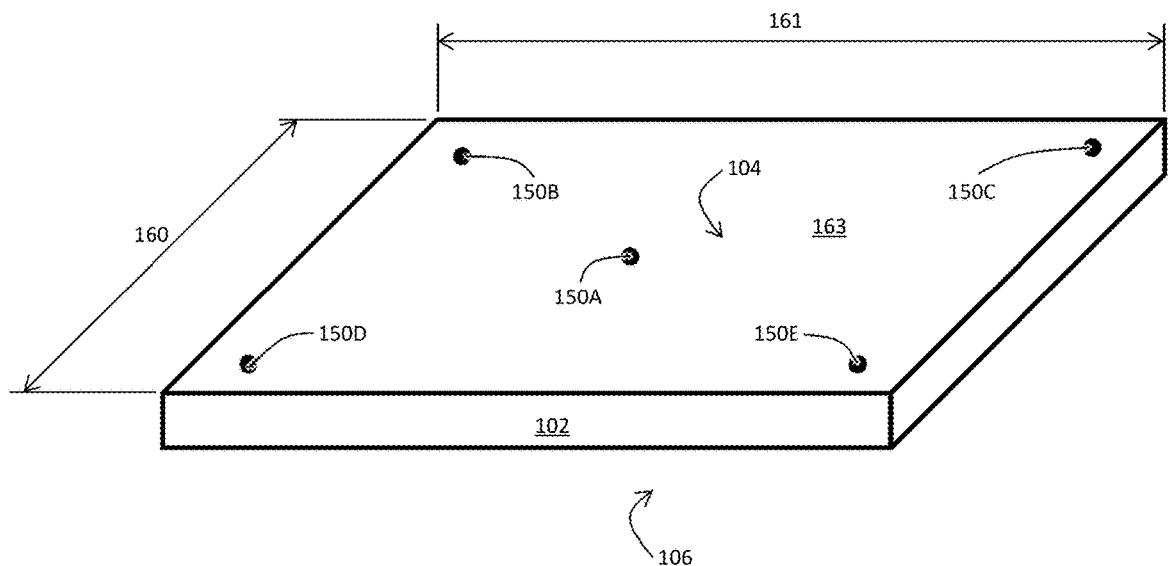
FIG. 1C is a front, top, right side perspective view of an osmotic membrane, according to some embodiments.
Figure 1D:
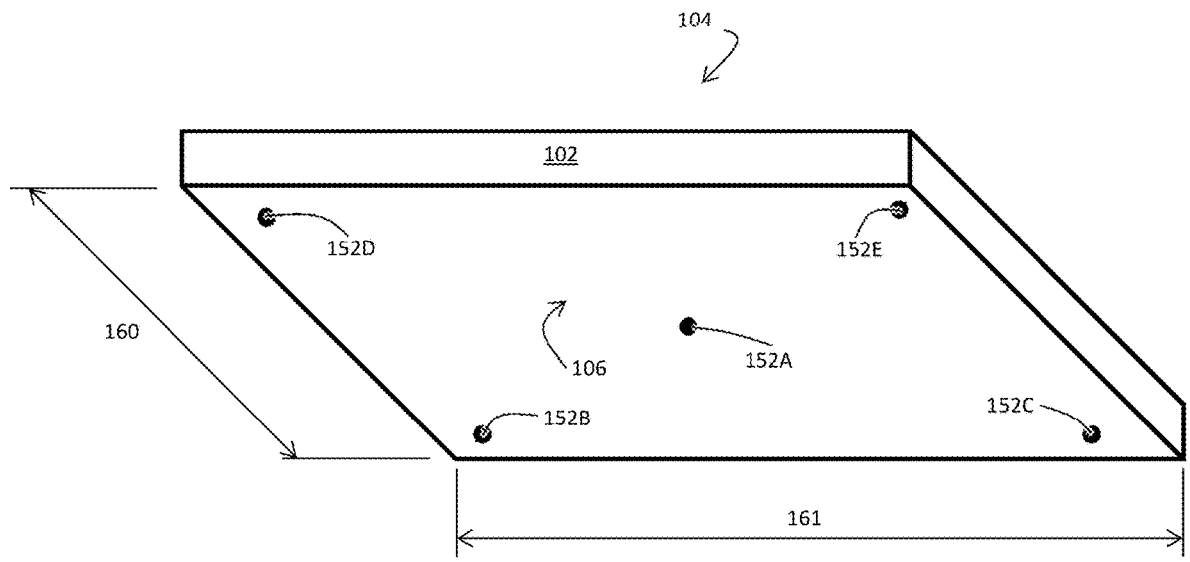
FIG. 1D is a front, bottom, right side perspective view of the exemplary osmotic membrane illustrated in FIG. 1C.

To determine the spatially-averaged transmembrane net driving force across the facial area of an osmotic membrane, one would calculate the transmembrane net driving force (using Equation 1) at each point across the facial area of the osmotic membrane (to produce a two-dimensional distribution of transmembrane net driving forces) and spatially average the distribution of the transmembrane net driving force. To illustrate an exemplary calculation, reference is made to FIGS. 1C-1D. FIG. 1C is a front, top, right side perspective view of an osmotic membrane 102, and FIG. 1D is a front, bottom, right side perspective view of the osmotic membrane 102 of FIG. 1C. In FIGS. 1C-1D, osmotic membrane 102 includes first side 104 and second side 106. Osmotic membrane 102 also comprises a facial area 163 defined by dimensions 160 and 161. To determine the spatially-averaged transmembrane net driving force across facial area 163 of osmotic membrane 102 in FIGS. 1C-1D, one would calculate the two-dimensional distribution of the transmembrane net driving force (using Equation 1) at each point across facial area 163 of osmotic membrane 102. For example, in FIGS. 1C-1D, Equation 1 would be used to determine the transmembrane net driving force between points 150A and 152A, between points 150B and 152B, between points 150C and 152C, between points 150D and 152D, between points 150E and 152E, and at a statistically representative number of point pairs across facial area 163 until a 2-dimensional profile of the transmembrane net driving force is produced. The spatially averaged transmembrane net driving force through membrane 102 would then be calculated by number averaging the transmembrane net driving forces at each point within the 2-dimensional profile.

According to certain embodiments, the transmembrane net driving force can be made uniform, at least in part, by initiating (and/or selecting) appropriate operating conditions (e.g., mass flow rates, osmotic pressures, and/or hydraulic pressures) at the feed inlet and the draw inlet to the osmotic separators, as described in more detail below.

Certain of the systems and methods described herein can be operated such that the conditions at the inlets on each side of the osmotic membrane satisfy the following equation:

$$\frac{m_{D,i}}{m_{F,i}} = C \frac{\pi_{F,i} - (P_F - P_D)}{\pi_{D,i} + (P_F - P_D)} \qquad [4]$$

wherein $P_F$ is the hydraulic pressure at the inlet of the feed stream (i.e., the stream entering the osmotic separator and from which water is removed during the osmosis process); $m_{F,i}$ is the mass flow rate of the feed stream at the inlet of the feed stream to the osmotic membrane; $\pi_{F,i}$ is the osmotic pressure of the feed stream at the inlet of the feed stream to the osmotic membrane; $P_D$ is the hydraulic pressure at the inlet of the draw stream to the osmotic membrane (i.e., the stream entering the osmotic separator and into which water is added during the osmosis process); $m_{D,i}$ is the mass flow rate of the draw stream at the inlet of the draw stream; $\pi_{D,i}$ is the osmotic pressure of the draw stream at the inlet of the draw stream; and C is from about 0.8 to about 1.2. In certain embodiments, C can be from about 0.9 to about 1.1, from about 0.95 to about 1.05, from about 0.98 to about 1.02, or from about 0.99 to about 1.01. Without wishing to be bound by any particular theory, it is believed that operating osmotic membranes such that they satisfy Equation 4 above can reduce (e.g., minimize) entropy generation and establish substantially uniform local fluxes of water through the osmotic membrane, which can reduce the amount of energy wasted during the osmosis process.

For the purposes of evaluating the performance of a system with respect to Equation 4, the mass flow rates, hydraulic pressures, and osmotic pressures of incoming streams should be measured as bulk mass flow rates, bulk hydraulic pressures, and bulk osmotic pressures of the incoming liquids at their point of entry to the osmotic separator. Bulk hydraulic pressure (which is generally measured as a gauge pressure) can be measured, for example, using a pressure transducer, a Bourdon tube, a diaphragm pressure gauge, or any other suitable pressure gauge. Mass flow rates may be determined using any of a number of suitable flow meters known to those of ordinary skill in the art. The bulk osmotic pressure of a stream may be determined, for example, by measuring the osmotic pressure (e.g., using any of the methods described elsewhere herein) of a sample of the stream.

Referring to FIG. 1B, for example, in certain embodiments, the osmotic separator comprising osmotic membrane 102 can be operated such that:

$$\frac{m_{110}}{m_{108}} = C \frac{\pi_{108} - (P_{108} - P_{110})}{\pi_{110} + (P_{108} - P_{110})} \qquad [4A]$$

wherein $P_{108}$ is the bulk hydraulic pressure of stream 108 as it enters the osmotic separator; $m_{108}$ is the bulk mass flow rate of stream 108 as it enters the osmotic separator; $\pi_{108}$ is the bulk osmotic pressure of stream 108 as it enters the osmotic separator; $P_{110}$ is the bulk hydraulic pressure of stream 110 as it enters the osmotic separator; $m_{110}$ is the bulk mass flow rate of stream 110 as it enters the osmotic separator; $\pi_{110}$ is the bulk osmotic pressure of stream 110 as it enters the osmotic separator; and C is from about 0.8 to about 1.2. In certain embodiments, C can be from about 0.9 to about 1.1, from about 0.95 to about 1.05, from about 0.98 to about 1.02, or from about 0.99 to about 1.01.

As one non-limiting example, in certain embodiments, the first osmotic separator (comprising the first osmotic membrane) can be operated such that it satisfies Equation 4 above. For example, in some embodiments, referring to FIGS. 2A-2B, the first osmotic separator comprising first osmotic membrane 202 can be operated such that:

$$\frac{m_{210}}{m_{208}} = C \frac{\pi_{208} - (P_{208} - P_{210})}{\pi_{210} + (P_{208} - P_{210})} \quad [4B]$$

wherein $P_{208}$ is the bulk hydraulic pressure of stream 208 as it enters the first osmotic separator; $m_{208}$ is the bulk mass flow rate of stream 208 as it enters the first osmotic separator; $\pi_{208}$ is the bulk osmotic pressure of stream 208 as it enters the first osmotic separator; $P_{210}$ is the bulk hydraulic pressure of stream 210 as it enters the first osmotic separator; $m_{210}$ is the bulk mass flow rate of stream 210 as it enters the first osmotic separator; $\pi_{210}$ is the bulk osmotic pressure of stream 210 as it enters the first osmotic separator; and C is from about 0.8 to about 1.2. In certain embodiments, C can be from about 0.9 to about 1.1, from about 0.95 to about 1.05, from about 0.98 to about 1.02, or from about 0.99 to about 1.01.

In some embodiments, the second osmotic separator (comprising the second osmotic membrane) can be operated such that it satisfies Equation 4 above. For example, in some embodiments, referring to FIGS. 2A-2B, the second osmotic separator comprising second osmotic membrane 216 can be operated such that:

$$\frac{m_{222}}{m_{212}} = C \frac{\pi_{212} - (P_{212} - P_{222})}{\pi_{222} + (P_{212} - P_{222})} \quad [4C]$$

wherein $P_{212}$ is the bulk hydraulic pressure of stream 212 as it enters the second osmotic separator; $m_{212}$ is the bulk mass flow rate of stream 212 as it enters the second osmotic separator; $\pi_{212}$ is the bulk osmotic pressure of stream 212 as it enters the second osmotic separator; $P_{222}$ is the bulk hydraulic pressure of stream 222 as it enters the second osmotic separator; $m_{222}$ is the bulk mass flow rate of stream 222 as it enters the second osmotic separator; $\pi_{222}$ is the bulk osmotic pressure of stream 222 as it enters the second osmotic separator; and C is from about 0.8 to about 1.2. In certain embodiments, C can be from about 0.9 to about 1.1, from about 0.95 to about 1.05, from about 0.98 to about 1.02, or from about 0.99 to about 1.01.

According to certain embodiments, the third osmotic separator (comprising the third osmotic membrane) can be operated such that it satisfies Equation 4 above. For example, in some embodiments, referring to FIG. 2B, the third osmotic separator comprising third osmotic membrane 228 can be operated such that:

$$\frac{m_{234}}{m_{224}} = C \frac{\pi_{224} - (P_{224} - P_{234})}{\pi_{234} + (P_{224} - P_{234})} \quad [4D]$$

wherein $P_{224}$ is the bulk hydraulic pressure of stream 224 as it enters the third osmotic separator; $m_{224}$ is the bulk mass flow rate of stream 224 as it enters the third osmotic separator; $\pi_{224}$ is the bulk osmotic pressure of stream 224 as it enters the third osmotic separator; $P_{234}$ is the bulk hydraulic pressure of stream 234 as it enters the third osmotic separator; $m_{234}$ is the bulk mass flow rate of stream 234 as it enters the third osmotic separator; $\pi_{234}$ is the bulk osmotic pressure of stream 234 as it enters the third osmotic separator; and C is from about 0.8 to about 1.2. In certain embodiments, C can be from about 0.9 to about 1.1, from about 0.95 to about 1.05, from about 0.98 to about 1.02, or from about 0.99 to about 1.01.

According to certain embodiments, the fourth osmotic separator (comprising the fourth osmotic membrane) can be operated such that it satisfies Equation 4 above. For example, in some embodiments, referring to FIG. 2B, the fourth osmotic separator comprising fourth osmotic membrane 240 can be operated such that:

$$\frac{m_{246}}{m_{236}} = C \frac{\pi_{236} - (P_{236} - P_{246})}{\pi_{246} + (P_{236} - P_{246})} \quad [4E]$$

wherein $P_{236}$ is the bulk hydraulic pressure of stream 236 as it enters the fourth osmotic separator; $m_{236}$ is the bulk mass flow rate of stream 236 as it enters the fourth osmotic separator; $\pi_{236}$ is the bulk osmotic pressure of stream 236 as it enters the fourth osmotic separator; $P_{246}$ is the bulk hydraulic pressure of stream 246 as it enters the fourth osmotic separator; $m_{246}$ is the bulk mass flow rate of stream 246 as it enters the fourth osmotic separator; $\pi_{246}$ is the bulk osmotic pressure of stream 246 as it enters the fourth osmotic separator; and C is from about 0.8 to about 1.2. In certain embodiments, C can be from about 0.9 to about 1.1, from about 0.95 to about 1.05, from about 0.98 to about 1.02, or from about 0.99 to about 1.01.

Certain embodiments comprise directing the transport of an aqueous feed stream across an osmotic membrane and/or a draw inlet stream across an osmotic membrane such that the following two ratios are within about 20% of each other (and/or, in some embodiments, within about 10% of each other, within about 5% of each other, within about 3% of each other, within about 2% of each other, or within about 1% of each other): a ratio of a mass flow rate of the draw inlet stream entering the osmotic membrane to a mass flow rate of the aqueous feed stream entering the osmotic membrane; and a ratio of the difference between the osmotic pressure of the aqueous feed stream entering the osmotic membrane and the inlet pressure difference across the osmotic membrane to the sum of the osmotic pressure of the draw inlet stream entering the osmotic membrane and the inlet pressure difference across the osmotic membrane. The inlet pressure difference across an osmotic membrane corresponds to the difference between the hydraulic pressure at the inlet of the feed stream (also referred to herein as $P_F$) and the hydraulic pressure at the inlet of the draw stream to the osmotic membrane (also referred to herein as $P_D$). The inlet pressure difference across an osmotic membrane can, thus, be expressed as $P_F - P_D$.

The ratio of a mass flow rate of the draw inlet stream entering the osmotic membrane (also referred to herein as $m_{D,i}$) to a mass flow rate of the aqueous feed stream entering the osmotic membrane (also referred to herein as $m_{F,i}$) can be calculated by dividing the mass flow rate of the draw inlet stream entering the osmotic membrane by the mass flow rate of the aqueous feed stream entering the osmotic membrane (and, thus, may be expressed as $m_{D,i}/m_{F,i}$). Similarly, ratio of the difference between the osmotic pressure of the aqueous feed stream entering the osmotic membrane and the inlet pressure difference across the osmotic membrane (also referred to herein as $\pi_{F,i} - (P_F - P_D)$) to the sum of the osmotic pressure of the draw inlet stream entering the osmotic membrane and the inlet pressure difference across the osmotic membrane (also referred to herein as $\pi_{D,i} + (P_F - P_D)$) can be calculated by dividing the difference between the osmotic pressure of the aqueous feed stream entering the osmotic membrane and the inlet pressure difference across the osmotic membrane by the sum of the osmotic pressure of the draw inlet stream entering the osmotic membrane and the inlet pressure difference across the osmotic membrane (and, thus, may be expressed as $[(\pi_{F,i} - (P_F - P_D))/(\pi_{D,i} + (P_F - P_D))]$. For the purposes of evaluating the ratios outlined above, the mass flow rates, hydraulic pressures, and osmotic pressures of incoming streams should be measured as bulk mass flow rates, bulk hydraulic pressures, and bulk osmotic pressures of the incoming liquids at their place of entry to the osmotic separator.

Referring to FIG. 1B, for example, certain embodiments comprise directing the transport of aqueous feed stream 108 across osmotic membrane 102 and/or draw inlet stream 110 across osmotic membrane 102 such that the following two ratios are within 20% of each other (and/or, in some embodiments, within about 10% of each other, within about 5% of each other, within about 3% of each other, within about 2% of each other, or within about 1% of each other): the ratio of the mass flow rate of draw inlet stream 110 entering osmotic membrane 102 to the mass flow rate of aqueous feed stream 108 entering osmotic membrane 102; and the ratio of the difference between the osmotic pressure of aqueous feed stream 108 entering osmotic membrane 102 and the inlet pressure difference across osmotic membrane 102 to the sum of the osmotic pressure of draw inlet stream 110 entering osmotic membrane 102 and the inlet pressure difference across osmotic membrane 102. The inlet pressure difference across osmotic membrane 102 can be determined by subtracting the hydraulic pressure of draw inlet stream 110 at the inlet of draw inlet stream 110 to osmotic membrane 102 from the hydraulic pressure of aqueous feed stream 108 at the inlet of aqueous feed stream 108 to osmotic membrane 102.

In certain embodiments, the first osmotic separator (comprising the first osmotic membrane) can be operated such that the ratios described above are relatively close to each other. For example, referring to FIGS. 2A-2B, certain embodiments comprise directing the transport of aqueous feed stream 208 across first osmotic membrane 202 and/or first draw inlet stream 210 across first osmotic membrane 202 such that the following two ratios are within 20% of each other (and/or, in some embodiments, within about 10% of each other, within about 5% of each other, within about 3% of each other, within about 2% of each other, or within about 1% of each other): the ratio of the mass flow rate of first draw inlet stream 210 entering first osmotic membrane 202 to the mass flow rate of aqueous feed stream 208 entering first osmotic membrane 202; and the ratio of the difference between the osmotic pressure of aqueous feed stream 208 entering first osmotic membrane 202 and the inlet pressure difference across first osmotic membrane 202 to the sum of the osmotic pressure of first draw inlet stream 210 entering first osmotic membrane 202 and the inlet pressure difference across first osmotic membrane 202. The inlet pressure difference across first osmotic membrane 202 can be determined by subtracting the hydraulic pressure of first draw inlet stream 210 at the inlet of first draw inlet stream 210 to first osmotic membrane 202 from the hydraulic pressure of aqueous feed stream 208 at the inlet of aqueous feed stream 208 to first osmotic membrane 202.

In certain embodiments, the second osmotic separator (comprising the second osmotic membrane) can be operated such that the ratios described above are relatively close to each other. For example, referring to FIGS. 2A-2B, certain embodiments comprise directing the transport of first draw product stream 212 across second osmotic membrane 216 and/or second draw inlet stream 222 across second osmotic membrane 216 such that the following two ratios are within 20% of each other (and/or, in some embodiments, within about 10% of each other, within about 5% of each other, within about 3% of each other, within about 2% of each other, or within about 1% of each other): the ratio of the mass flow rate of second draw inlet stream 222 entering second osmotic membrane 216 to the mass flow rate of first draw product stream 212 entering second osmotic membrane 216; and the ratio of the difference between the osmotic pressure of first draw product stream 212 entering second osmotic membrane 216 and the inlet pressure difference across second osmotic membrane 216 to the sum of the osmotic pressure of second draw inlet stream 222 entering second osmotic membrane 216 and the inlet pressure difference across second osmotic membrane 216. The inlet pressure difference across second osmotic membrane 216 can be determined by subtracting the hydraulic pressure of second draw inlet stream 222 at the inlet of second draw inlet stream 222 to second osmotic membrane 216 from the hydraulic pressure of first draw product stream 212 at the inlet of first draw product stream 212 to second osmotic membrane 216.

In certain embodiments, the third osmotic separator (comprising the third osmotic membrane) can be operated such that the ratios described above are relatively close to each other. For example, referring to FIG. 2B, certain embodiments comprise directing the transport of second draw product stream 224 across third osmotic membrane 228 and/or third draw inlet stream 234 across third osmotic membrane 228 such that the following two ratios are within 20% of each other (and/or, in some embodiments, within about 10% of each other, within about 5% of each other, within about 3% of each other, within about 2% of each other, or within about 1% of each other): the ratio of the mass flow rate of third draw inlet stream 234 entering third osmotic membrane 228 to the mass flow rate of second draw product stream 224 entering third osmotic membrane 228; and the ratio of the difference between the osmotic pressure of second draw product stream 224 entering third osmotic membrane 228 and the inlet pressure difference across third osmotic membrane 228 to the sum of the osmotic pressure of third draw inlet stream 234 entering third osmotic membrane 228 and the inlet pressure difference across third osmotic membrane 228. The inlet pressure difference across third osmotic membrane 228 can be determined by subtracting the hydraulic pressure of third draw inlet stream 234 at the inlet of third draw inlet stream 234 to third osmotic membrane 228 from the hydraulic pressure of second draw product stream 224 at the inlet of second draw product stream 224 to third osmotic membrane 228.

In certain embodiments, the fourth osmotic separator (comprising the fourth osmotic membrane) can be operated such that the ratios described above are relatively close to each other. For example, referring to FIG. 2B, certain embodiments comprise directing the transport of third draw product stream 236 across third osmotic membrane 240 and/or fourth draw inlet stream 246 across fourth osmotic membrane 240 such that the following two ratios are within 20% of each other (and/or, in some embodiments, within about 10% of each other, within about 5% of each other, within about 3% of each other, within about 2% of each other, or within about 1% of each other): the ratio of the mass flow rate of fourth draw inlet stream 246 entering fourth osmotic membrane 240 to the mass flow rate of third draw product stream 236 entering fourth osmotic membrane 240; and the ratio of the difference between the osmotic pressure of third draw product stream 236 entering fourth osmotic membrane 240 and the inlet pressure difference across fourth osmotic membrane 240 to the sum of the osmotic pressure of fourth draw inlet stream 246 entering fourth osmotic membrane 240 and the inlet pressure difference across fourth osmotic membrane 240. The inlet pressure difference across fourth osmotic membrane 240 can be determined by subtracting the hydraulic pressure of fourth draw inlet stream 246 at the inlet of fourth draw inlet stream 246 to fourth osmotic membrane 240 from the hydraulic pressure of third draw product stream 236 at the inlet of third draw product stream 236 to fourth osmotic membrane 240.

Certain embodiments comprise directing the transport of an aqueous feed stream across an osmotic membrane and/or a draw inlet stream across the osmotic membrane such that the transmembrane net driving force at the entrance of the aqueous feed stream to the osmotic membrane and the transmembrane net driving force at the entrance of the draw inlet stream to the osmotic membrane are within about 10% of each other (and/or, in some embodiments, within about 5% of each other, within about 3% of each other, within about 2% of each other, or within about 1% of each other). The transmembrane net driving force at a particular location along an osmotic membrane can be calculated using Equation 1, as described above.

Referring to FIG. 1B, for example, certain embodiments comprise directing the transport of aqueous feed stream 108 across osmotic membrane 102 and/or draw inlet stream 110 across osmotic membrane 102 such that the transmembrane net driving force at the entrance of aqueous feed stream 108 to osmotic membrane 102 and the transmembrane net driving force at the entrance of draw inlet stream 110 to osmotic membrane 102 are within about 10% of each other (and/or, in some embodiments, within about 5% of each other, within about 3% of each other, within about 2% of each other, or within about 1% of each other).

In certain embodiments, the first osmotic separator (comprising the first osmotic membrane) can be operated such that the transmembrane net driving forces at the inlets to the first osmotic membrane are relatively close to each other. For example, referring to FIGS. 2A-2B, certain embodiments comprise directing the transport of aqueous feed stream 208 across first osmotic membrane 202 and/or first draw inlet stream 210 across first osmotic membrane 202 such that the transmembrane net driving force at the entrance of aqueous feed stream 208 to first osmotic membrane 202 and the transmembrane net driving force at the entrance of first draw inlet stream 210 to first osmotic membrane 202 are within about 10% of each other (and/or, in some embodiments, within about 5% of each other, within about 3% of each other, within about 2% of each other, or within about 1% of each other).

In certain embodiments, the second osmotic separator (comprising the second osmotic membrane) can be operated such that the transmembrane net driving forces at the inlets to the second osmotic membrane are relatively close to each other. For example, referring to FIGS. 2A-2B, certain embodiments comprise directing the transport of first draw product stream 212 across second osmotic membrane 216 and/or second draw inlet stream 222 across second osmotic membrane 216 such that the transmembrane net driving force at the entrance of first draw product stream 212 to second osmotic membrane 216 and the transmembrane net driving force at the entrance of second draw inlet stream 222 to second osmotic membrane 216 are within about 10% of each other (and/or, in some embodiments, within about 5% of each other, within about 3% of each other, within about 2% of each other, or within about 1% of each other).

In certain embodiments, the third osmotic separator (comprising the third osmotic membrane) can be operated such that the transmembrane net driving forces at the inlets to the third osmotic membrane are relatively close to each other. For example, referring to FIG. 2B, certain embodiments comprise directing the transport of second draw product stream 224 across third osmotic membrane 228 and/or third draw inlet stream 234 across third osmotic membrane 228 such that the transmembrane net driving force at the entrance of second draw product stream 224 to third osmotic membrane 228 and the transmembrane net driving force at the entrance of third draw inlet stream 234 to third osmotic membrane 228 are within about 10% of each other (and/or, in some embodiments, within about 5% of each other, within about 3% of each other, within about 2% of each other, or within about 1% of each other).

In certain embodiments, the fourth osmotic separator (comprising the fourth osmotic membrane) can be operated such that the transmembrane net driving forces at the inlets to the fourth osmotic membrane are relatively close to each other. For example, referring to FIG. 2B, certain embodiments comprise directing the transport of third draw product stream 236 across fourth osmotic membrane 240 and/or fourth draw inlet stream 246 across fourth osmotic membrane 240 such that the transmembrane net driving force at the entrance of third draw product stream 236 to fourth osmotic membrane 240 and the transmembrane net driving force at the entrance of fourth draw inlet stream 246 to fourth osmotic membrane 240 are within about 10% of each other (and/or, in some embodiments, within about 5% of each other, within about 3% of each other, within about 2% of each other, or within about 1% of each other).

The transmembrane net driving force at the inlet(s) to an osmotic membrane can be controlled, initiated, and/or selected, for example, by selecting appropriate operating conditions (e.g., mass flow rates, osmotic pressures (e.g., via solubilized species selection and/or concentration), and/or hydraulic pressures) of the flow streams.

In some embodiments, one or more osmotic membranes can be operated such that the transmembrane net driving forces at the inlets to the osmotic membrane are initially relatively unbalanced, after which, operation of the system may be adjusted such that the transmembrane net driving forces at the inlets to the osmotic membrane are relatively balanced. For example, some embodiments comprise directing the transport of the aqueous feed stream across the osmotic membrane and/or the draw inlet stream across the osmotic membrane such that the transmembrane net driving force at the entrance of the aqueous feed stream to the osmotic membrane and the transmembrane net driving force at the entrance of the draw inlet stream to the osmotic membrane are at least about 10% different from each other (and/or, in some embodiments, at least about 11%, at least about 12%, at least about 15%, at least about 20%, at least about 50%, or at least about 100% different from each other). Some such embodiments comprise measuring at least one of a temperature, a pressure, a solubilized species concentration, and a flow rate of the aqueous feed stream and/or the draw inlet stream. Some such embodiments comprise changing at least one of the flow rate of the aqueous feed stream and the flow rate of the draw inlet stream such that the transmembrane driving force at the entrance of the aqueous feed stream to the osmotic membrane and the transmembrane driving force at the entrance of the draw inlet stream to the osmotic membrane are within about 10% of each other (and/or, in some embodiments, within about 5%, within about 3%, within about 2%, or within about 1% of each other).

Referring to FIG. 1B, for example, certain embodiments comprise directing the transport of aqueous feed stream 108 across osmotic membrane 102 and/or draw inlet stream 110 across osmotic membrane 102 such that the transmembrane net driving force at the entrance of aqueous feed stream 108 to osmotic membrane 102 and the transmembrane driving force at the entrance of draw inlet stream 110 to osmotic membrane 102 are at least about 10% different from each other (and/or, in some embodiments, at least about 11%, at least about 12%, at least about 15%, at least about 20%, at least about 50%, or at least about 100% different from each other). Some such embodiments comprise measuring at least one of a temperature, a pressure, a solubilized species concentration, and a flow rate of aqueous feed stream 108 and/or draw inlet stream 110. Some such embodiments comprise changing at least one of the flow rate of aqueous feed stream 108 and the flow rate of draw inlet stream 110 such that the transmembrane driving force at the entrance of aqueous feed stream 108 to osmotic membrane 102 and the transmembrane driving force at the entrance of draw inlet stream 110 to osmotic membrane 102 are within about 10% of each other (and/or, in some embodiments, within about 5%, within about 3%, within about 2%, or within about 1% of each other).

In certain embodiments, the first osmotic separator (comprising the first osmotic membrane) can be operated such that the transmembrane net driving forces at the inlets to the first osmotic membrane are initially relatively unbalanced, after which, operation of the system may be adjusted such that the transmembrane net driving forces at the inlets to the first osmotic membrane are relatively balanced. For example, referring to FIGS. 2A-2B, certain embodiments comprise directing the transport of aqueous feed stream 208 across first osmotic membrane 202 and/or first draw inlet stream 210 across first osmotic membrane 202 such that the transmembrane net driving force at the entrance of aqueous feed stream 208 to first osmotic membrane 202 and the transmembrane driving force at the entrance of first draw inlet stream 210 to first osmotic membrane 202 are at least about 10% different from each other (and/or, in some embodiments, at least about 11%, at least about 12%, at least about 15%, at least about 20%, at least about 50%, or at least about 100% different from each other). Some such embodiments comprise measuring at least one of a temperature, a pressure, a solubilized species concentration, and a flow rate of aqueous feed stream 208 and/or first draw inlet stream 210. Some such embodiments comprise changing at least one of the flow rate of aqueous feed stream 208 and the flow rate of first draw inlet stream 210 such that the transmembrane driving force at the entrance of aqueous feed stream 208 to first osmotic membrane 202 and the transmembrane driving force at the entrance of first draw inlet stream 210 to first osmotic membrane 202 are within about 10% of each other (and/or, in some embodiments, within about 5%, within about 3%, within about 2%, or within about 1% of each other).

In certain embodiments, the second osmotic separator (comprising the second osmotic membrane) can be operated such that the transmembrane net driving forces at the inlets to the second osmotic membrane are initially relatively unbalanced, after which, operation of the system may be adjusted such that the transmembrane net driving forces at the inlets to the second osmotic membrane are relatively balanced. For example, referring to FIGS. 2A-2B, certain embodiments comprise directing the transport of first draw product stream 212 across second osmotic membrane 216 and/or second draw inlet stream 222 across second osmotic membrane 216 such that the transmembrane net driving force at the entrance of first draw product stream 212 to second osmotic membrane 216 and the transmembrane driving force at the entrance of second draw inlet stream 222 to second osmotic membrane 216 are at least about 10% different from each other (and/or, in some embodiments, at least about 11%, at least about 12%, at least about 15%, at least about 20%, at least about 50%, or at least about 100% different from each other). Some such embodiments comprise measuring at least one of a temperature, a pressure, a solubilized species concentration, and a flow rate of first draw product stream 212 and/or second draw inlet stream 222. Some such embodiments comprise changing at least one of the flow rate of first draw product stream 212 and the flow rate of second draw inlet stream 222 such that the transmembrane driving force at the entrance of first draw product stream 212 to second osmotic membrane 216 and the transmembrane driving force at the entrance of second draw inlet stream 222 to second osmotic membrane 216 are within about 10% of each other (and/or, in some embodiments, within about 5%, within about 3%, within about 2%, or within about 1% of each other).

In certain embodiments, the third osmotic separator (comprising the third osmotic membrane) can be operated such that the transmembrane net driving forces at the inlets to the third osmotic membrane are initially relatively unbalanced, after which, operation of the system may be adjusted such that the transmembrane net driving forces at the inlets to the third osmotic membrane are relatively balanced. For example, referring to FIG. 2B, certain embodiments comprise directing the transport of second draw product stream 224 across third osmotic membrane 228 and/or third draw inlet stream 234 across third osmotic membrane 228 such that the transmembrane net driving force at the entrance of second draw product stream 224 to third osmotic membrane 228 and the transmembrane driving force at the entrance of third draw inlet stream 234 to third osmotic membrane 228 are at least about 10% different from each other (and/or, in some embodiments, at least about 11%, at least about 12%, at least about 15%, at least about 20%, at least about 50%, or at least about 100% different from each other). Some such embodiments comprise measuring at least one of a temperature, a pressure, a solubilized species concentration, and a flow rate of second draw product stream 224 and/or third draw inlet stream 234. Some such embodiments comprise changing at least one of the flow rate of second draw product stream 224 and the flow rate of third draw inlet stream 234 such that the transmembrane driving force at the entrance of second draw product stream 224 to third osmotic membrane 228 and the transmembrane driving force at the entrance of third draw inlet stream 234 to third osmotic membrane 228 are within about 10% of each other (and/or, in some embodiments, within about 5%, within about 3%, within about 2%, or within about 1% of each other).

In certain embodiments, the fourth osmotic separator (comprising the fourth osmotic membrane) can be operated such that the transmembrane net driving forces at the inlets to the fourth osmotic membrane are initially relatively unbalanced, after which, operation of the system may be adjusted such that the transmembrane net driving forces at the inlets to the fourth osmotic membrane are relatively balanced. For example, referring to FIG. 2B, certain embodiments comprise directing the transport of third draw product stream 236 across fourth osmotic membrane 240 and/or fourth draw inlet stream 246 across fourth osmotic membrane 240 such that the transmembrane net driving force at the entrance of third draw product stream 236 to fourth osmotic membrane 240 and the transmembrane driving force at the entrance of fourth draw inlet stream 246 to fourth osmotic membrane 240 are at least about 10% different from each other (and/or, in some embodiments, at least about 11%, at least about 12%, at least about 15%, at least about 20%, at least about 50%, or at least about 100% different from each other). Some such embodiments comprise measuring at least one of a temperature, a pressure, a solubilized species concentration, and a flow rate of third draw product stream 236 and/or fourth draw inlet stream 246. Some such embodiments comprise changing at least one of the flow rate of third draw product stream 236 and the flow rate of fourth draw inlet stream 246 such that the transmembrane driving force at the entrance of third draw product stream 236 to fourth osmotic membrane 240 and the transmembrane driving force at the entrance of fourth draw inlet stream 246 to fourth osmotic membrane 240 are within about 10% of each other (and/or, in some embodiments, within about 5%, within about 3%, within about 2%, or within about 1% of each other).

Certain of the systems and methods described herein can be employed such that, during operation, for at least one of the osmotic membranes (e.g., at least one of the first osmotic membrane, the second osmotic membrane, the third osmotic membrane, the fourth osmotic membrane, etc.), the linear flow rate of water through the thickness of the osmotic membrane (i.e., the transmembrane linear flow rate of water) is spatially uniform across the facial area of the osmotic membrane. One of ordinary skill in the art would be capable of determining the transmembrane linear flow rate of water at various points across the facial area of the osmotic membrane during operation, for example, by measuring concentrations of streams on each side of the osmotic membrane at various locations and performing a mass balance on the osmotic membrane. In some embodiments, over at least about 90%, at least about 95%, at least about 98%, or at least about 99% of the facial area of the osmotic membrane (e.g., the first osmotic membrane, the second osmotic membrane, the third osmotic membrane (if present), and/or the fourth osmotic membrane (if present)), the transmembrane linear flow rate of water is uniform to within about 20%, within about 10%, within about 5%, within about 3%, within about 2%, or within about 1%. To determine the percentage of facial area over which the transmembrane linear flow rate of water is spatially uniform, one would use a similar procedure as described above with respect to the uniformity of the transmembrane net driving force. For example, one would determine the transmembrane linear flow rates of water at points across the two-dimensional facial area of the osmotic membrane (e.g., at points across facial area 163 shown in FIG. 1C, defined by dimensions 160 and 161). The transmembrane linear flow rate of water at a particular location on the osmotic membrane would be said to be uniform to within X % if the transmembrane linear flow rate of water at that location is within X % of the spatially-averaged transmembrane linear flow rate of water. To determine the spatially-averaged transmembrane linear flow rate of water, one would determine the transmembrane linear flow rate of water at each point across the facial area of the osmotic membrane (to produce a two-dimensional distribution) and spatially average the distribution of the transmembrane linear flow rates of water. Without wishing to be bound by any particular theory, it is believed that operation of one or more osmotic membranes such that the linear flow rate of water is relatively spatially uniform across the membrane can produce relatively uniform water flux across the facial area of the membrane, which can lead to reductions in thermodynamic losses during operation of the membrane.

According to certain embodiments, the streams on either side of an osmotic membrane can be operated in counter-current configuration. Operation of the desalination system in this manner can, according to certain but not necessarily all embodiments, allow one to more easily ensure that the transmembrane net driving force is spatially uniform across the facial area of the osmotic membrane. An example of counter-current flow is illustrated in FIG. 1B, in which aqueous feed stream 108 is transported across first side 104 of osmotic membrane 102 in the direction of arrow 103 while draw inlet stream 110 is transported across second side 106 of osmotic membrane 102 in the direction of arrow 105. It should be understood that two streams do not have to be transported in perfectly parallel and opposite directions to be considered to be in counter-current configuration, and in some embodiments, the primary flow directions of two streams that are in a counter-current flow configuration can form an angle of up to about 10° (or, in some cases, up to about 5°, up to about 2°, or up to about 10). In certain embodiments, the aqueous feed stream and the first draw inlet stream are transported across the first osmotic membrane in a counter-current configuration. According to some embodiments, the first draw product stream and the second draw inlet stream are transported across the second osmotic membrane in a counter-current configuration. In some embodiments, the second draw product stream and the third draw inlet stream are transported across the third osmotic membrane in a counter-current configuration. In some embodiments, the third draw product stream and the fourth draw inlet stream are transported across the fourth osmotic membrane in a counter-current configuration.

According to certain embodiments, streams within the desalination system can be recycled. For example, in certain embodiments, at least a portion of the second concentrated aqueous stream is recycled to the second side of the first osmotic membrane. In some embodiments, the first draw inlet stream contains at least a portion of the second concentrated aqueous stream. For example, in FIGS. 2A-2B, at least a portion of stream 226 can be recycled to second side 206 of osmotic membrane 202, in some embodiments. In some such cases, first draw inlet stream 210 can contain at least a portion of second concentrated aqueous stream 226, as indicated by the dotted line connecting streams 226 and 210. In some embodiments, at least a portion of the third concentrated aqueous stream is recycled to the second side of the second osmotic membrane. In some embodiments, the second draw inlet stream contains at least a portion of the third concentrated aqueous stream. For example, in FIG. 2B, at least a portion of stream 238 can be recycled to second side 220 of osmotic membrane 216, in some embodiments. In some such cases, second draw inlet stream 222 can contain at least a portion of third concentrated aqueous stream 238, as indicated by the dotted line connecting streams 238 and 222. In some embodiments, at least a portion of the fourth concentrated aqueous stream is recycled to the second side of the third osmotic membrane. In some embodiments, the third draw inlet stream contains at least a portion of the fourth concentrated aqueous stream. For example, in FIG. 2B, at least a portion of stream 250 can be recycled to second side 232 of osmotic membrane 228, in some embodiments. In some such cases, third draw inlet stream 234 can contain at least a portion of fourth concentrated aqueous stream 250, as indicated by the dotted line connecting streams 250 and 234. Recycling of the streams in this manner can, according to certain although not necessarily all embodiments, simplify operation of the desalination system, reduce the volume of waste generated by the desalination system, and allow steady-state operation to be achieved more easily.

One advantage of certain, although not necessarily all, embodiments is that one or more of the osmotic-membrane-based desalination steps can be performed to achieve a desired degree of desalination while using relatively low transmembrane osmotic pressure gradients. Such low transmembrane osmotic pressure gradients can be advantageous, for example, in certain cases in which reverse osmosis is used to perform desalination, as relatively low transmembrane osmotic pressure gradients can allow one to perform separations using relatively low applied hydraulic pressures, thus potentially reducing energy requirements and/or equipment costs compared to higher hydraulic pressure applications. In some embodiments, at at least one location on the first osmotic membrane, the difference between an osmotic pressure on a first side of the first osmotic membrane and an osmotic pressure on a second side of the first osmotic membrane (i.e., opposite the first side of the first osmotic membrane) is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). For example, in FIGS. 2A-2B, in some embodiments, at at least one location on first osmotic membrane 210, the difference between an osmotic pressure on first side 204 of first osmotic membrane 202 and an osmotic pressure on second side 206 of first osmotic membrane 202 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

Relatively low transmembrane osmotic pressure gradients can also be present, in some embodiments, across the second, third, fourth, and/or additional osmotic membranes. For example, in some embodiments, at at least one location on the second osmotic membrane, the difference between the osmotic pressure on a first side of the second osmotic membrane and an osmotic pressure on a second side of the second osmotic membrane is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). For example, in FIGS. 2A-2B, in some embodiments, at at least one location on second osmotic membrane 216, the difference between an osmotic pressure on first side 218 of second osmotic membrane 216 and an osmotic pressure on second side 220 of second osmotic membrane 216 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). In certain embodiments, at at least one location on the third osmotic membrane, the difference between the osmotic pressure on a first side of the third osmotic membrane and an osmotic pressure on a second side of the third osmotic membrane is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). For example, in FIG. 2B, in some embodiments, at at least one location on third osmotic membrane 228, the difference between an osmotic pressure on first side 230 of third osmotic membrane 228 and an osmotic pressure on second side 232 of third osmotic membrane 228 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). In certain embodiments, at at least one location on the fourth osmotic membrane, the difference between the osmotic pressure on a first side of the fourth osmotic membrane and an osmotic pressure on a second side of the fourth osmotic membrane is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). For example, in FIG. 2B, in some embodiments, at at least one location on fourth osmotic membrane 240, the difference between an osmotic pressure on first side 242 of fourth osmotic membrane 240 and an osmotic pressure on second side 244 of fourth osmotic membrane 240 is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

According to certain embodiments, the transmembrane osmotic pressure gradient spatially-averaged across the facial area of one or more of the osmotic membranes (e.g., the first osmotic membrane such as membrane 202 in FIGS. 2A-2B, the second osmotic membrane such as membrane 216 in FIGS. 2A-2B, the third osmotic membrane such as membrane 228 in FIG. 2B, and/or the fourth osmotic membrane such as membrane 240 in FIG. 2B) is relatively small. The spatially-averaged transmembrane osmotic pressure gradient across a facial area of a particular osmotic membrane can be calculated using a similar methodology as the calculation of the spatially-averaged transmembrane net driving force described above. For example, one can measure the osmotic pressure at all points along the facial area of the first side of the osmotic membrane, measure the osmotic pressure at all points along the facial area of the second side of the osmotic membrane, and calculate the two-dimensional distribution (across the facial area of the membrane) of the transmembrane osmotic pressure gradient (by subtracting, at each point across the facial area of the osmotic membrane, the osmotic pressure on the second side of the osmotic membrane from the osmotic pressure on the opposite point on the first side of the osmotic membrane). One can then spatially average the two-dimensional distribution of the transmembrane osmotic pressure gradient. To illustrate an exemplary calculation of the spatially-averaged transmembrane osmotic pressure gradient, reference is made to FIGS. 1C-1D. To determine the spatially-averaged transmembrane osmotic pressure gradient across facial area 163 of membrane 102 in FIGS. 1C-1D, one would calculate the two-dimensional distribution of the transmembrane osmotic pressure gradient (i.e., ($\Pi_1-\Pi_2$)) at each point across facial area 163 of osmotic membrane 102. At each point along the facial area of the osmotic membrane, the osmotic pressures would be determined at a point on a first side of the osmotic membrane and a corresponding, opposite point on the second side of the osmotic membrane. For example, in FIGS. 1C-1D, transmembrane osmotic pressure gradients would be determined between points 150A and 152A, between points 150B and 152B, between points 150C and 152C, between points 150D and 152D, between points 150E and 152E, and at a statistically representative number of point pairs across facial area 163 until a 2-dimensional profile of the transmembrane osmotic pressure gradient is produced. The spatially-averaged transmembrane osmotic pressure gradient across facial area 163 of membrane 102 would then be calculated by number averaging the transmembrane osmotic pressure gradients at each point within the 2-dimensional profile.

In certain embodiments, the transmembrane osmotic pressure gradient, spatially-averaged across the facial area of the membrane, for one or more of the osmotic membranes within the system (e.g., across the first osmotic membrane, the second osmotic membrane, the third osmotic membrane, and/or the fourth osmotic membrane) is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

Achieving a relatively low spatially-averaged transmembrane osmotic pressure gradient across a facial area of an osmotic membrane can be achieved, for example, by controlling the osmotic pressure of the streams fed to either side of the osmotic membrane (e.g., by controlling salt types and/or salt concentrations within the streams). According to certain embodiments, the difference between the osmotic pressure within the aqueous feed stream and the osmotic pressure within the first draw product stream is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). In certain embodiments, the difference between the osmotic pressure of the first draw product stream and the osmotic pressure of the second draw product stream is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more). In some embodiments, the difference between the osmotic pressure of the second draw product stream and the osmotic pressure of the third draw product stream is less than about 45 bar, less than about 40 bar, less than about 35 bar, less than about 30 bar, less than about 25 bar, less than about 20 bar, or less (and/or, in some embodiments, at least about 1 bar, at least about 2 bar, at least about 5 bar, at least about 10 bar, or more).

In some embodiments, the transmembrane net driving forces from one osmotic membrane to another within the desalination system are relatively closely matched in magnitude. The use of similar transmembrane net driving forces from one osmotic membrane to another within the desalination system can allow one, according to certain embodiments, to perform desalination using applied pressures that are relatively closely matched in magnitude from membrane to membrane.

According to certain embodiments, the difference between the osmotic pressure of the first draw product stream and the osmotic pressure of the second draw inlet stream and the difference between the osmotic pressure of the second draw product stream and the osmotic pressure of the third draw inlet stream are within about 20%, within about 10%, within about 5%, within about 2%, or within about 1% of each other. For example, referring to FIG. 2B, in some embodiments, first draw product stream 212 can have an osmotic pressure ($\Pi_{212}$) and second draw inlet stream 222 can have an osmotic pressure ($\Pi_{212}$), such that the difference between the osmotic pressure within the first draw product stream and the osmotic pressure of the second draw inlet stream is calculated as $\Pi_{212}-\Pi_{222}$. In addition, second draw product stream 224 can have an osmotic pressure ($\Pi_{224}$) and third draw inlet stream 234 can have an osmotic pressure ($\Pi_{234}$), such that the difference between the osmotic pressure within the second draw product stream and the osmotic pressure of the third draw inlet stream is calculated as $\Pi_{224}-\Pi_{234}$. In some such embodiments, the difference between the osmotic pressure within the first draw product stream and the osmotic pressure of the second draw inlet stream ($\Pi_{212}-\Pi_{222}$) and the difference between the osmotic pressure within the second draw product stream and the osmotic pressure of the third draw inlet stream ($\Pi_{224}-\Pi_{234}$) are within about 20%, within about 10%, within about 5%, within about 2%, or within about 1% of each other.

According to certain embodiments, the difference between the osmotic pressure of the second draw product stream and the osmotic pressure of the third draw inlet stream and the difference between the osmotic pressure of the third draw product stream and the osmotic pressure of the fourth draw inlet stream are within about 20%, within about 10%, within about 5%, within about 2%, or within about 1% of each other. For example, referring to FIG. 2B, in some embodiments, second draw product stream 224 can have an osmotic pressure ($\Pi_{224}$) and third draw inlet stream 234 can have an osmotic pressure ($\Pi_{234}$), such that the difference between the osmotic pressure within the second draw product stream and the osmotic pressure of the third draw inlet stream is calculated as $\Pi_{224}-\Pi_{234}$. In addition, third draw product stream 236 can have an osmotic pressure ($\Pi_{236}$) and fourth draw inlet stream 246 can have an osmotic pressure ($\Pi_{246}$), such that the difference between the osmotic pressure within the third draw product stream and the osmotic pressure of the fourth draw inlet stream is calculated as $\Pi_{236}-\Pi_{246}$. In some such embodiments, the difference between the osmotic pressure of the second draw product stream and the osmotic pressure of the third draw inlet stream ($\Pi_{224}-\Pi_{234}$) and the difference between the osmotic pressure within the third draw product stream and the osmotic pressure of the fourth draw inlet stream ($\Pi_{236}-\Pi_{246}$) are within about 20%, within about 10%, within about 5%, within about 2%, or within about 1% of each other.

In some embodiments, the spatially-averaged transmembrane net driving force across the facial area of the second osmotic membrane and the spatially-averaged transmembrane net driving force across the facial area of the third osmotic membrane are within about 10%, within about 5%, within about 2%, or within about 1% of each other. In some embodiments, the spatially-averaged transmembrane net driving force across the facial area of the third osmotic membrane and the spatially-averaged transmembrane net driving force across the facial area of the fourth osmotic membrane are within about 10%, within about 5%, within about 2%, or within about 1% of each other.

When calculating the percentage difference between two values (unless specified otherwise herein), the percentage calculation is made using the value that is larger in magnitude as the basis. To illustrate, if a first value is $V_1$, and a second value is $V_2$ (which is larger than $V_1$), the percentage difference ($V_{\% \, Diff}$) between $V_1$ and $V_2$ would be calculated as:

$$V_{\%Diff} = \frac{V_2 - V_1}{V_2} \times 100\% \qquad [5]$$

and the first and second values would be said to be within X % of each other if $V_{\% \, Diff}$ is X % or less.

For example, if a first osmotic pressure difference ($\Delta\pi_1$) and a second osmotic pressure difference ($\Delta\pi_2$) are being compared, and the second osmotic pressure difference is larger in magnitude than the first osmotic pressure difference, the percentage difference ($\Delta\pi_{\% \, Diff}$) would be calculated as:

$$\Delta\pi_{\%Diff} = \frac{\Delta\pi_2 - \Delta\pi_1}{\Delta\pi_2} \times 100\% \qquad [5A]$$

and the first and second osmotic pressure differences would be said to be within X % of each other if $\Delta\pi_{\% \, Diff}$ is X % or less.

In some embodiments, at least a portion of the energy used to pressurize one or more streams (e.g., for performing reverse osmosis) is recovered from the system. The recovered energy may be used, for example, to heat and/or pressurize another stream within the desalination system.

Some embodiments comprise, after transporting at least a portion of the first draw product stream from the second side of the first osmotic membrane across a first side of a second osmotic membrane, reducing a pressure of the portion of the first draw product stream transported across the first side of the second osmotic membrane. For example, referring to FIG. 2B, in some embodiments, after transporting at least a portion of first draw product stream 212 from the second side of first osmotic membrane 202 across first side 218 of second osmotic membrane 216, the pressure of second concentrated aqueous stream 226 can be reduced. In certain embodiments, after transporting at least a portion of the second draw product stream from the second side of the second osmotic membrane across a first side of a third osmotic membrane, the pressure of the portion of the second draw product stream transported across the first side of the third osmotic membrane is reduced. For example, referring to FIG. 2B, in some embodiments, after transporting at least a portion of second draw product stream 224 from the second side of second osmotic membrane 216 across first side 230 of third osmotic membrane 228, the pressure of third aqueous concentrated stream 238 can be reduced. In some embodiments, after transporting at least a portion of the third draw product stream from the second side of the third osmotic membrane across a first side of a fourth osmotic membrane, the pressure of the portion of the third draw product stream transported across the first side of the fourth osmotic membrane is reduced. For example, referring to FIG. 2B, in some embodiments, after transporting at least a portion of third draw product stream 236 from the second side of third osmotic membrane 228 across first side 242 of fourth osmotic membrane 240, the pressure of fourth concentrated aqueous stream 250 can be reduced.

Some embodiments comprise recovering at least a portion of the energy released by the reduction of the pressure of a stream that exits a retentate side of an osmotic membrane (e.g., any of the concentrated aqueous streams described elsewhere herein). For example, referring to FIGS. 2A-2B, some embodiments comprise recovering at least a portion of the energy released by the reduction of the pressure of concentrated aqueous stream 214, which exits first side 204 of osmotic membrane 202 (which is the retentate side of osmotic membrane 202), such as when first osmotic membrane 202 is used to perform pressure-assisted forward osmosis or reverse osmosis. As another example, certain embodiments comprise recovering at least a portion of the energy released by the reduction of the pressure of concentrated aqueous stream 226, which exits first side 218 of second osmotic membrane 216 (which is the retentate side of osmotic membrane 216). As yet another example, some embodiments comprise recovering at least a portion of the energy released by the reduction of pressure of third concentrated aqueous stream 238, which exits first side 230 of third osmotic membrane 228 (which is the retentate side of osmotic membrane 228). Some embodiments comprise recovering at least a portion of the energy released by the reduction of pressure of concentrated aqueous stream 250 which exits first side 242 of osmotic membrane 240 (which is the retentate side of osmotic membrane 240).

Certain embodiments comprise recovering at least a portion of the energy released by the reduction of the pressure of a draw product stream that has been transported across the retentate (first) side of an osmotic membrane.

According to some embodiments, at least a portion of the recovered energy may be used to increase the pressure of another stream in the system, which can reduce overall energy costs within the system. For example, the recovered energy can be used, according to certain embodiments, to increase the pressure of a draw product stream before the draw product stream is transported across an osmotic membrane (e.g., after the draw product stream has been transported across the permeate side of an osmotic membrane, and before the draw product stream is transported across the retentate side of an osmotic membrane).

Some embodiments comprise recovering at least a portion of the energy released by the reduction of the pressure of the portion of the first draw product stream transported across the first side of the second osmotic membrane. In some such embodiments, at least a portion of the recovered energy is used to increase the pressure of the portion of the first draw product stream transported across the first side of the second osmotic membrane, before the portion of the first draw product stream is transported across the first side of the second osmotic membrane. For example, referring to FIG. 2B, in some embodiments, at least a portion of the energy released by reducing the pressure of second concentrated aqueous stream 226 (which includes the portion of first draw product stream 212 transported across first side 218 of second osmotic membrane 216) is recovered. In some such embodiments, at least a portion of the recovered energy is used to increase the pressure of at least a portion of first draw product stream 212 before it is transported across first side 218 of second osmotic membrane 216.

Some embodiments comprise recovering at least a portion of the energy released by the reduction of the pressure of the portion of the second draw product stream transported across the first side of the third osmotic membrane. In some such embodiments, at least a portion of the recovered energy is used to increase the pressure of the portion of the second draw product stream transported across the first side of the third osmotic membrane, before the portion of the second draw product stream is transported across the first side of the third osmotic membrane. For example, referring to FIG. 2B, in some embodiments, at least a portion of the energy released by reducing the pressure of third concentrated aqueous stream 238 (which includes the portion of second draw product stream 224 transported across first side 230 of third osmotic membrane 228) is recovered. In some such embodiments, at least a portion of the recovered energy is used to increase the pressure of at least a portion of second draw product stream 224 before it is transported across first side 230 of third osmotic membrane 228.

Some embodiments comprise recovering at least a portion of the energy released by the reduction of the pressure of the portion of the third draw product stream transported across the first side of the fourth osmotic membrane. In some such embodiments, at least a portion of the recovered energy is used to increase the pressure of the portion of the third draw product stream transported across the first side of the fourth osmotic membrane, before the portion of the third draw product stream is transported across the first side of the fourth osmotic membrane. For example, referring to FIG. 2B, in some embodiments, at least a portion of the energy released by reducing the pressure of fourth concentrated aqueous stream 250 (which includes the portion of third draw product stream 236 transported across first side 242 of fourth osmotic membrane 240) is recovered. In some such embodiments, at least a portion of the recovered energy is used to increase the pressure of at least a portion of third draw product stream 236 before it is transported across first side 242 of fourth osmotic membrane 240.

Certain embodiments comprise recovering at least a portion of the energy released by the reduction of the pressure of a stream that exits a retentate side of an upstream osmotic membrane, and at least a portion of the energy that is recovered can be used to increase the pressure of a stream that is transported across the retentate side of a downstream osmotic membrane (i.e., an osmotic membrane that is downstream of the upstream osmotic membrane). In some embodiments, at least a portion of the energy recovered via the reduction of the pressure of the stream that exits the retentate side of the upstream osmotic membrane can be used to increase the pressure of a stream that exits the permeate side of the upstream osmotic membrane. In some such embodiments, at least a portion of the stream that exits the permeate side of the upstream osmotic membrane can then be transferred across the retentate side of a downstream osmotic membrane.

Certain embodiments comprise recovering at least a portion of the energy released by reducing the pressure of the first concentrated aqueous stream that exits the first side of the first osmotic membrane. In some embodiments, at least a portion of the recovered energy is used to increase the pressure of at least a portion of the first draw product stream before it is transported across the first side of the second osmotic membrane. At least a portion, or all, of the first draw product stream may originate, for example, from the permeate side of the first osmotic membrane. For example, referring to FIG. 2B, in some embodiments, at least a portion of the energy released by reducing the pressure of concentrated aqueous stream 214 is recovered. In some such embodiments, at least a portion of the recovered energy is used to increase the pressure of at least a portion of first draw product stream 212 (which originates from second side 206 (the permeate side) of first osmotic membrane 202) before it is transported across first side 218 of second osmotic membrane 216.

Some embodiments comprise recovering at least a portion of the energy released by reducing the pressure of the second concentrated aqueous stream that exits the first side of the second osmotic membrane. In some such embodiments, at least a portion of the recovered energy is used to increase the pressure of at least a portion of the second draw product stream before it is transported across the first side of the third osmotic membrane. At least a portion, or all, of the second draw product stream may originate, for example, from the permeate side of the second osmotic membrane. For example, referring to FIG. 2B, in some embodiments, at least a portion of the energy released by reducing the pressure of second concentrated aqueous stream 226 is recovered. In some such embodiments, at least a portion of the recovered energy is used to increase the pressure of at least a portion of second draw product stream 224 (which originates from second side 220 (the permeate side) of second osmotic membrane 216) before it is transported across first side 230 of third osmotic membrane 228.

Certain embodiments comprise recovering at least a portion of the energy released by reducing the pressure of the third concentrated aqueous stream that exits the first side of the third osmotic membrane. In some such embodiments, at least a portion of the recovered energy is used to increase the pressure of at least a portion of the third draw product stream before it is transported across the first side of the fourth osmotic membrane. At least a portion, or all, of the third draw product stream may originate, for example, from the permeate side of the third osmotic membrane. For example, referring to FIG. 2B, in some embodiments, at least a portion of the energy released by reducing the pressure of third concentrated aqueous stream 238 is recovered. In some such embodiments, at least a portion of the recovered energy is used to increase the pressure of at least a portion of third draw product stream 236 (which originates from second side 232 (which is the permeate side) of third osmotic membrane 228) before it is transported across first side 242 of fourth osmotic membrane 240.

According to certain embodiments, combinations of the energy recovery methods described above can be employed. For example, some embodiments comprise recovering at least a portion of the energy released by the reduction of the pressure of a stream that exits a retentate side of an upstream osmotic membrane and recovering at least a portion of energy released by the reduction of the pressure of a stream that exits a retentate side of a downstream osmotic membrane (i.e., an osmotic membrane that is downstream of the upstream osmotic membrane). In some such embodiments, at least a portion of the energy recovered from the reduction of the pressure of the stream that exits the retentate side of the upstream osmotic membrane and at least a portion of the energy recovered from the reduction of the pressure of the stream that exits the retentate side of the downstream osmotic membrane are used to increase the pressure of another stream in the system (e.g., to increase the pressure of the stream that exits the permeate side of the upstream osmotic membrane and/or to increase the pressure of the stream that enters the retentate side of the downstream osmotic membrane).

For example, referring to FIG. 2B, some embodiments comprise (1) recovering at least a portion of the energy released by the reduction of the pressure of concentrated aqueous stream 238 which exits first side 230 (which is the retentate side) of third osmotic membrane 228 (which is upstream of fourth osmotic membrane 240) and (2) recovering at least a portion of energy released by the reduction of the pressure of concentrated aqueous stream 250 which exits first side 242 (which is the retentate side) of osmotic membrane 240 (which is downstream of third osmotic membrane 228). In some such embodiments, at least a portion of the energy recovered from the reduction of the pressure of concentrated aqueous stream 238 and at least a portion of the energy recovered from the reduction of the pressure of concentrated aqueous stream 250 are used to increase the pressure of third draw product stream 236, which exits second side 228 of third osmotic membrane and/or to increase the pressure of the portion of third draw product stream 236 that is transported across first side 242 of fourth osmotic membrane 240 before the portion of third draw product stream 236 is transported across first side 242 of fourth osmotic membrane 240. In some such embodiments, a first pressure exchange device can be used to transfer energy from stream 238 to stream 236, and a second pressure exchange device can be used to transfer energy from stream 250 to stream 236.

As another example, again referring to FIG. 2B, in some embodiments, fourth osmotic membrane 240 is not present (as it is an optional feature). Some embodiments comprise (1) recovering at least a portion of the energy released by the reduction of the pressure of concentrated aqueous stream 226 which exits first side 218 (which is the retentate side) of second osmotic membrane 216 (which is upstream of third osmotic membrane 228) and (2) recovering at least a portion of energy released by the reduction of the pressure of concentrated aqueous stream 238 which exits first side 230 (which is the retentate side) of third osmotic membrane 228 (which is downstream of second osmotic membrane 216). In some such embodiments, at least a portion of the energy recovered from the reduction of the pressure of concentrated aqueous stream 226 and at least a portion of the energy recovered from the reduction of the pressure of concentrated aqueous stream 238 are used to increase the pressure of second draw product stream 224, which exits second side 220 of second osmotic membrane 216 and/or to increase the pressure of the portion of second draw product stream 224 that is transported across first side 218 of third osmotic membrane 228 before the portion of second draw product stream 224 is transported across first side 230 of third osmotic membrane 228. In some such embodiments, a first pressure exchange device can be used to transfer energy from stream 226 to stream 224, and a second pressure exchange device can be used to transfer energy from stream 238 to stream 224.

According to certain embodiments, the recovery of energy from multiple streams (e.g., from a stream that exits a retentate side of an upstream osmotic membrane and from a stream that exits a retentate side of a downstream osmotic membrane), as described in the preceding paragraphs, can be used to pressurize a stream that is transported to the retentate side of the final osmotic membrane in a series of osmotic membranes. The "final" osmotic membrane, in this context, refers to the osmotic membrane that produces the final aqueous product, and after which, no additional osmosis steps are performed. Referring to FIG. 2B, for example, in some embodiments in which fourth osmotic membrane 240 is present, fourth osmotic membrane 240 can be the final osmotic membrane in a series of osmotic membranes. In some such embodiments, third osmotic membrane may be the penultimate osmotic membrane in a series of osmotic membranes. In some such embodiments, one or more intermediate osmotic membranes can be positioned between second osmotic membrane 216 and third osmotic membrane 228 within the series of osmotic membranes. In certain such embodiments, energy is recovered by reducing the pressure of concentrated aqueous stream 238 and by reducing the pressure of concentrated aqueous stream 250, and at least portions of the energies recovered from the reduction of the pressure of concentrated aqueous stream 238 and concentrated aqueous stream 250 are used to increase the pressure of third draw product stream 236 (e.g., as it exits second side 232 of third osmotic membrane 228 and/or before it is fed to first side 242 of fourth osmotic membrane 240). In some embodiments, fourth draw product stream 248 forms all or part of a final product stream (e.g., purified water), and, in some such cases, no further osmosis steps are performed on stream 248.

As another example, again referring to FIG. 2B, in some embodiments, fourth osmotic membrane is absent. In some embodiments, third osmotic membrane 228 can be the final osmotic membrane in a series of osmotic membranes. In some such embodiments, second osmotic membrane 216 may be the penultimate osmotic membrane in a series of osmotic membranes. In certain such embodiments, energy is recovered by reducing the pressure of concentrated aqueous stream 226 and by reducing the pressure of concentrated aqueous stream 238, and at least portions of the energies recovered from the reduction of the pressure of concentrated aqueous stream 226 and concentrated aqueous stream 238 are used to increase the pressure of second draw product stream 224 (e.g., as it exits second side 220 of second osmotic membrane 216 and/or before it is fed to first side 230 of third osmotic membrane 228). In some embodiments, third draw product stream 236 forms all or part of a final product stream (e.g., purified water), and, in some such cases, no further osmosis steps are performed on stream 236.

Energy from a pressurized stream can be recovered via any suitable method. For example, in some embodiments, a pressure exchange device can be used to recover energy from a pressurized stream. Those of ordinary skill in the art are familiar with pressure exchange devices, in which pressure energy from a high pressure fluid stream is transferred to a low pressure fluid stream. An exemplary type of pressure exchange device is a rotary pressure exchanger, for example, as described in U.S. Pat. No. 7,306,437. For example, in some embodiments, energy (e.g., as direct hydraulic pressure) can be recovered by directly contacting a pressurized stream with a stream at a lower pressure, such that the lower pressure stream is pressurized and the higher pressure stream is depressurized (e.g., throttled). Energy can also be recovered in the system using other devices such as, for example, a turbine (e.g., a Pelton wheel).

The systems and methods described herein can be used to process a variety of aqueous feed streams. According to certain embodiments, the stream fed to the desalination system is an aqueous stream comprising at least one solubilized ion species. For example, referring to FIGS. 2A-2B, aqueous feed stream 208 can comprise an aqueous stream comprising at least one solubilized ion species. The solubilized ion(s) may originate, for example, from a salt that has been dissolved in the aqueous stream. A solubilized ion is generally an ion that has been solubilized to such an extent that the ion is no longer ionically bonded to a counter-ion. The aqueous feed stream can comprise any of a number of solubilized ion species including, but not limited to, $Na^+$, $Mg^{2+}$, $Ca^{2+}$, $Sr^{2+}$, $Ba^{2+}$, $Cl^-$, carbonate anions, bicarbonate anions, sulfate anions, bisulfate anions, and/or dissolved silica. In some embodiments, the aqueous feed stream comprises at least one solubilized monovalent cation (i.e., a cation with a redox state of +1 when solubilized). For example, in some embodiments, the aqueous feed stream comprises $Na^+$ and/or $K^+$. In certain embodiments, the aqueous feed stream comprises at least one monovalent anion (i.e., an anion having redox state of −1 when solubilized). For example, in some embodiments, the aqueous feed stream comprises $Cl^-$ and/or $Br^-$. In some embodiments, the aqueous feed stream comprises at least one monovalent cation and at least one monovalent anion. In some embodiments, the aqueous feed stream comprises one or more divalent cations (i.e., a cation with a redox state of +2 when solubilized) and/or one or more divalent anions (i.e., an anion with a redox state of −2 when solubilized). Cations and/or anions having other valencies may also be present in the aqueous feed stream, in some embodiments.

In some embodiments, the total concentration of solubilized ions in the aqueous feed stream fed to the first osmotic membrane (e.g., stream 208 fed to first osmotic membrane 202 in FIGS. 2A-2B) can be relatively high. As noted elsewhere, one advantage associated with certain embodiments is that initial aqueous feed streams with relatively high solubilized ion concentrations can be desalinated without the use of energy intensive desalination methods. In certain embodiments, the total concentration of solubilized ions in the aqueous feed stream transported to the first osmotic membrane is at least about 60,000 ppm, at least about 80,000 ppm, or at least about 100,000 ppm (and/or, in some embodiments, up to about 500,000 ppm, or more). Aqueous feed streams with solubilized ion concentrations outside these ranges could also be used.

According to certain embodiments, the aqueous feed stream that is transported to the first osmotic membrane (e.g., stream 208 fed to first osmotic membrane 202 in FIGS. 2A-2B) comprises a suspended and/or emulsified immiscible phase. Generally, a suspended and/or emulsified immiscible phase is a material that is not soluble in water to a level of more than 10% by weight at the temperature and other conditions at which the stream is operated. In some embodiments, the suspended and/or emulsified immiscible phase comprises oil and/or grease. The term "oil" generally refers to a fluid that is more hydrophobic than water and is not miscible or soluble in water, as is known in the art. Thus, the oil may be a hydrocarbon in some embodiments, but in other embodiments, the oil may comprise other hydrophobic fluids. In some embodiments, at least about 0.1 wt %, at least about 1 wt %, at least about 2 wt %, at least about 5 wt %, or at least about 10 wt % (and/or, in some embodiments, up to about 20 wt %, up to about 30 wt %, up to about 40 wt %, up to about 50 wt %, or more) of the aqueous feed stream is made up of a suspended and/or emulsified immiscible phase.

In certain embodiments, the first osmotic membrane is configured such that little or none of the suspended and/or emulsified immiscible phase is transported through the first osmotic membrane. For example, in some embodiments, less than about 10 wt %, less than about 5 wt %, less than about 2 wt %, less than about 1 wt %, or substantially none of the suspended and/or emulsified immiscible phase is transported through the first osmotic membrane as the aqueous feed stream is transported across the first osmotic membrane.

While the first osmotic membrane can be used to separate a suspended and/or emulsified immiscible phase from an incoming aqueous feed stream, such separation is optional. For example, in some embodiments, the aqueous feed stream transported to the desalination system is substantially free of a suspended and/or emulsified immiscible phase. In certain embodiments, one or more separation units upstream of the first osmotic membrane can be used to at least partially remove a suspended and/or emulsified immiscible phase from an aqueous feed stream before the aqueous feed stream is transported to the first osmotic membrane. Non-limiting examples of such systems are described, for example, in International Patent Publication No. WO 2015/021062, published on Feb. 12, 2015, which is incorporated herein by reference in its entirety for all purposes.

In some embodiments, the aqueous feed stream can be derived from seawater, ground water, brackish water, and/or the effluent of a chemical process. In the oil and gas industry, for example, one type of aqueous feed stream that may be encountered is produced water (e.g., water that emerges from oil or gas wells along with the oil or gas). Due to the length of time produced water has spent in the ground, and due to high subterranean pressures and temperatures that may increase the solubility of certain salts and minerals, produced water often comprises relatively high concentrations of dissolved salts and minerals. For example, some produced water streams may comprise a supersaturated solution of dissolved strontium sulfate ($SrSO_4$). In contrast, another type of aqueous feed stream that may be encountered in the oil and gas industry is flowback water (e.g., water that is injected as a fracking fluid during hydraulic fracturing operations and subsequently recovered). Flowback water often comprises a variety of constituents used in fracking, including surfactants, proppants, and viscosity reducing agents, but often has a lower salinity than produced water. In some cases, the systems and methods described herein can be used to at least partially desalinate aqueous feed streams derived from such process streams.

The first draw inlet stream (e.g., stream 210 in FIGS. 2A-2B) can comprise, according to certain embodiments, any component(s) suitable for imparting an appropriate osmotic pressure to perform the functions described herein. In some embodiments, the first draw inlet stream is an aqueous solution comprising one or more solubilized species, such as one or more dissolved ions and/or one or more dissociated molecules. For example, in some embodiments, the first draw inlet stream comprises $Na^+$, $Mg^{2+}$, $Ca^{2+}$, $Sr^{2+}$, $Ba^{2+}$, and/or $Cl^-$. In some embodiments, the first draw inlet stream comprises at least one solubilized monovalent cation, such as $Na^+$ and/or $K^+$. In certain embodiments, the first draw inlet stream comprises at least one monovalent anion, such as $Cl^-$ and/or $Br^-$. Cations and/or anions having other valencies may also be present in the first draw inlet stream. Other species could also be used in the draw stream. For example, in some embodiments, the first draw inlet stream can be an aqueous stream comprising a solubilized non-ionic species, such as ammonia ($NH_3$).

The second draw inlet stream (e.g., stream 222 in FIGS. 2A-2B) can also comprise any component(s) suitable for imparting an appropriate osmotic pressure to perform the functions described herein, according to certain embodiments. In some embodiments, the second draw inlet stream is an aqueous solution comprising one or more solubilized species, such as one or more dissolved ions and/or one or more dissociated molecules. For example, in some embodiments, the second draw inlet stream comprises $Na^+$, $Mg^{2+}$, $Ca^{2+}$, $Sr^{2+}$, $Ba^{2+}$, and/or $Cl^-$. In some embodiments, the second draw inlet stream comprises at least one solubilized monovalent cation, such as $Na^+$ and/or $K^+$. In certain embodiments, the second draw inlet stream comprises at least one monovalent anion, such as $Cl^-$ and/or $Br^-$. Cations and/or anions having other valencies may also be present in the second draw inlet stream. Other species could also be used in the second draw inlet stream. For example, in some embodiments, the second draw inlet stream can be an aqueous stream comprising a solubilized non-ionic species, such as ammonia ($NH_3$). The second draw inlet stream can included solubilized species (e.g., solubilized ion species) that are the same as or different from those present in the first draw inlet stream. In some embodiments, the total molar concentration (in units of molarity) of solubilized species (e.g., solubilized ions) in the second draw inlet stream is lower than the total molar concentration of solubilized species (e.g., solubilized ions) in the first draw inlet stream.

The third draw inlet stream (e.g., stream 234 in FIG. 2B) can also, according to certain embodiments, comprise any component(s) suitable for imparting an appropriate osmotic pressure to perform the functions described herein. In some embodiments, the third draw inlet stream is an aqueous solution comprising one or more solubilized species, such as one or more ions and/or one or more dissociated molecules. For example, in some embodiments, the third draw inlet stream comprises $Na^+$, $Mg^{2+}$, $Ca^{2+}$, $Sr^{2+}$, $Ba^{2+}$, and/or $Cl^-$. In some embodiments, the third draw inlet stream comprises at least one solubilized monovalent cation, such as $Na^+$ and/or $K^+$. In certain embodiments, the third draw inlet stream comprises at least one monovalent anion, such as $Cl^-$ and/or $Br^-$. Cations and/or anions having other valencies may also be present in the third draw inlet stream. Other species could also be used in the third draw inlet stream. For example, in some embodiments, the third draw inlet stream can be an aqueous stream comprising a solubilized a non-ionic species, such as ammonia ($NH_3$). The third draw inlet stream can included solubilized species (e.g., solubilized ions) that are the same as or different from those present in the first and/or second draw inlet stream. In some embodiments, the total molar concentration of solubilized species (e.g., solubilized ions) in the third draw inlet stream is lower than the total molar concentration of solubilized species (e.g., solubilized) ions in the second draw inlet stream.

The fourth draw inlet stream (e.g., stream 246 in FIG. 2B) can also comprise any component(s) suitable for imparting an appropriate osmotic pressure to perform the functions described herein, according to certain embodiments. In some embodiments, the fourth draw inlet stream is an aqueous solution comprising one or more solubilized species, such as one or more dissolved ions and/or one or more dissociated molecules. For example, in some embodiments, the fourth draw inlet stream comprises $Na^+$, $Mg^{2+}$, $Ca^{2+}$, $Sr^{2+}$, $Ba^{2+}$, and/or $Cl^-$. In some embodiments, the fourth draw inlet stream comprises at least one solubilized monovalent cation, such as $Na^+$ and/or $K^+$. In certain embodiments, the fourth draw inlet stream comprises at least one monovalent anion, such as $Cl^-$ and/or $Br^-$. Cations and/or anions having other valencies may also be present in the fourth draw inlet stream. Other species could also be used in the fourth draw inlet stream. For example, in some embodiments, the fourth draw inlet stream is an aqueous stream comprising a solubilized non-ionic species, such as ammonia ($NH_3$). The fourth draw inlet stream can include solubilized ion species that are the same as or different from those present in the first, second, and/or third draw inlet streams. In some embodiments, the total molar concentration of solubilized species (e.g., solubilized ions) in the fourth draw inlet stream is lower than the total molar concentration of solubilized species (e.g., solubilized ions) in the third draw inlet stream.

Those of ordinary skill in the art, given the insight provided by the present disclosure, would be capable of selecting appropriate components for use in the various draw streams described herein.

The draw inlet streams may be prepared, according to certain embodiments, by suspending and/or dissolving one or more species in a solvent, such as an aqueous solvent) to solubilize the species in the solvent. For example, in some embodiments, one or more draw inlet streams can be made by dissolving one or more solid salts in an aqueous solvent. Non-limiting examples of salts that may be dissolved in water include NaCl, $CaCl_2$, $MgCl_2$, and the like. In some embodiments, the draw stream can be prepared by mixing ammonia with water. In certain embodiments, the draw stream can be prepared by dissolving one or more ammonia salts (e.g., ammonium bicarbonate, ammonium carbonate, and/or ammonium carbamate) in water. In some embodiments, the draw stream can be prepared by dissolving ammonia and carbon dioxide gasses in water.

Those of ordinary skill in the art are familiar with osmotic membranes. The membrane medium can comprise, for example, a metal, a ceramic, a polymer (e.g., polyamides, polyethylenes, polyesters, poly(tetrafluoroethylene), polysulfones, polycarbonates, polypropylenes, poly(acrylates)), and/or composites or other combinations of these. Osmotic membranes generally allow for the selective transport of water through the membrane, in which water is capable of being transmitted through the membrane while solubilized species (e.g., ions) are inhibited from being transported through the membrane. Examples of commercially available osmotic membranes that can be used in association with certain of the embodiments described herein include, but are not limited to, those commercially available from Dow Water and Process Solutions (e.g., FilmTec™ membranes), Hydranautics, GE Osmonics, and Toray Membrane, among others known to those of ordinary skill in the art.

It should be understood that, where a single membrane is shown or described, such single membranes could be replaced with multiple, parallel-connected osmotic membranes. The use of multiple, parallel-connected osmotic membranes can, for example, increase the capacity of the system.

U.S. Provisional Patent Application Ser. No. 62/198,413, filed Jul. 29, 2015, and entitled "Osmotic Desalination Methods and Associated Systems" is incorporated herein by reference in its entirety for all purposes.

The following examples are intended to illustrate certain embodiments of the present invention, but do not exemplify the full scope of the invention.

Example 1

In this example, a single stage osmotic membrane system is described, which is used to perform draw-assisted reverse osmosis. The system contained a single nonporous membrane with a feed side, across which a pressurized influent feed stream flowed, and a draw side, across which an influent draw stream flowed.

The systems was operated as follows, with reference to the exemplary diagram shown in FIG. 1A. The system comprised an osmotic membrane 102 with a first side 104 and a second side 106. An influent aqueous feed stream 108 was transported across the first side 104, and an influent draw stream 110 was transported across the second side 106. Water was transported between the first side 104 and second side 106 of the osmotic membrane 102 to produce an aqueous stream 114, from the influent aqueous feed stream 108, and a draw product stream 112, from the draw stream 110.

The osmotic membrane 102 in this system was manufactured by Porifera, and had a total area of 1 m² comprising a nonporous active layer on the first side 104 and a porous nonwoven structural support layer on the second side 106. The osmotic membrane was contained inside a counter-current plate and frame module, also manufactured by Porifera. Aqueous feed stream 108 and draw stream 110 were prepared by dissolving Sonoma sea salt in deionized water.

Aqueous feed stream 108 was pumped from a first vessel across the first side 104 of osmotic membrane 102 by a first diaphragm pump. The hydraulic pressure on the first side 104 was controlled by a Swagelok backpressure regulator at the outlet of the membrane module through which effluent aqueous stream 114 flowed. The aqueous stream 114 was collected in a second vessel. Draw stream 110 was pumped from a third vessel across the second side of osmotic membrane 102 by a second diaphragm pump. The effluent draw product stream 112 was collected in a fourth vessel.

Pressure was measured by dial indicators at the osmotic membrane module outlet through which the effluent aqueous stream 114 flowed and at the osmotic membrane module outlet through which the effluent draw product stream 112 flowed.

Transmembrane pressure was calculated as the difference between the pressure measured at these locations. Flow rates of the influent aqueous feed stream 108, of the effluent aqueous stream 114, of the influent draw stream 110, and of the effluent draw product stream 112 were measured gravimetrically by weighing the first, second, third and fourth vessel respectively at intervals of 10-15 minutes. The weight changes and interval between the weighings of each vessel were used to calculate the mass flow rate of each stream. Difference between the mass flow rate of aqueous feed stream 108 and aqueous stream 114, and the difference between the mass flow rate of draw stream 110 and draw product stream 112 were averaged to calculate the flux across the osmotic membrane 102. Sodium concentration of each stream was analyzed using an inductively coupled plasma optical emission spectrometer manufactured by Perkin Elmer from samples collected from each of the four vessels at increments of 10-15 minutes.

The salinity of the draw stream source was varied and the effect of the variation on transmembrane flux was measured. The osmotic membrane system was allowed to reach a steady state by operating for one hour at fixed conditions before flow rate, pressure, and salinity measurements were taken. A source of aqueous feed stream 108 was prepared and measured to contain 1900 mg/L sodium. The transmembrane pressure was adjusted to 17 psi. The flow rate of the aqueous feed stream 108 was 45.77 ml/min, and the flow rate of the draw stream 110 was 39.28. The salinity of the draw stream source and the resulting transmembrane flux is shown in Table 1.

TABLE 1

| Trial | 1 | 2 | 3 |
|---|---|---|---|
| Draw stream sodium concentration [mg/L] | 0.000 | 851.0 | 1594 |
| Transmembrane flux [ml/min] | −5.971 | 1.301 | 5.535 |

In Table 1, the flux is shown to reverse direction between trials 1 and 2, and increase further in trial 3. In trial 1, the transmembrane pressure was not sufficient to overcome the osmotic pressure difference across the membrane 102, so water flowed across the osmotic membrane 102 from the second side 106 to the first side 104. In trial 2, the salinity of the draw stream 110 reduced the osmotic pressure difference between the two sides. Although the salinity of the feed stream 108 was greater than the salinity of the draw stream 110, the resulting osmotic pressure difference was not sufficient to overcome the transmembrane pressure, resulting in a positive flux from the first side 104 to the second side 106. In trial 3, the osmotic pressure difference is further reduced by the increased salinity of the draw stream 110, resulting in a greater positive flux.

Example 2

In this example, a multistaged osmotic membrane cascade was simulated by repeated experiments on a single osmotic membrane system in which the draw stream product from previous trials was used as the feed stream for each trial after the first.

The systems was operated as follows, with reference to the exemplary diagram shown in FIG. 1A. The system comprised an osmotic membrane 102 with a first side 104 and a second side 106. An influent aqueous feed stream 108 was transported across the first side 104, and an influent draw stream 110 was transported across the second side 106. Water was transported between the first side 104 and second side 106 of the osmotic membrane 102 to produce an aqueous stream 114, from the influent aqueous feed stream 108, and a draw product stream 112, from the draw stream 110.

The osmotic membrane 102 in this system was manufactured by Porifera, and had a total area of 1 m² comprising a nonporous active layer on the first side 104 and a porous nonwoven structural support layer on the second side 106. The osmotic membrane was contained inside a counter-current plate and frame module, also manufactured by Porifera. Aqueous feed stream 108 and draw stream 110 were prepared by dissolving Sonoma sea salt in deionized water.

Aqueous feed stream 108 was pumped from a first vessel across the first side 104 of osmotic membrane 102 by a first diaphragm pump. The hydraulic pressure on the first side 104 was controlled by a Swagelok backpressure regulator at the outlet of the membrane module through which effluent aqueous stream 114 flowed. The aqueous stream 114 was collected in a second vessel. Draw stream 110 was pumped from a third vessel across the second side of osmotic membrane 102 by a second diaphragm pump. The effluent draw product stream 112 was collected in a fourth vessel.

Pressure was measured by dial indicators at the osmotic membrane module outlet through which the effluent aqueous stream 114 flowed and at the osmotic membrane module outlet through which the effluent draw product stream 112 flowed.

Transmembrane pressure was calculated as the difference between the pressure measured at these locations. Flow rates of the influent aqueous feed stream 108, of the effluent aqueous stream 114, of the influent draw stream 110, and of the effluent draw product stream 112 were measured gravimetrically by weighing the first, second, third and fourth vessel respectively at intervals of 10-15 minutes. The weight changes and interval between the weighings of each vessel were used to calculate the mass flow rate of each stream. The difference between the mass flow rate of aqueous feed stream 108 and aqueous stream 114, and the difference between the mass flow rate of draw stream 110 and draw product stream 112 were averaged to calculate the flux across the osmotic membrane 102. The sodium concentration of each stream was analyzed using an inductively coupled plasma optical emission spectrometer manufactured by Perkin Elmer from samples collected from each of the four vessels at increments of 10-15 minutes.

The salinity of the aqueous feed stream 108 and the draw stream 110 were varied in successive trials to simulate a membrane cascade. In the first trial, a starting aqueous feed stream salinity and draw stream salinity was selected. The resulting draw stream product of the first trial was collected and used as the source of the aqueous feed stream 108 in the second trial. The resulting draw product stream of the second trial was collected and used as the source of the aqueous feed stream 108 in the third trial. The resulting draw product stream of the third trial was collected and used as the source of the aqueous feed stream 108 in the fourth trial. The trials, considered together, simulate the system configuration described by FIG. 2B in which a first draw product stream 212, flowing from a first osmotic membrane 202, is fed to the first side of a second osmotic membrane 216. Downstream membranes are similarly fed feed streams comprising the draw product stream resulting from upstream membranes. The cascade experiment was performed for first trial feed streams of 5000 ppm and 50,000 ppm. A set of single stage trials were also performed for each first trial feed salinity, in which the draw stream salinity was equal to the final draw stream salinity of the corresponding cascade experiment. The results of the 5000 ppm feed stream cascade experiment and corresponding single-stage comparison experiment are displayed in Table 2. The results of the 50,000 ppm feed stream experiments are displayed in Table 3.

TABLE 2

| Stage | Feed Salinity [mg/L] | Draw Salinity [mg/L] | Flux [ml/min] | Pressure [psi] |
| --- | --- | --- | --- | --- |
| 1 | 50,000 | 49,000 | 2.4 ± 0.1 | 17 |
| 2 | Draw stream product from stage 1 | 48,000 | 2.12 ± 0.02 | 17 |
| 3 | Draw stream product from stage 2 | 47,000 | 1.98 ± 0.04 | 17 |
| Single stage | 50,000 | 47,000 | 1.3 | 17 |

TABLE 3

| Stage | Feed Salinity [mg/L] | Draw Salinity [mg/L] | Flux [ml/min] | Pressure [psi] |
| --- | --- | --- | --- | --- |
| 1 | 5,000 | 4,000 | 4.63 ± 0.7 | 17 |
| 2 | Draw stream product from stage 1 | 3,000 | 5.58 ± 0.3 | 17 |
| 3 | Draw stream product from stage 2 | 2,000 | 6.4 ± 0.2 | 17 |

TABLE 3-continued

| Stage | Feed Salinity [mg/L] | Draw Salinity [mg/L] | Flux [ml/min] | Pressure [psi] |
| --- | --- | --- | --- | --- |
| 4 | Draw stream product from stage 3 | 1,000 | 7.78 ± 0.4 | 17 |
| Single stage | 5,000 | 1,000 | −0.43 ± 0.07 | 17 |

In Tables 2 and 3, the flux through each of the cascade stages is shown greater than the flux through the corresponding single stage trial. The greater flux through the cascade system indicates that a greater amount of fresh water may be recovered from a saline stream when a cascade configuration is used. In Table 3, the corresponding single stage trial is shown to have a negative flux, indicating an insufficient transmembrane pressure difference. These results demonstrate that a lower transmembrane pressure may be required to overcome an osmotic pressure gradient when a cascade configuration is used.

Prophetic Example 1

This prophetic example describes a desalination system in which an initial forward osmosis process is combined with a series of downstream reverse osmosis processes to produce an aqueous product stream with a higher purity of water than the initial aqueous feed stream.

Figure 3A:
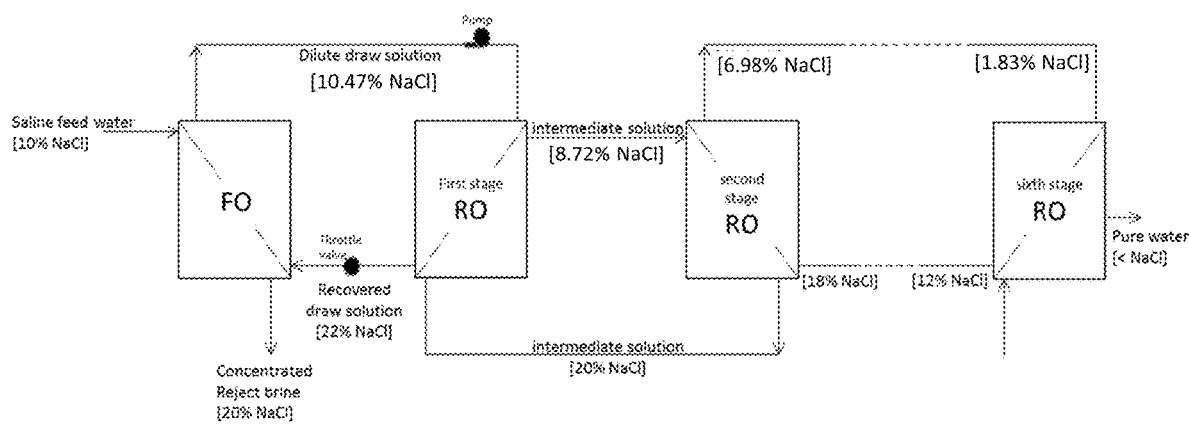
FIG. 3A is a schematic illustration of an exemplary osmotic desalination system comprising a forward osmosis separator coupled with a series of reverse osmosis separators, according to certain embodiments.

An exemplary process is shown in the schematic diagram of FIG. 3A. In FIG. 3A, an aqueous feed stream including 10 wt % dissolved NaCl is transported to a first side of a first osmotic membrane. An aqueous draw solution comprising 22 wt % dissolved NaCl is transported to the second side of the first osmotic membrane, in a counter-flow arrangement relative to the aqueous feed stream. The first osmotic membrane is used to perform forward osmosis, such that a concentrated reject brine stream containing 20 wt % dissolved NaCl is produced and transported away from the first side of the first osmotic membrane, and a diluted draw solution containing 10.47 wt % dissolved NaCl is produced and transported away from the second side of the first osmotic membrane.

In FIG. 3A, the diluted draw solution from the first osmotic membrane is transported, using a pump, to the first side of a second osmotic membrane. An aqueous intermediate draw solution comprising 20 wt % dissolved NaCl is transported to the second side of the second osmotic membrane, in a counter-flow arrangement relative to the dilute draw solution stream. The counter-flow arrangement of the diluted draw solution from the first osmotic membrane and the aqueous intermediate draw solution—and the selection of appropriate concentrations and flow rates—can allow one to operate the second osmotic membrane such that the difference in osmotic pressures between the solutions on either side of the membrane relatively consistent across the facial area of the membrane. A hydraulic pressure of 20 bar is applied to the first side of the second osmotic membrane, and a reverse osmosis process is performed such that a concentrated draw solution stream containing 22 wt % dissolved NaCl is produced and transported away from the first side of the second osmotic membrane, and a diluted intermediate draw solution containing 8.72 wt % dissolved NaCl is produced and transported away from the second side of the second osmotic membrane. At least a portion (or all) of the recovered concentrated draw solution stream can be throttled to a desired pressure (e.g., decreasing the pressure by about 14 bar to a pressure of about 6 bar) and sent back to the first osmotic membrane in a closed or at least partially closed loop.

In FIG. 3A, the diluted intermediate draw solution from the second osmotic membrane is transported, using a pump, to the first side of a third osmotic membrane. An aqueous draw solution comprising 18 wt % dissolved NaCl is transported to the second side of the third osmotic membrane, in a counter-flow arrangement relative to the dilute intermediate draw solution stream. A hydraulic pressure of 20 bar is applied to the first side of the third osmotic membrane, and a reverse osmosis process is performed such that a concentrated draw solution stream containing 20 wt % dissolved NaCl is produced and transported away from the first side of the third osmotic membrane, and a diluted intermediate draw solution containing 6.98 wt % dissolved NaCl is produced and transported away from the second side of the third osmotic membrane. At least a portion (or all) of the recovered concentrated draw solution stream can be throttled to a desired pressure (e.g., decreasing the pressure by about 14 bar to a pressure of about 6 bar) and sent back to the second osmotic membrane in a closed or at least partially closed loop.

Third, fourth, and fifth reverse osmosis processes (not illustrated in FIG. 3A) are also performed, such that a further diluted aqueous stream containing 1.83 wt % dissolved NaCl is produced. The diluted aqueous stream containing 1.83 wt % dissolved NaCl is transported to the first side of a seventh osmotic membrane (to perform a sixth reverse osmosis process). An additional draw solution containing 10 wt % of dissolved NaCl is transported to the second side of the seventh osmotic membrane. A hydraulic pressure of 20 bar is applied to the first side of the seventh osmotic membrane, and a reverse osmosis process is performed such that a concentrated aqueous stream containing 12 wt % dissolved NaCl is produced and transported away from the first side of the seventh osmotic membrane, and a final product stream containing substantially pure water (about 0.15% NaCl) is produced and transported away from the second side of the seventh osmotic membrane. At least a portion (or all) of the recovered concentrated draw solution stream can be throttled to a desired pressure (e.g., decreasing the pressure by about 14 bar to a pressure of about 6 bar) and sent back to the sixth osmotic membrane in a closed or at least partially closed loop.

Prophetic Example 2

This prophetic example describes the use of energy recovery in a desalination system in which an initial forward osmosis process is combined with a series of downstream reverse osmosis processes to produce an aqueous product stream with a higher purity of water than the initial aqueous feed stream.

Figure 3B:
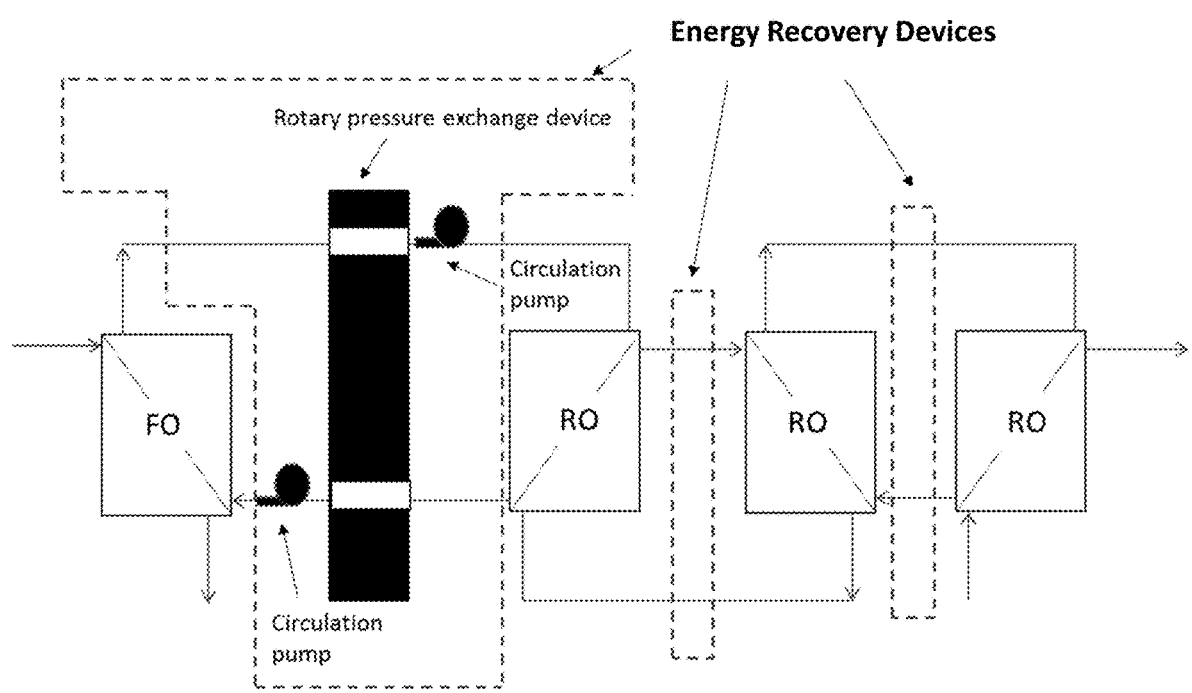
FIG. 3B is, according to some embodiments, a schematic illustration of an exemplary osmotic desalination system comprising a forward osmosis separator coupled with a series of reverse osmosis separator and including energy recovery apparatuses.

FIG. 3B is a schematic illustration of an exemplary desalination system in which energy is recovered at multiple points in the system. The energy can be recovered as direct hydraulic pressure, for example, using a pressure exchange device (instead of or in addition to a throttle). The process illustrated in FIG. 3B includes that same four initial osmotic stages as described above with respect to FIG. 3A (with similar streams and component concentrations, and similar osmotic membranes), except energy recovery devices have been added to the embodiment shown in FIG. 3B.

In FIG. 3B, the 22 wt % dissolved NaCl recovered draw solution from the second osmotic membrane (which is at a higher hydraulic pressure than the dilute 10.47 wt % dissolved NaCl draw solution exiting the first osmotic membrane) can be used to transfer energy (in the form of pressure) via direct contact (e.g., in a rotary pressure exchange device) with the dilute 10.47 wt % dissolved NaCl draw solution before the dilute draw solution is pressurized and sent to the second osmotic membrane. During this process, the 22 wt % dissolved NaCl recovered draw solution is depressurized (throttled). While a rotary pressure exchange device is illustrated in FIG. 3B, other devices (e.g., a Pelton wheel) could also be used.

Also in FIG. 3B, the 20 wt % dissolved NaCl recovered draw solution (which is at a higher hydraulic pressure than the 8.72 wt % dissolved NaCl dilute draw solution) can be used to transfer energy (in the form of pressure) via direct contact (e.g., in a rotary pressure exchange device) with the dilute 8.72 wt % dissolved NaCl draw solution before the dilute draw solution is pressurized and sent to the third osmotic membrane. During this process, the 20 wt % dissolved NaCl recovered draw solution is depressurized (throttled).

Also in FIG. 3B, the 18 wt % dissolved NaCl recovered draw solution (which is at a higher hydraulic pressure than the 6.98 wt % dissolved NaCl dilute draw solution) can be used to transfer energy (in the form of pressure) via direct contact (e.g., in a rotary pressure exchange device) with the dilute 6.98 wt % dissolved NaCl draw solution before the dilute draw solution is pressurized and sent to the fourth osmotic membrane. During this process, the 18 wt % dissolved NaCl recovered draw solution is depressurized (throttled).

Prophetic Example 3

This prophetic example describes the operation of an osmotic membrane separator in which flow rates, osmotic pressures, and hydraulic pressures of inlet streams are selected to balance the net osmotic driving force across the facial area of the osmotic membrane.

Figure 4A:
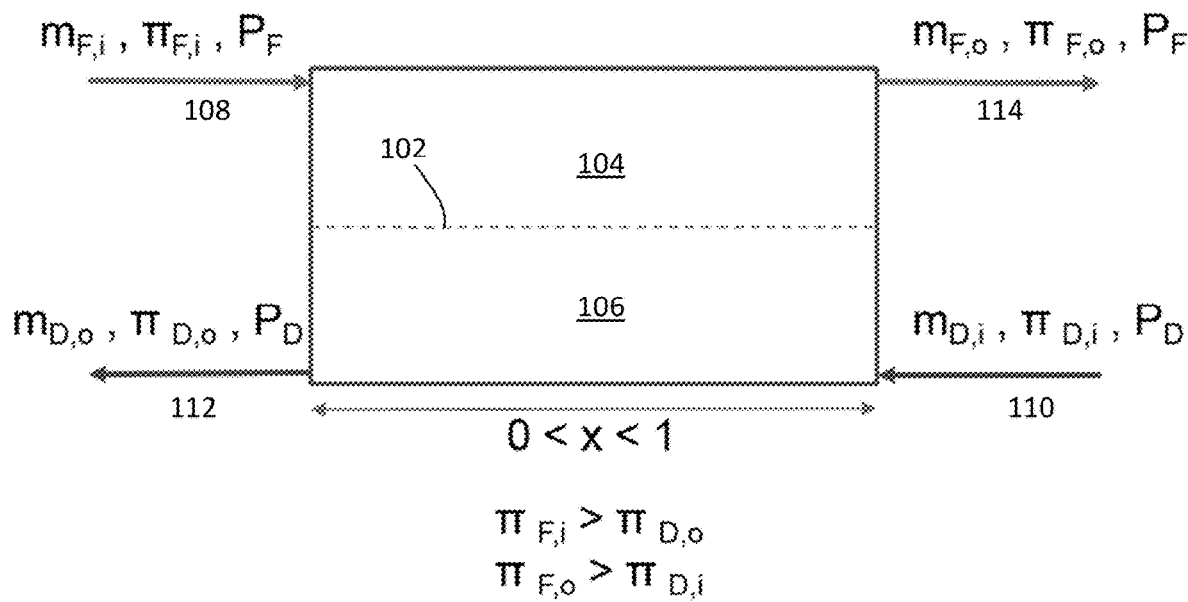
FIG. 4A is a schematic diagram illustrating the operation of an osmotic separator, according to one set of embodiments.

A schematic illustration of the osmotic membrane separator is shown in FIG. 4A. The osmotic membrane separator comprises osmotic membrane 102, defining a first side 104 and a second side 106. Feed stream 108 has a mass flow rate $m_{F,i}$, an osmotic pressure $\pi_{F,i}$, and a hydraulic pressure $P_F$. Concentrated aqueous stream 114 has a mass flow rate $m_{F,o}$, an osmotic pressure $\pi_{F,o}$, and a hydraulic pressure $P_F$. Draw inlet stream 110 has a mass flow rate $m_{D,i}$, an osmotic pressure $\pi_{D,i}$, and a hydraulic pressure $P_D$. Draw product stream 112 has a mass flow rate $m_{D,o}$, an osmotic pressure $\pi_{D,o}$, and a hydraulic pressure $P_D$. Feed stream 108 is transported across first side 104 of osmotic membrane 102, and draw inlet stream 110 is transported across second side 106 of osmotic membrane 102 in a direction opposite the direction of feed stream 108. In this way, the osmotic separator is operated in a counterflow configuration. Positions along membrane 102 can be denoted along the x-axis illustrated in FIG. 4A, with x=0 corresponding to a position closest to the aqueous inlet feed and draw product streams, and x=1 corresponding to the draw inlet and the concentrated aqueous stream outlet.

In one exemplary mode of operation, the aqueous feed stream 108 enters one side of the counterflow reverse osmosis membrane at position x=0, with a salt concentration of 100,000 ppm, a hydraulic pressure of 300 psi, and an osmotic pressure of 1311 psi. Draw inlet stream 110 can be a saline draw stream, entering the separator at the opposite side (i.e., at position x=1) with a salinity of 95,000 ppm, a hydraulic pressure of substantially 0, and an osmotic pressure of 1271 psi. The mass flow rate ratio of streams 108 and 110 is selected according to Equation 4, with C=1.

As aqueous feed stream 108 travels across membrane 102, some portion of the water within stream 108 passes through membrane 102 from first side 104 to second side 106. Because salts and/or other contaminants are excluded by membrane 102, the permeate is almost entirely pure water. Salt remains in the liquid on side 104 of membrane 102, so the concentration increases. When stream 114 exits the membrane separator (at position x=1), the osmotic pressure is 1531 psi.

As draw inlet stream 110 travels across side 106 of membrane 102 (in a direction opposite the direction of stream 108), it is diluted by the pure water permeating through membrane 102 (from side 104 to side 106). The mass flow of the salt remains unchanged, so salinity of the liquid on side 106 of membrane 102 drops, decreasing the osmotic pressure. When draw product stream 112 exits the membrane separator (at position x=0), the osmotic pressure is 1074 psi. In this example, the pressure drop across the membrane is assumed to be substantially 0. Thus, the net driving force scales linearly with salt concentration.

Figure 4B:
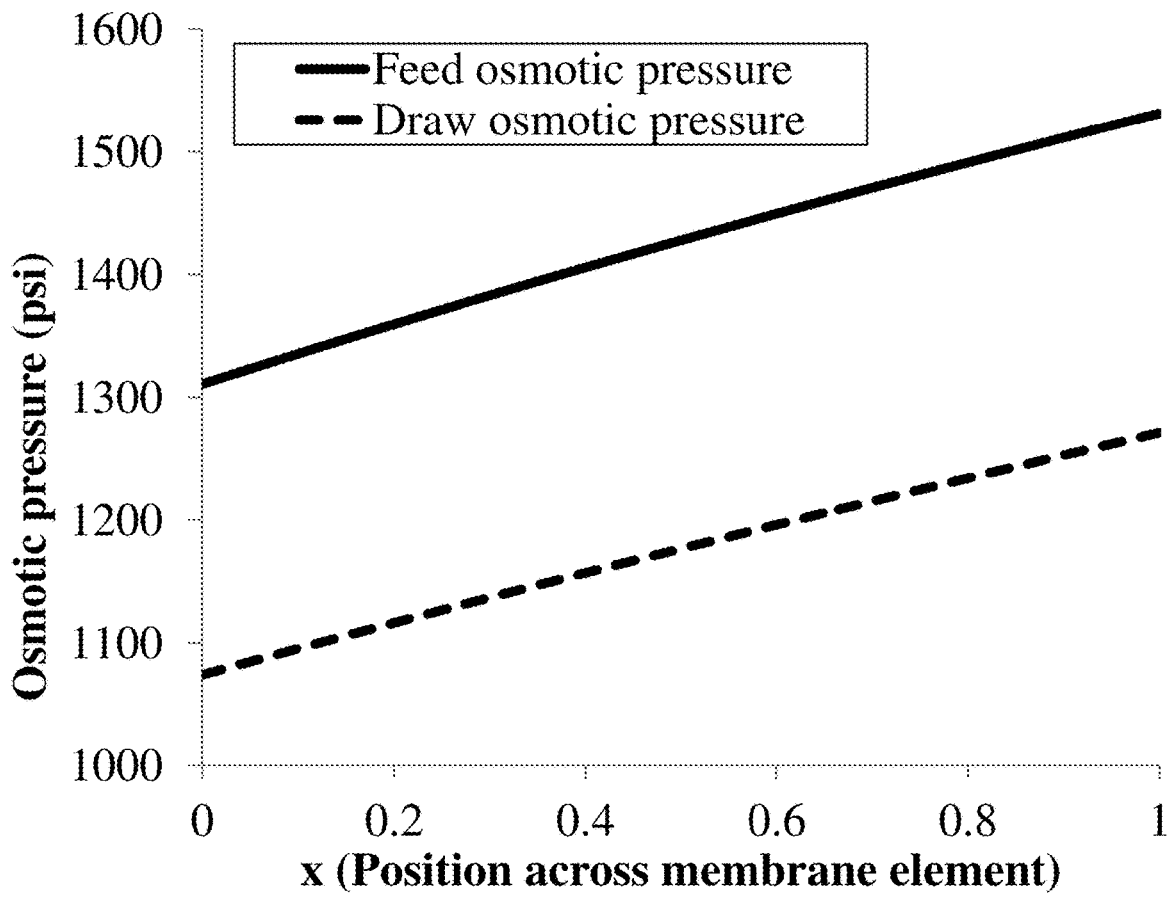
FIG. 4B is an exemplary plot of osmotic pressure as a function of position across an osmotic membrane, according to one embodiment.

Because the mass flow rate ratios were balanced according to Equation 4, the change in net driving force across the membrane is minimized. FIG. 4B is a plot of osmotic pressure as a function of position across the osmotic membrane. As seen in FIG. 4B, the difference between the feed osmotic pressure and the draw osmotic pressure remains relatively constant across the osmotic membrane. In this example, the maximum net driving force and the minimum net driving force are within 9.05% of each other.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
    transporting an aqueous feed stream across a first side of an osmotic membrane;
    transporting a draw inlet stream across a second side of the osmotic membrane such that water is transported from the aqueous feed stream through the osmotic membrane to the draw inlet stream to produce a draw product stream having a lower osmotic pressure than the draw inlet stream and a concentrated aqueous stream having a higher osmotic pressure than the aqueous feed stream, wherein the aqueous feed stream enters the first side of the osmotic membrane at a first lateral location of the osmotic membrane, and the draw inlet stream enters the second side of the osmotic membrane at a second lateral location of the osmotic membrane that is different than the first lateral location; and directing the transport of the aqueous feed stream across the osmotic membrane and/or the draw inlet stream across the osmotic membrane such that the transmembrane net driving force at the entrance of the aqueous feed stream to the osmotic membrane and the transmembrane net driving force at the entrance of the draw inlet stream to the osmotic membrane are within about 10% of each other.

2. The method of claim 1, wherein the concentrated aqueous stream has a higher concentration of solubilized ions than the aqueous feed stream.

3. The method of claim 1, wherein the draw inlet stream has a higher osmotic pressure than an osmotic pressure of the aqueous feed stream.

4. The method of claim 1, wherein the draw inlet stream has a lower osmotic pressure than an osmotic pressure of the aqueous feed stream.

5. The method of claim 1, wherein the concentration of solubilized ions within the aqueous feed stream is at least about 60,000 ppm.

6. The method of claim 1, wherein, over at least about 90% of a facial area of the osmotic membrane, a transmembrane net driving force across the osmotic membrane is uniform to within about 10%.

7. The method of claim 1, wherein, at at least one location on the osmotic membrane, a difference between an osmotic pressure on the first side of the osmotic membrane and an osmotic pressure on the second side of the osmotic membrane is less than about 45 bar.

8. The method of claim 1, wherein the aqueous feed stream and the draw inlet stream are transported across the osmotic membrane in a counter-current configuration.

9. The method of claim 1, wherein the aqueous feed stream contains a suspended and/or emulsified immiscible phase.

10. A method, comprising:
transporting an aqueous feed stream containing solubilized ions across a first side of a first osmotic membrane;
transporting a first draw inlet stream across a second side of the first osmotic membrane such that water is transported from the aqueous feed stream through the first osmotic membrane to the first draw inlet stream to produce a first draw product stream having a lower osmotic pressure than the first draw inlet stream and a concentrated aqueous stream having a higher osmotic pressure than the aqueous feed stream;
transporting at least a portion of the first draw product stream from the second side of the first osmotic membrane across a first side of a second osmotic membrane;
transporting a second draw inlet stream across a second side of the second osmotic membrane; and
applying a hydraulic pressure to the first side of the second osmotic membrane such that water is transported from the first draw product stream through the second osmotic membrane to the second draw inlet stream to produce a second draw product stream having a lower osmotic pressure than the second draw inlet stream and a second concentrated aqueous stream having a higher osmotic pressure than the first draw product stream;

wherein a difference between an osmotic pressure within the aqueous feed stream and an osmotic pressure of the first draw inlet stream and a difference between an osmotic pressure within the first draw product stream and an osmotic pressure of the second draw inlet stream are within about 20% of each other.

11. The method of claim 10, wherein the concentrated aqueous stream has a higher concentration of solubilized ions than the aqueous feed stream.

12. The method of claim 10, wherein the first draw inlet stream has a higher osmotic pressure than an osmotic pressure of the aqueous feed stream.

13. The method of claim 10, wherein the first draw inlet stream has a lower osmotic pressure than an osmotic pressure of the aqueous feed stream.

14. The method of claim 10, wherein the concentration of solubilized ions within the aqueous feed stream is at least about 60,000 ppm.

15. The method of claim 10, wherein, over at least about 90% of a facial area of the first osmotic membrane, a transmembrane net driving force across the first osmotic membrane is uniform to within about 10%.

16. The method of claim 10, wherein, over at least about 90% of a facial area of the second osmotic membrane, a transmembrane net driving force across the second osmotic membrane is uniform to within about 10%.

17. The method of claim 10, wherein, at at least one location on the first osmotic membrane, a difference between an osmotic pressure on the first side of the first osmotic membrane and an osmotic pressure on the second side of the first osmotic membrane is less than about 45 bar.

18. The method of claim 10, wherein the aqueous feed stream and the first draw inlet stream are transported across the first osmotic membrane in a counter-current configuration.

19. The method of claim 10, wherein the first draw product stream and the second draw inlet stream are transported across the second osmotic membrane in a counter-current configuration.

20. A method, comprising:
transporting an aqueous feed stream across a first side of an osmotic membrane;
transporting a draw inlet stream across a second side of the osmotic membrane such that water is transported from the aqueous feed stream through the osmotic membrane to the draw inlet stream to produce a draw product stream having a lower osmotic pressure than the draw inlet stream and a concentrated aqueous stream having a higher osmotic pressure than the aqueous feed stream; and
directing the transport of the aqueous feed stream across the osmotic membrane and/or the draw inlet stream across the osmotic membrane such that over at least about 90% of a facial area of the osmotic membrane, a transmembrane net driving force across the osmotic membrane is uniform to within about 10%.

21. The method of claim 20, wherein the aqueous feed stream contains a suspended and/or emulsified immiscible phase and solubilized ions at a concentration of at least 60,000 ppm.

22. The method of claim 20, wherein the concentrated aqueous stream has a higher concentration of solubilized ions than the aqueous feed stream.

23. The method of claim 20, wherein the draw inlet stream has a higher osmotic pressure than an osmotic pressure of the aqueous feed stream.

24. The method of claim 20, wherein the draw inlet stream has a lower osmotic pressure than an osmotic pressure of the aqueous feed stream.

25. The method of claim 20, wherein, at at least one location on the osmotic membrane, a difference between an osmotic pressure on the first side of the osmotic membrane and an osmotic pressure on the second side of the osmotic membrane is less than 45 bar.

26. The method of claim 20, wherein the aqueous feed stream and the draw inlet stream are transported across the osmotic membrane in a counter-current configuration.

27. The method of claim 20, wherein the aqueous feed stream comprises $Na^+$, $Mg^{2+}$, $Ca^{2+}$, $Sr^{2+}$, $Ba^{2+}$, $Cl^-$, carbonate anions, bicarbonate anions, sulfate anions, bisulfate anions, and/or dissolved silica.

28. The method of claim 20, wherein the draw inlet stream comprises $Na^+$, $Mg^{2+}$, $Ca^{2+}$, $Sr^{2+}$, $Ba^{2+}$, and/or $Cl^-$.

* * * * *